US012340683B2

(12) United States Patent
Kim et al.

(10) Patent No.: US 12,340,683 B2
(45) Date of Patent: Jun. 24, 2025

(54) CONTROL DEVICE OF ROBOT CLEANER

(71) Applicant: LG ELECTRONICS INC., Seoul (KR)

(72) Inventors: Sanga Kim, Seoul (KR); Junho Yun, Seoul (KR); Yonggil Shin, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 836 days.

(21) Appl. No.: 17/361,569

(22) Filed: Jun. 29, 2021

(65) Prior Publication Data

US 2022/0000326 A1 Jan. 6, 2022

(30) Foreign Application Priority Data

Jul. 1, 2020 (KR) .................. 10-2020-0080836

(51) Int. Cl.
*G08C 17/02* (2006.01)
*H04W 88/02* (2009.01)

(52) U.S. Cl.
CPC .......... *G08C 17/02* (2013.01); *A47L 2201/04* (2013.01); *A47L 2201/06* (2013.01); *G08C 2201/30* (2013.01); *H04W 88/02* (2013.01)

(58) Field of Classification Search
CPC . G08C 17/02; G08C 2201/30; A47L 2201/04; A47L 2201/06; A47L 2201/026; A47L 11/283; A47L 11/4008; A47L 11/4011; A47L 11/408; A47L 11/4091; A47L 11/40; A47L 2201/00; H04W 88/02; G06F 3/0482; G06F 3/04847; G06F 3/0488; G06Q 10/02

See application file for complete search history.

(56) References Cited

U.S. PATENT DOCUMENTS

| 9,542,063 | B1* | 1/2017 | Marchant | G06F 11/327 |
| 9,713,318 | B1* | 7/2017 | Albawi | G08C 17/02 |
| 2019/0073801 | A1* | 3/2019 | Stukalov | H04L 51/10 |
| 2020/0077863 | A1* | 3/2020 | Huang | A47L 11/4061 |
| 2020/0345193 | A1* | 11/2020 | Lu | G05D 1/0088 |

FOREIGN PATENT DOCUMENTS

| CN | 103885686 A | * 6/2014 |
| CN | 113760413 A | * 12/2021 |
| KR | 10-0619753 | 9/2006 |

(Continued)

OTHER PUBLICATIONS

Author: Cordless Vacuum Guide Title: Roborock S6 MaxV App Features (Everything You Need to Know) Retrived from Youtube Video Premiered May 6, 2020 Hyperlink: https://www.youtube.com/watch?v=7fk6kBg6MAs (Year: 2020).*

(Continued)

*Primary Examiner* — Khoi H Tran
*Assistant Examiner* — Trang Dang
(74) *Attorney, Agent, or Firm* — KED & ASSOCIATES, LLP

(57) ABSTRACT

The present invention relates to a control device for a robot cleaner providing functions and user interfaces (UI) for increasing user convenience, and according to the control device of the present invention, the user convenience can be increased by providing various user interfaces capable of receiving set values for controlling the robot cleaner.

16 Claims, 46 Drawing Sheets

(56) References Cited

FOREIGN PATENT DOCUMENTS

| KR | 10-1352518 | 1/2014 |
| KR | 10-2017-0001345 | 1/2017 |
| KR | 10-2018-0024467 | 3/2018 |
| KR | 10-2021827 | 9/2019 |
| KR | 20200029651 A * | 3/2020 |
| KR | 10-2020-0063259 | 6/2020 |

OTHER PUBLICATIONS

English translation of CN113760413A Author: Zou et al. Tile: Page display method, cleaning robot system and client equipment Date: Dec. 7, 2021 (Year: 2020).*

English translation of KR20200029651A Author: Seo Jeongho Title: Robot Cleaner and Method for Controlling the Same Date: Mar. 19, 2020 (Year: 2018).*

CN103885686A Description Translation Slide control part and display method thereof Inventor: Cao Zhenchuan, Date: Jun. 25, 2014 (Year: 2014).*

Roborock S6 MaxV App Features (Everything You Need to Know) Author: Cordless Vacuum Guide Youtube video link: https://www.youtube.com/watch?v=7fk6kBg6MAs Date: Mar. 6, 2020 (Year: 2024).*

Roborock S5 (S50) Compete Setup Guide!—All Buttons & Features, Maintenance Author: Vacuum Wars Youtube video link: https://www.youtube.com/watch?v=K-30SneGiYo Date: Feb. 17, 2019 (Year: 2024).* iRobot Home: How to Create Keep Out Zones. Author: FunTechReviews Youtube video link: https://www.youtube.com/watch?v=EvhXs1yCSGU Date: Mar. 17, 2020 (Year: 2024).*

Korean Office Action dated Nov. 28, 2024 issued in Application No. 10-2020-0080836.

* cited by examiner

[FIG. 1]
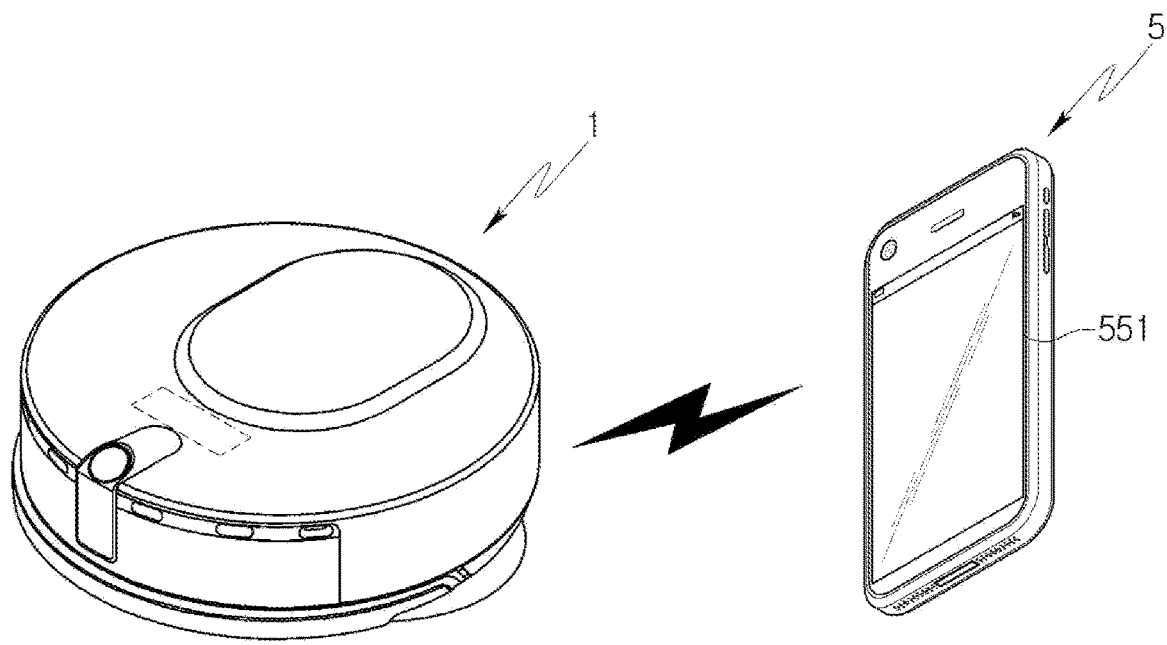

[FIG. 2a]
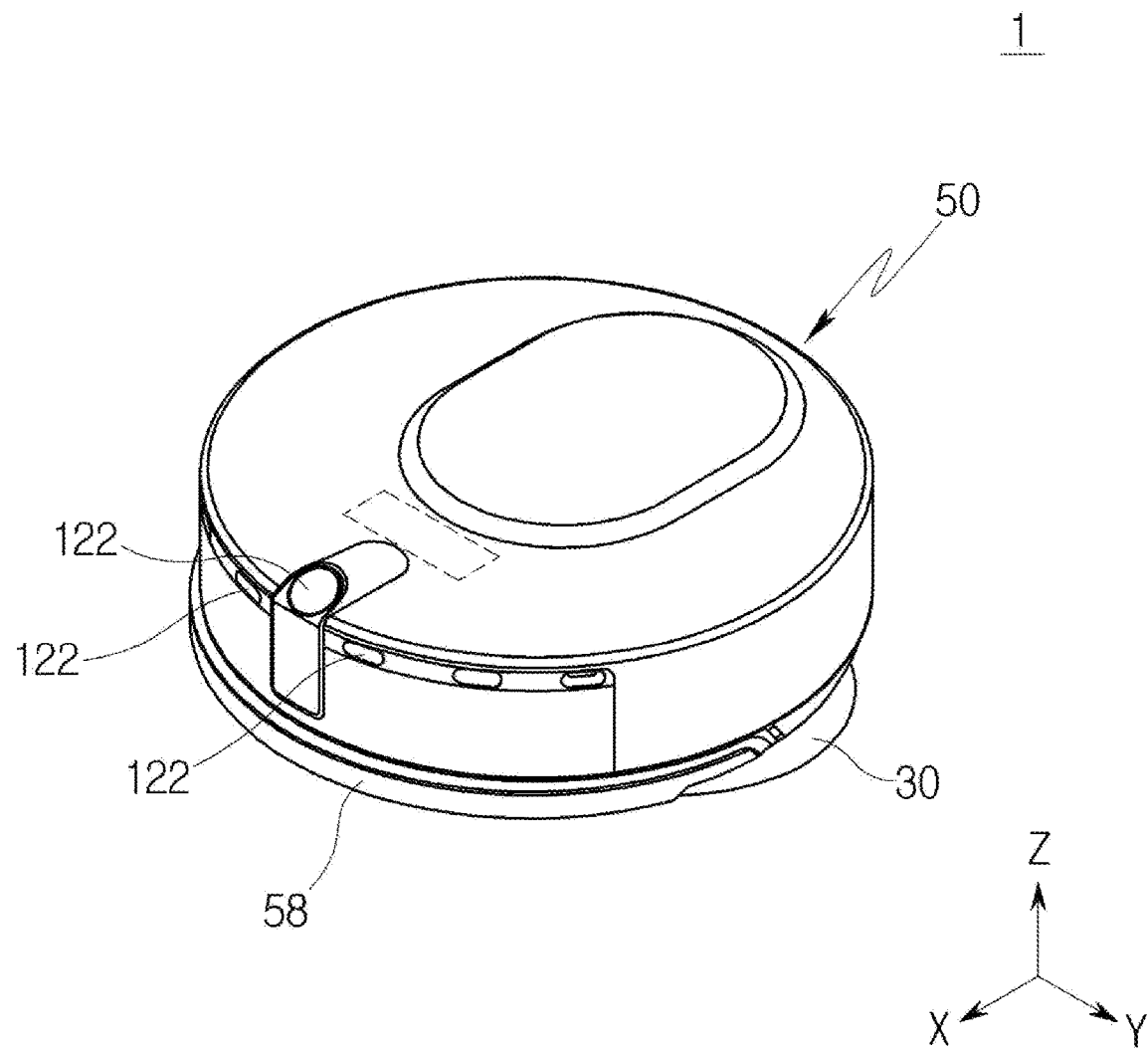

[FIG. 2b]
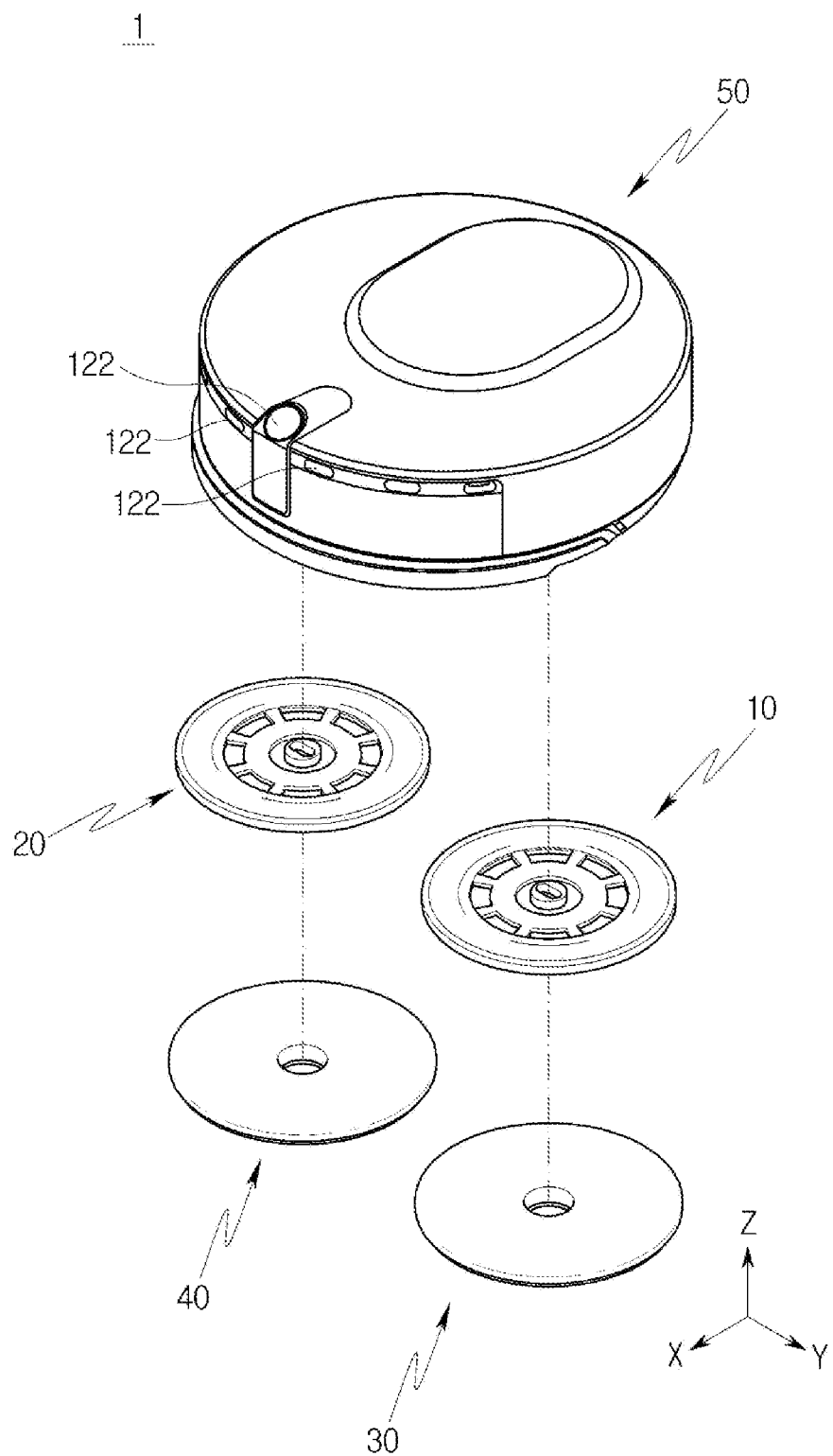

[FIG. 2c]
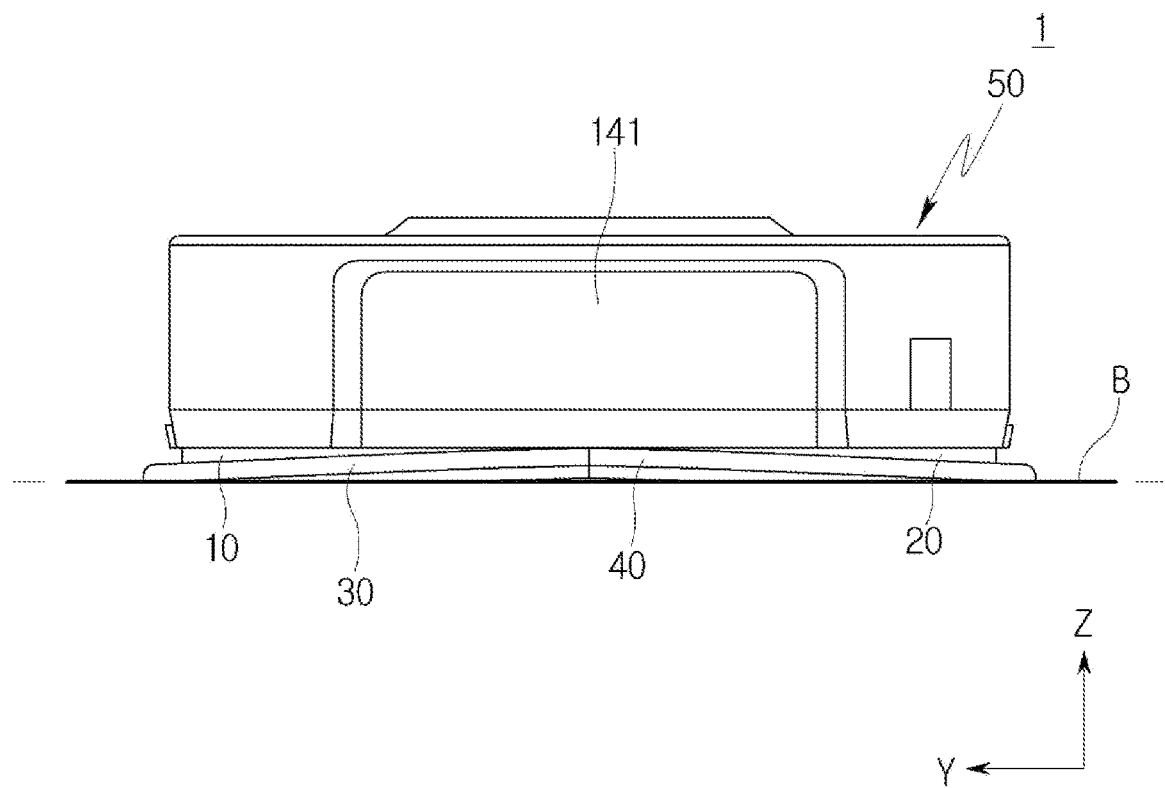

[FIG. 2d]
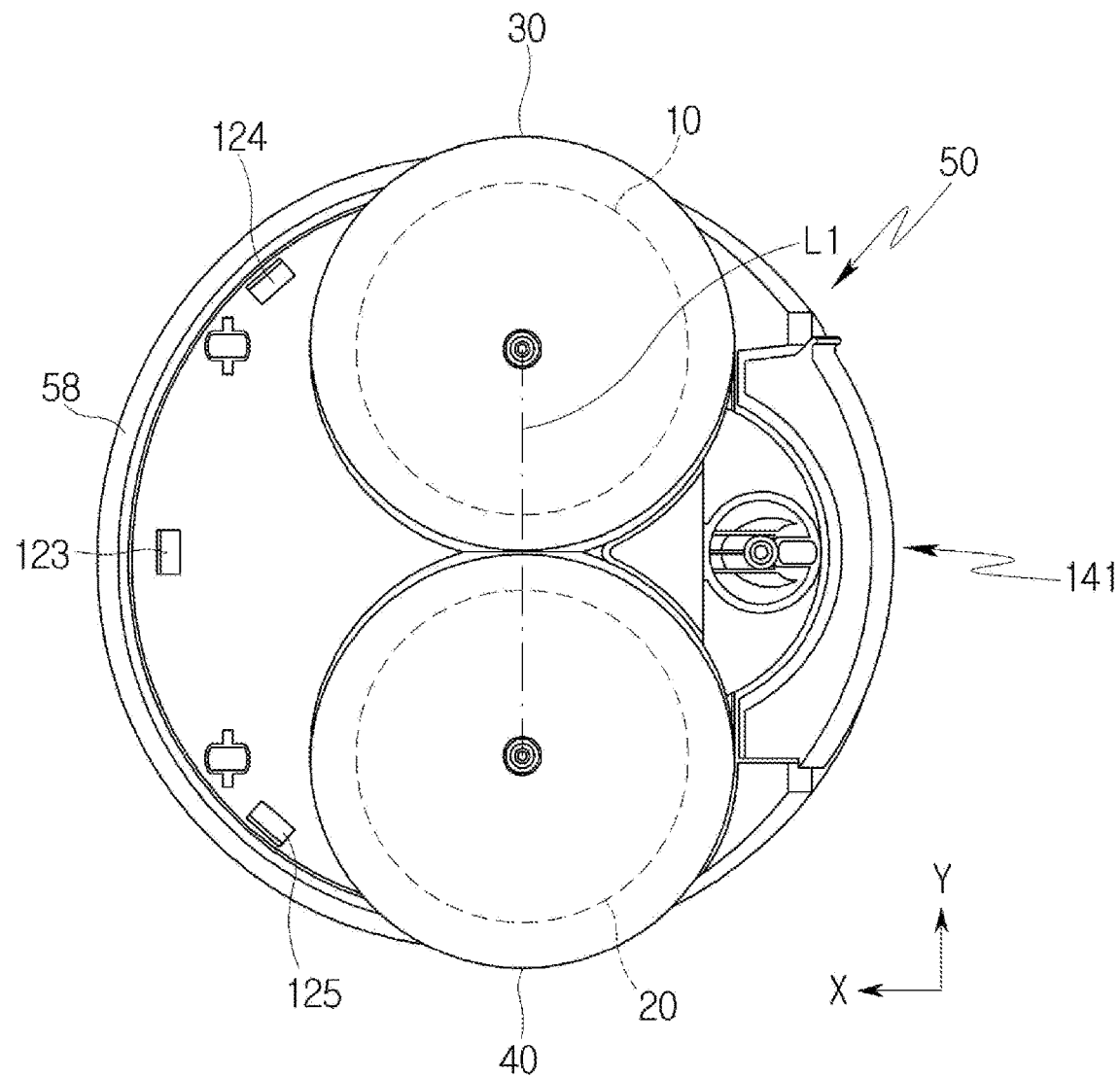

[FIG. 2e]
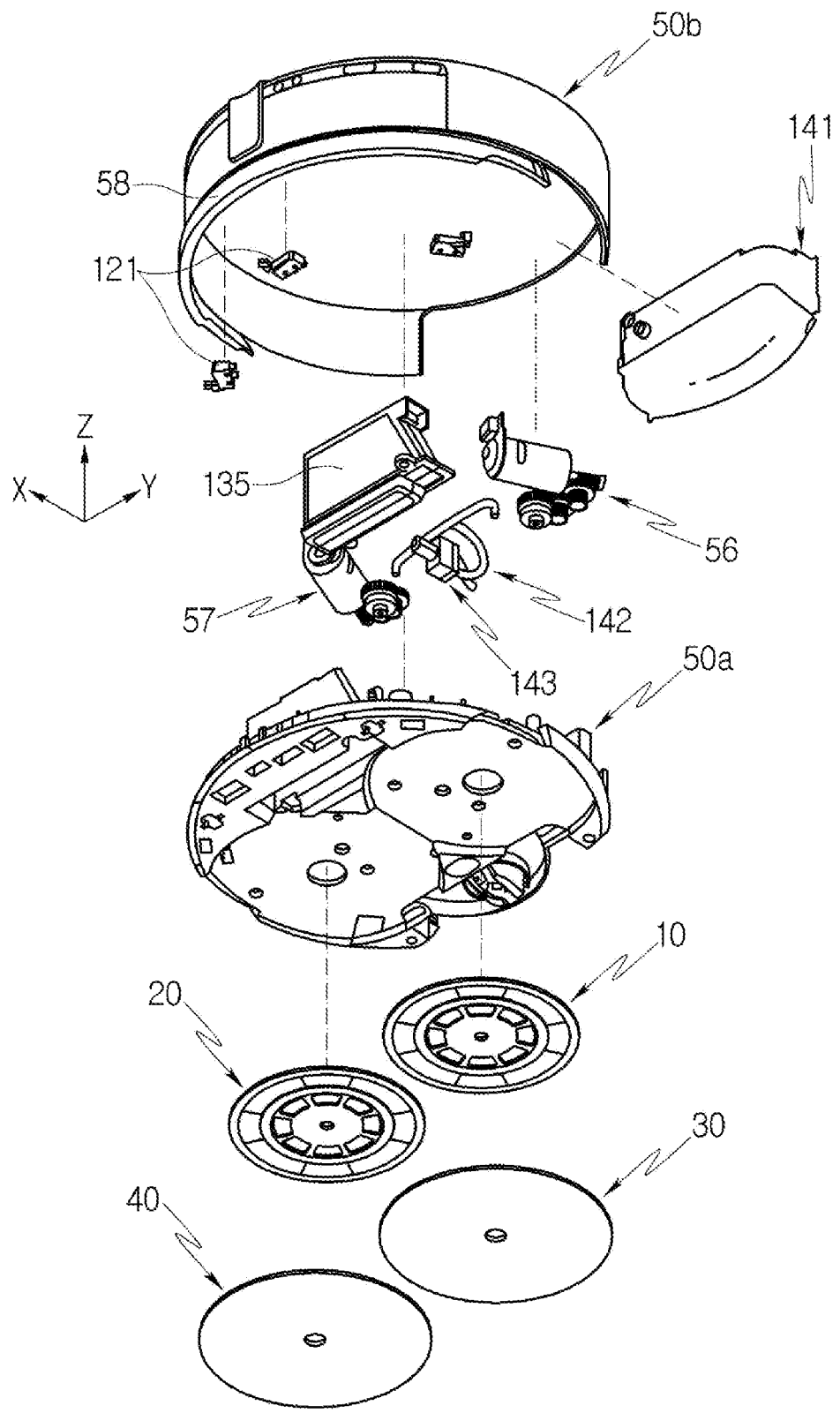

[FIG. 2f]
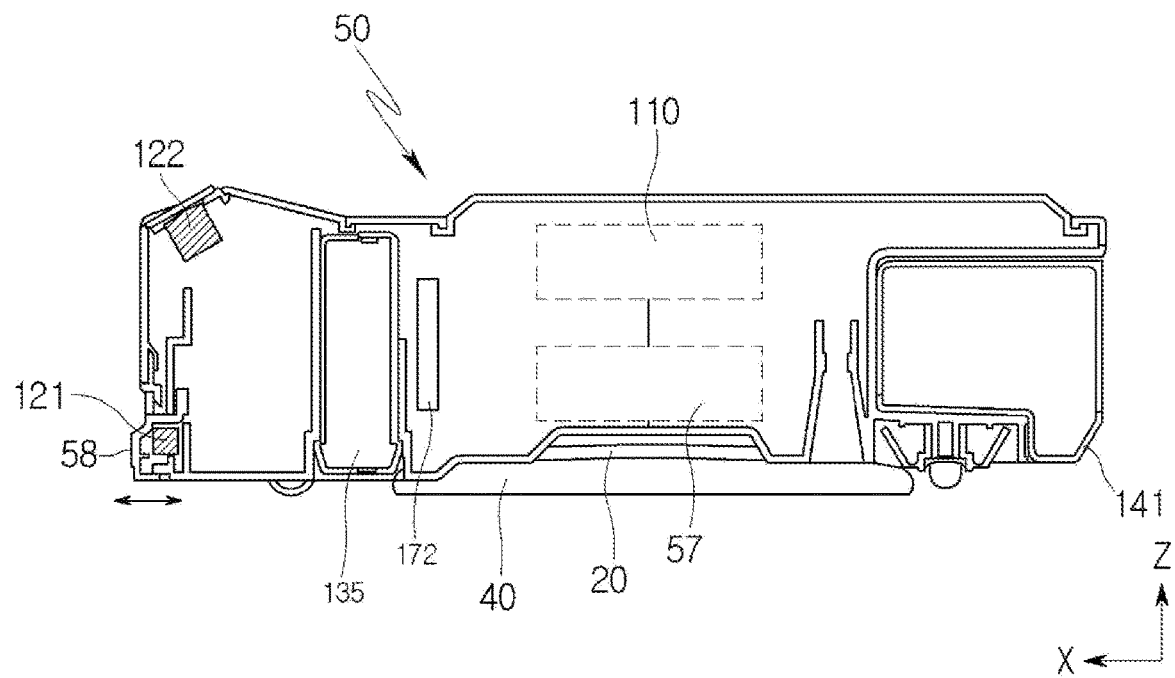

[FIG. 3]
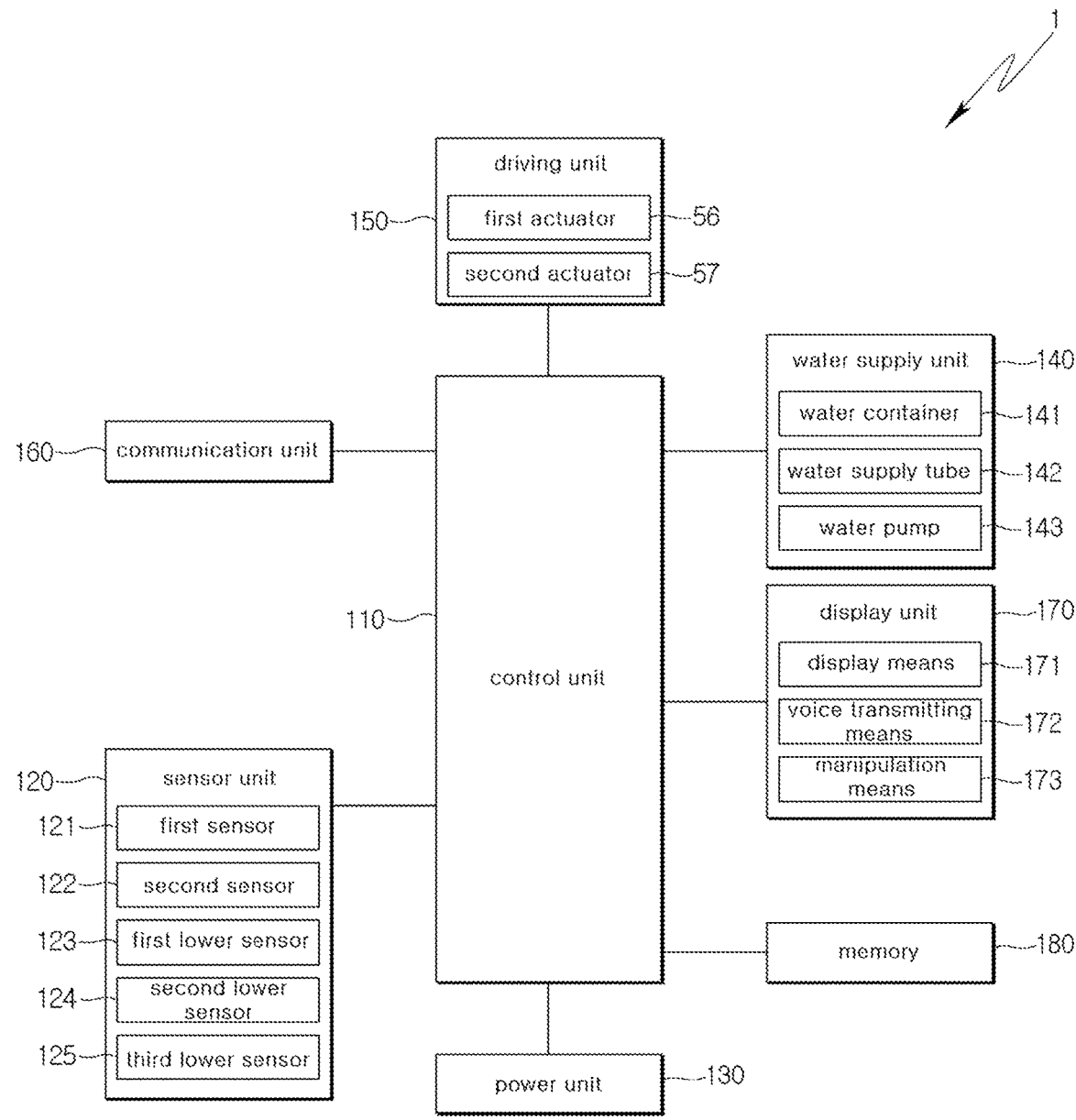

[FIG. 4]
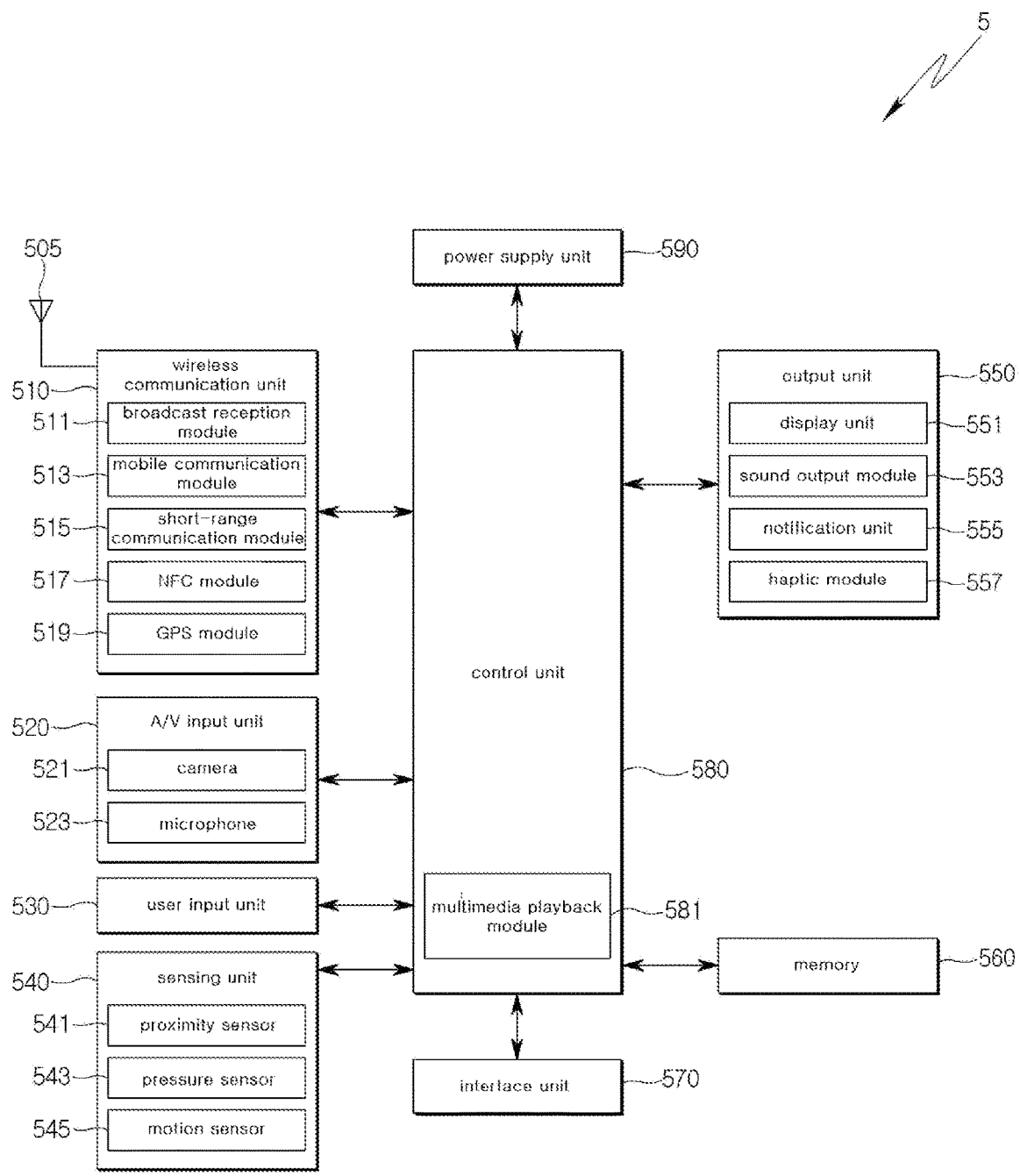

[FIG. 5]
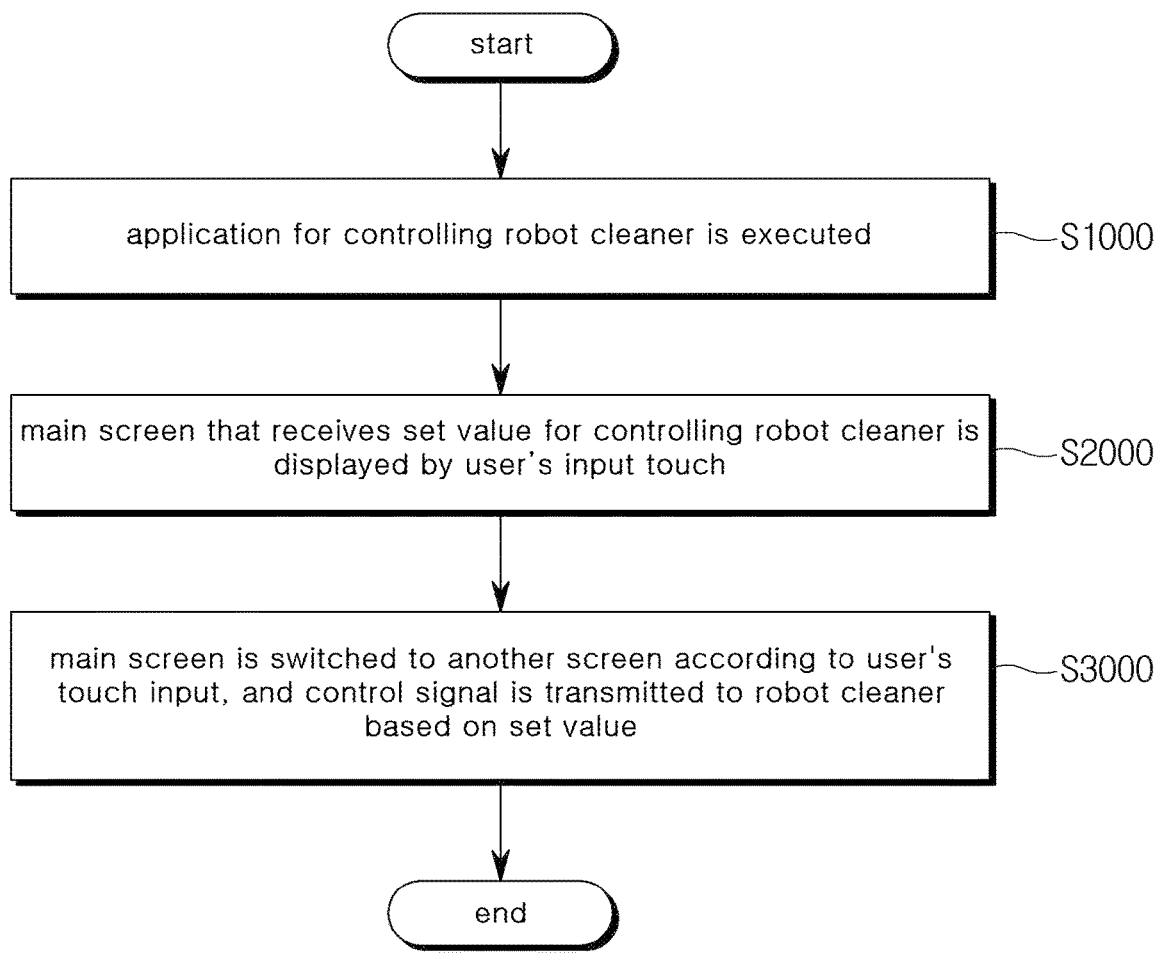

[FIG. 6]
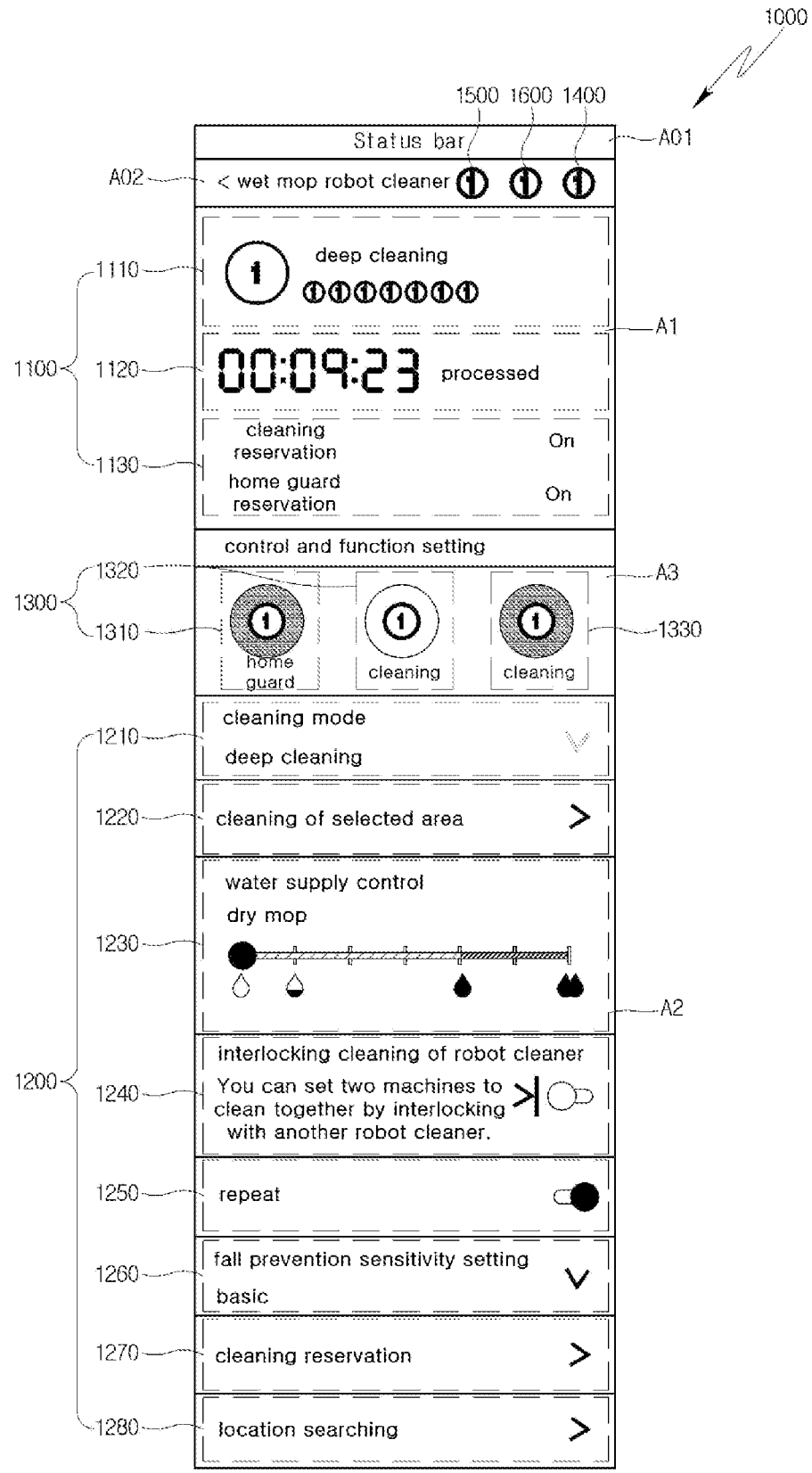

[FIG. 7]
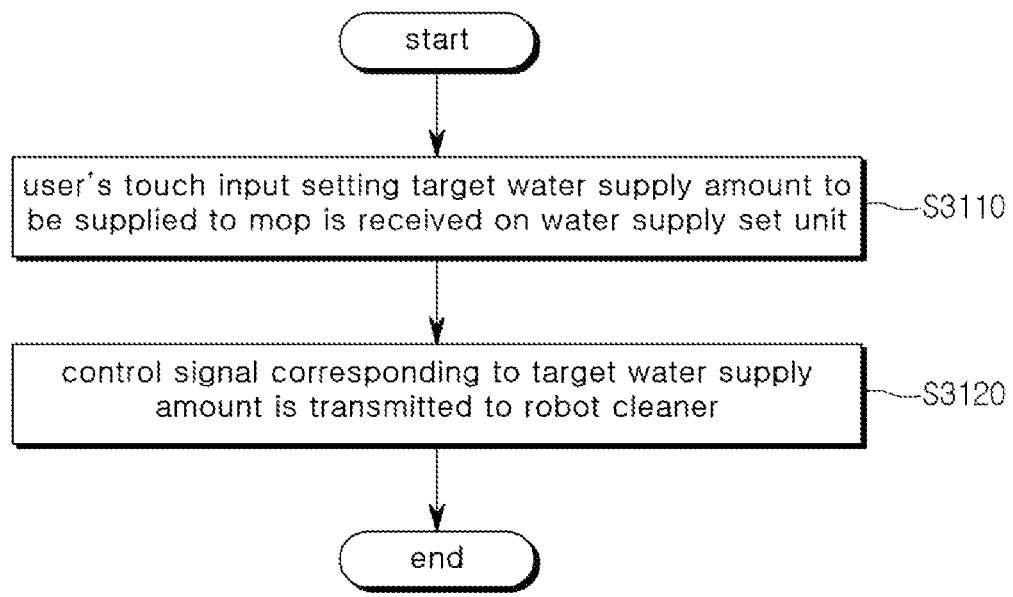

[FIG. 8a]
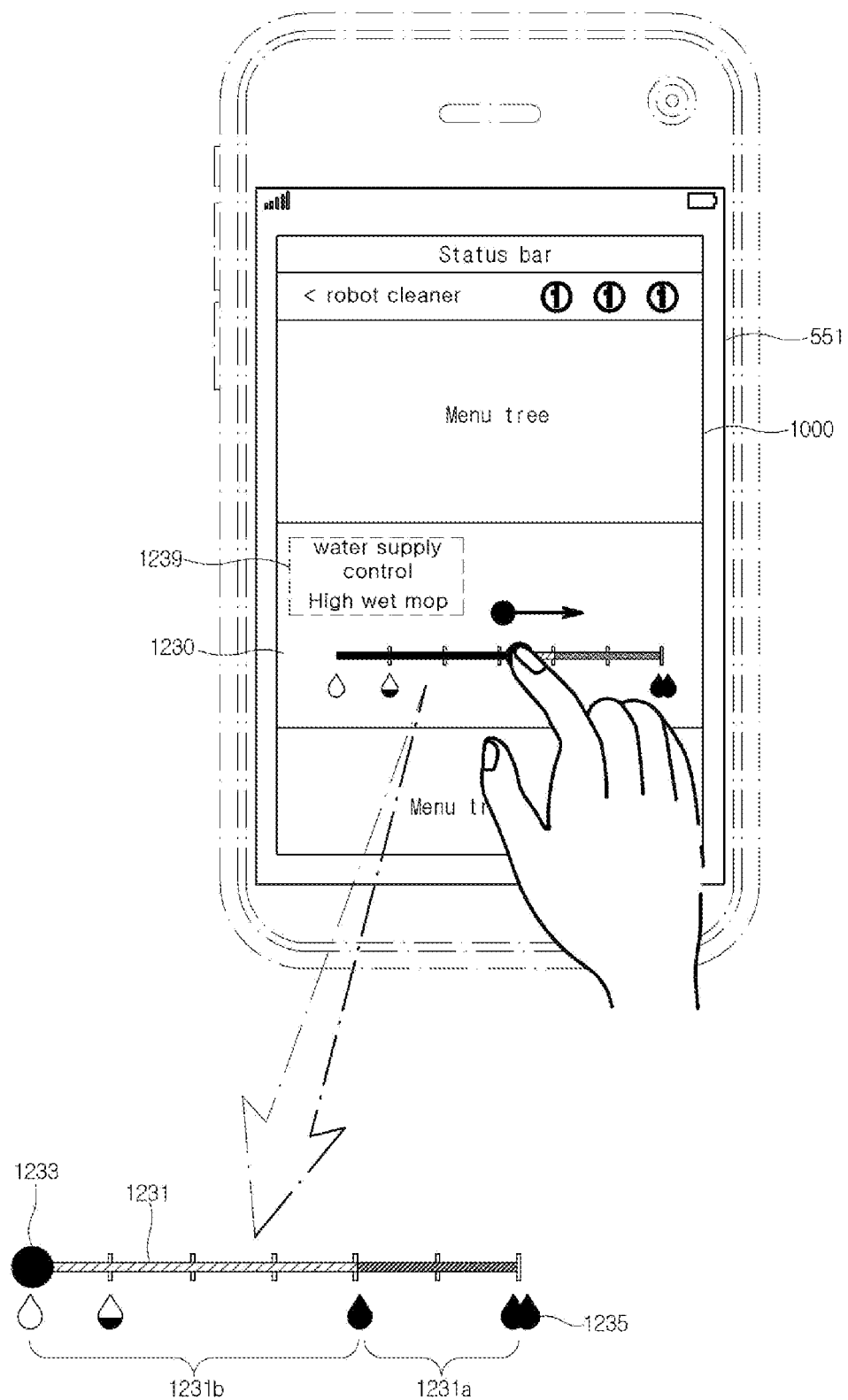

[FIG. 8b]
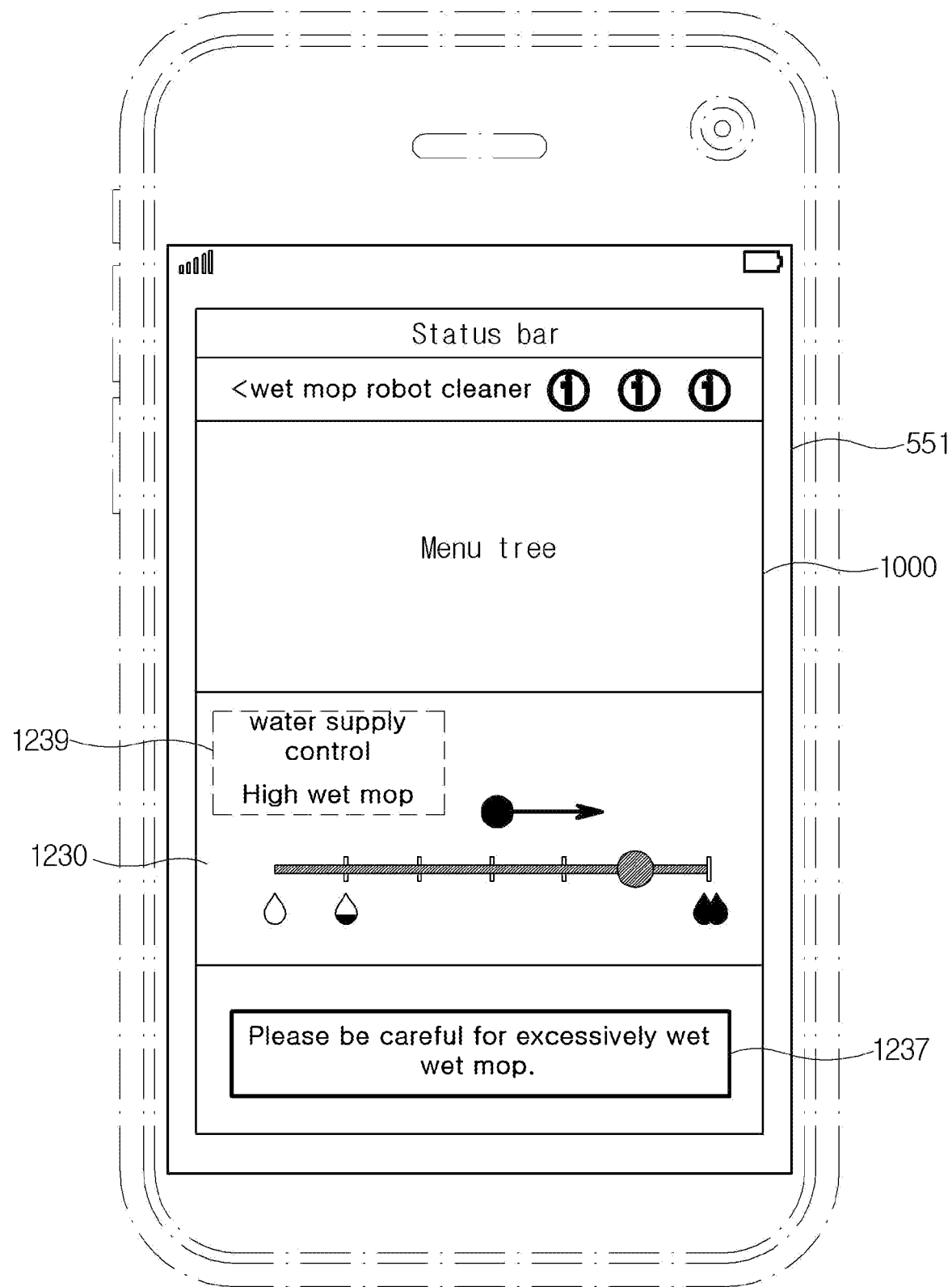

[FIG. 9]
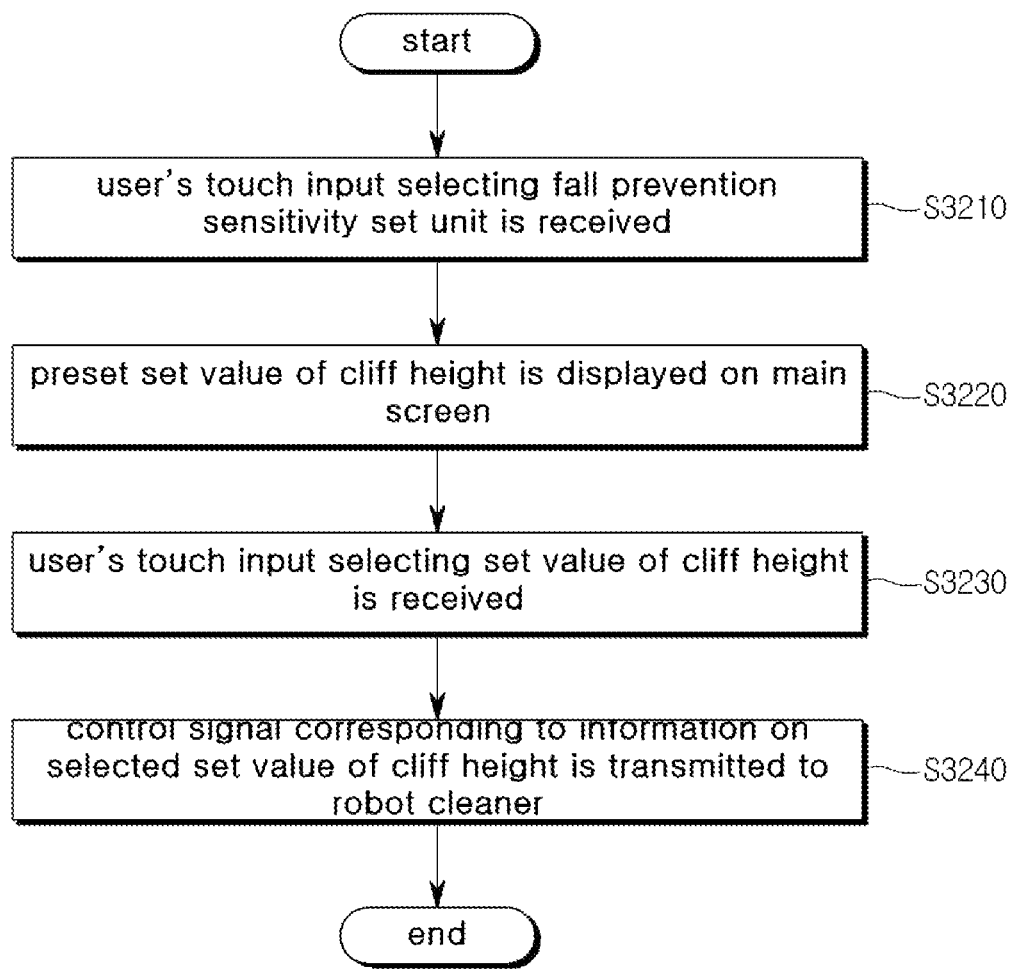

[FIG. 10a]
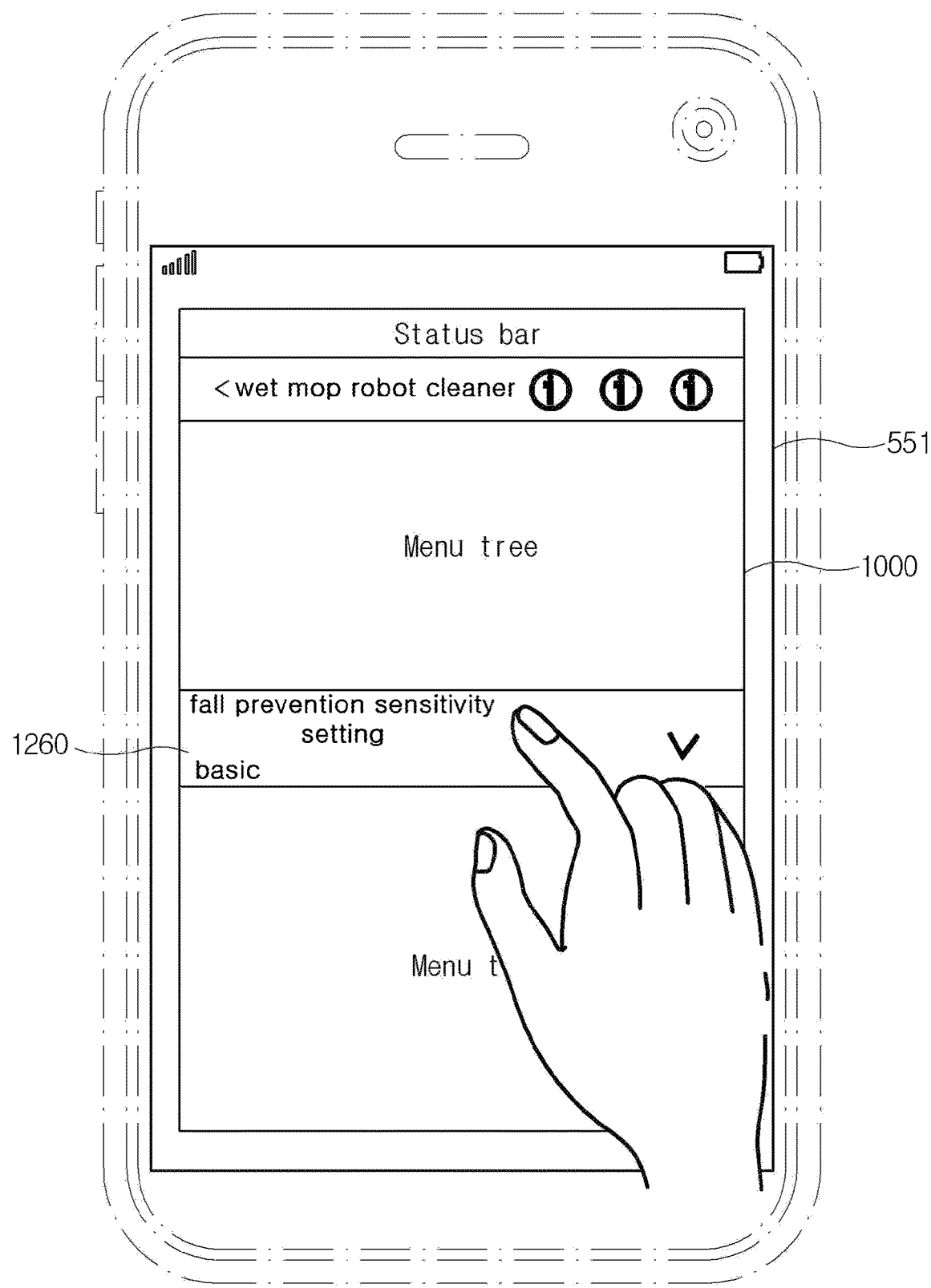

[FIG. 10b]
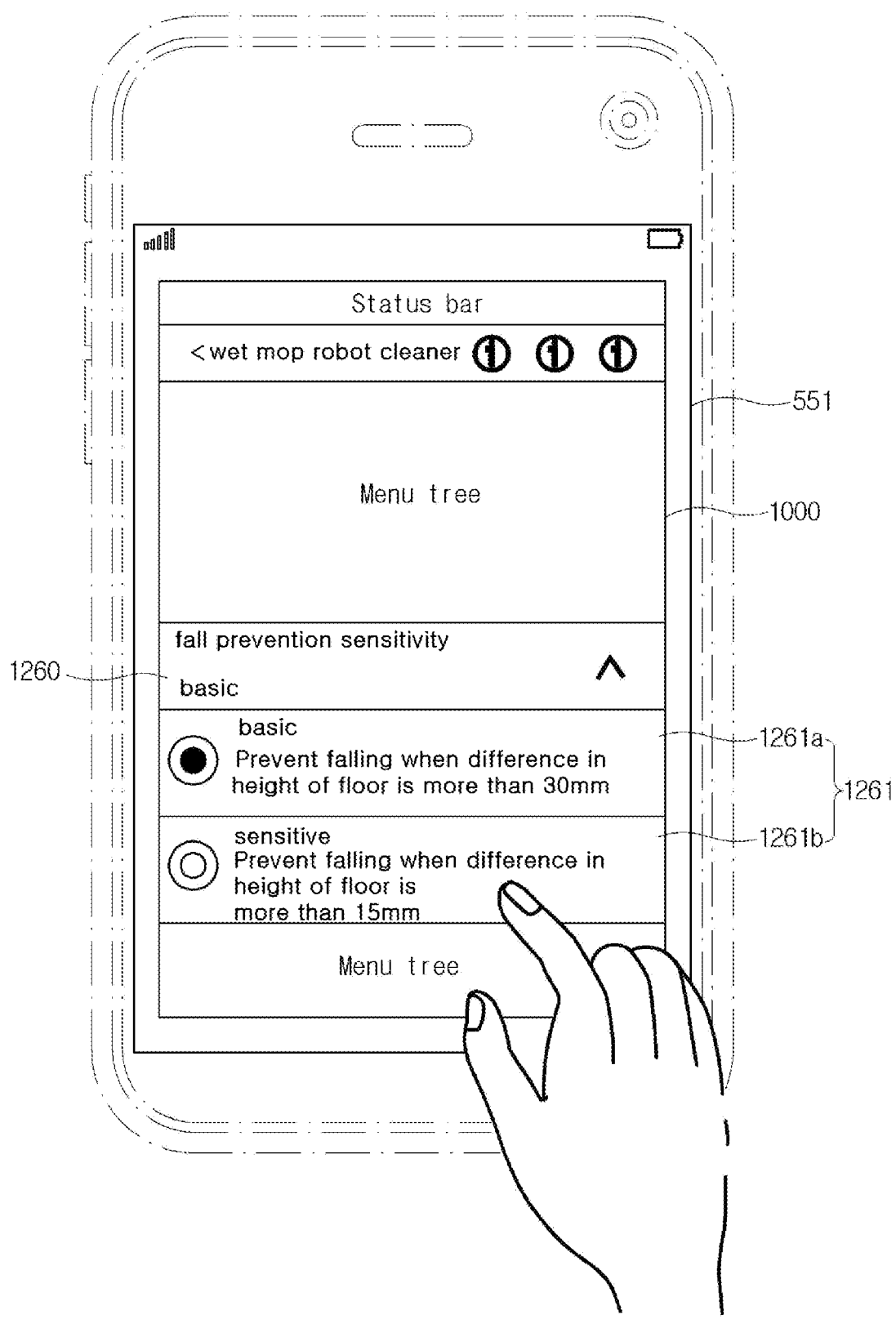

[FIG. 10c]
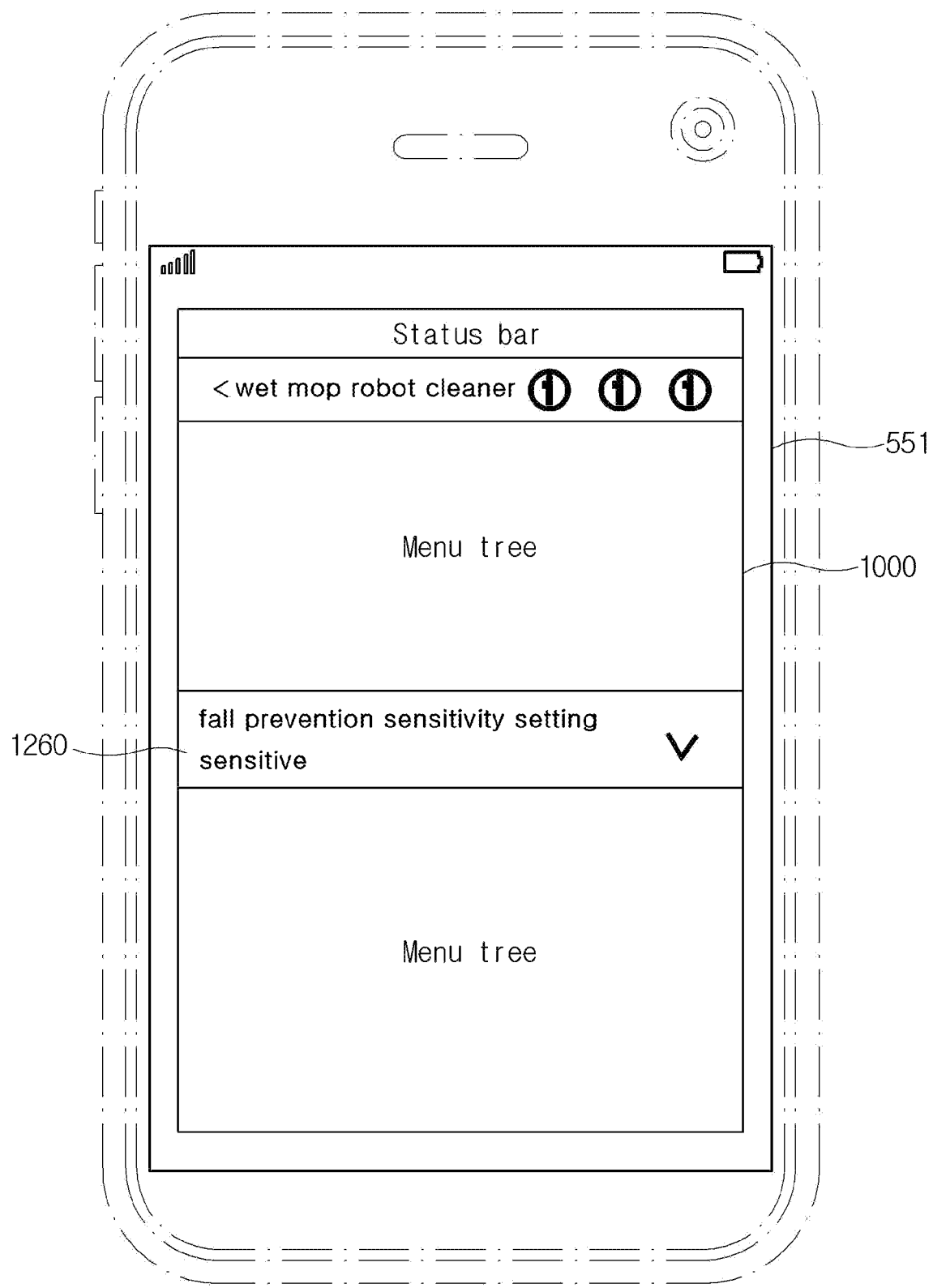

[FIG. 11]
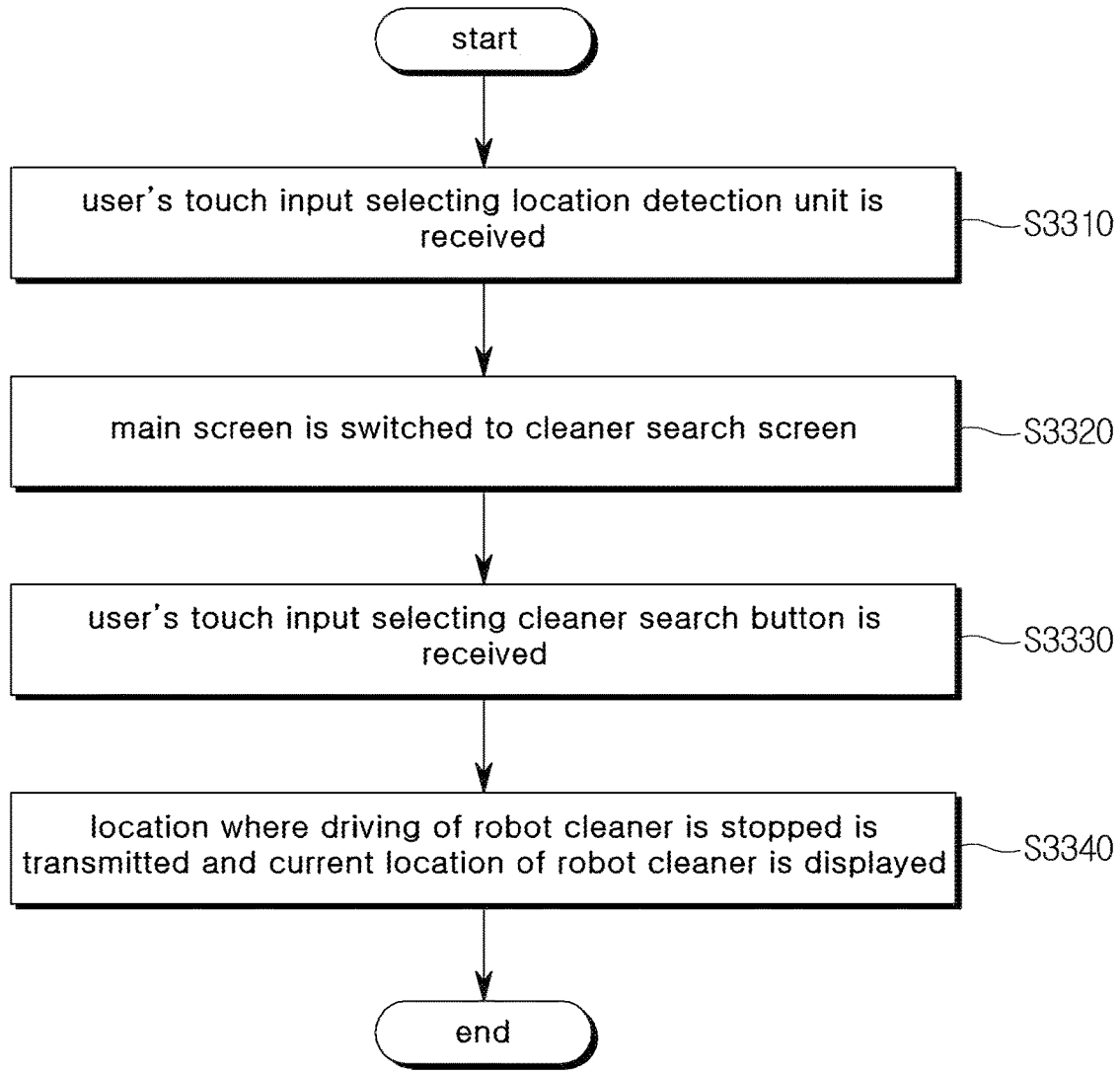

[FIG. 12a]
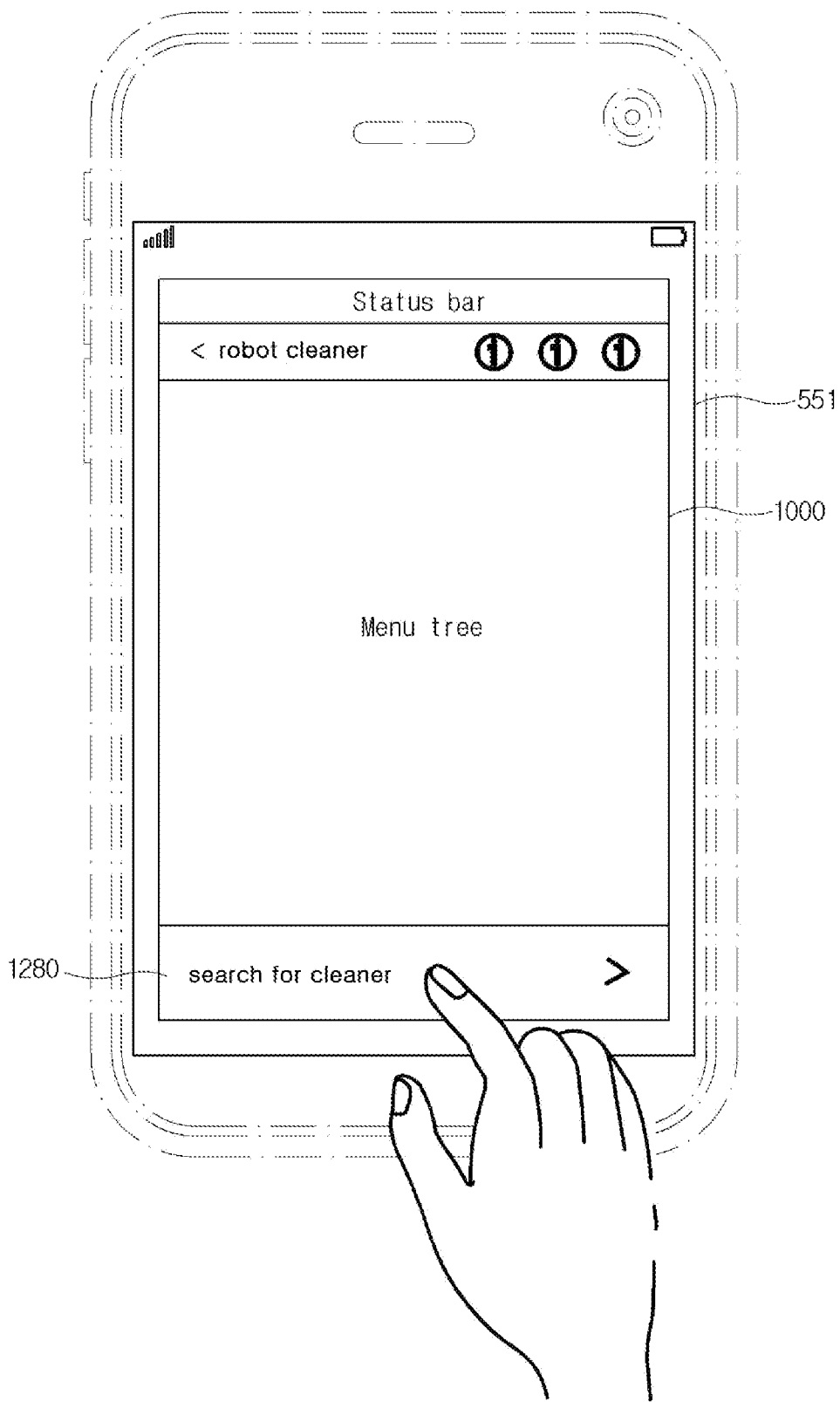

[FIG. 12b]
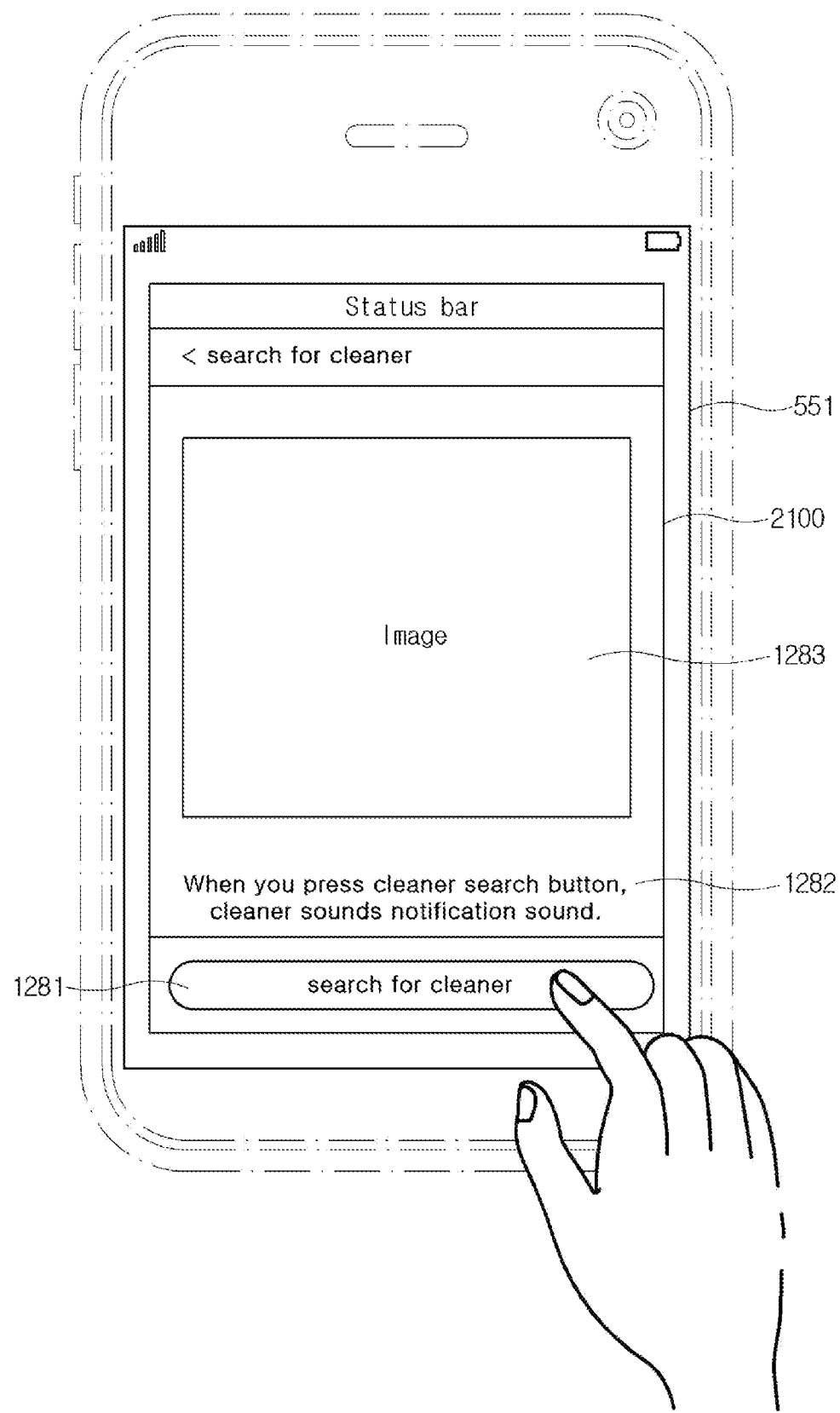

[FIG. 13]
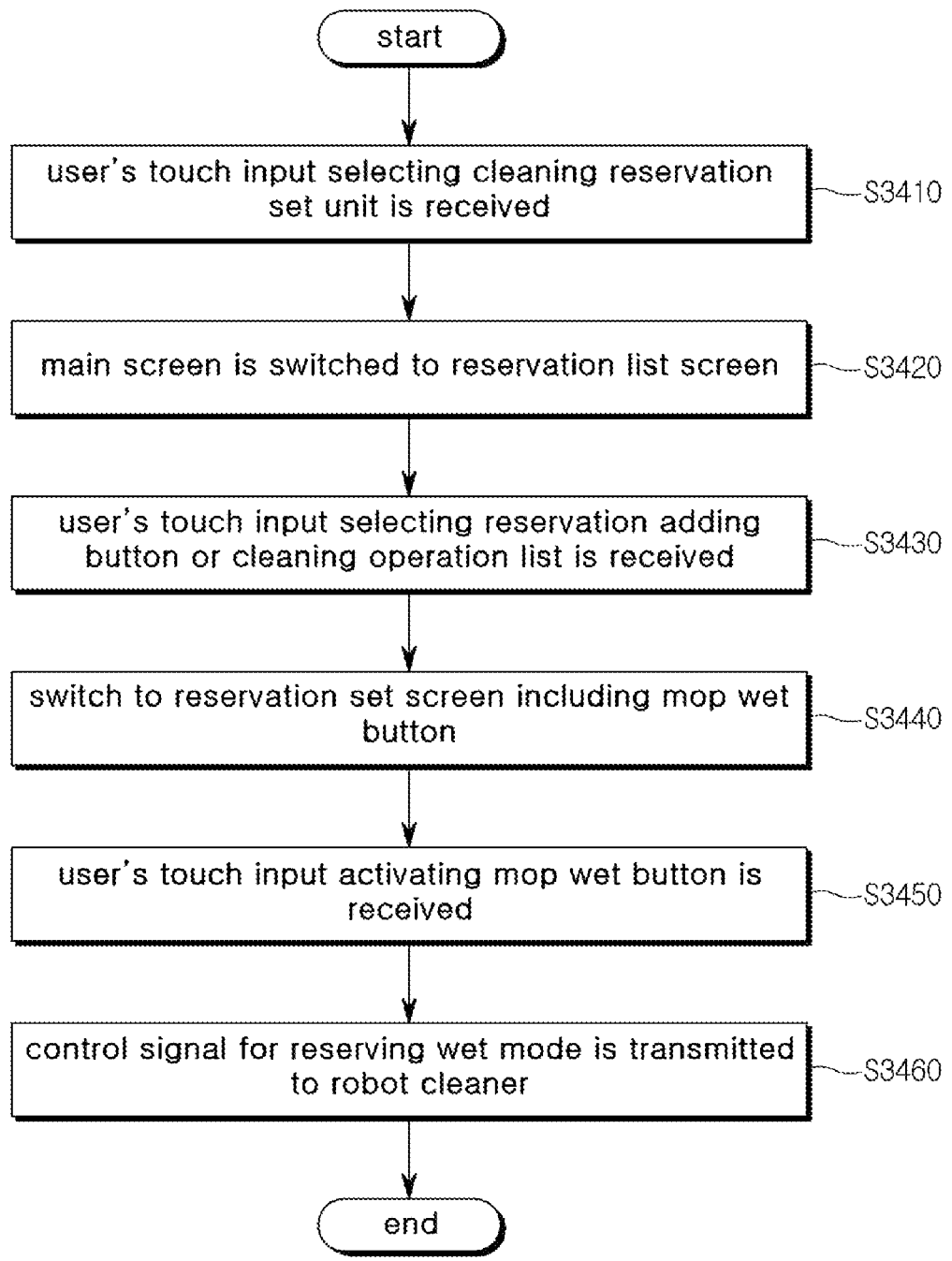

[FIG. 14a]
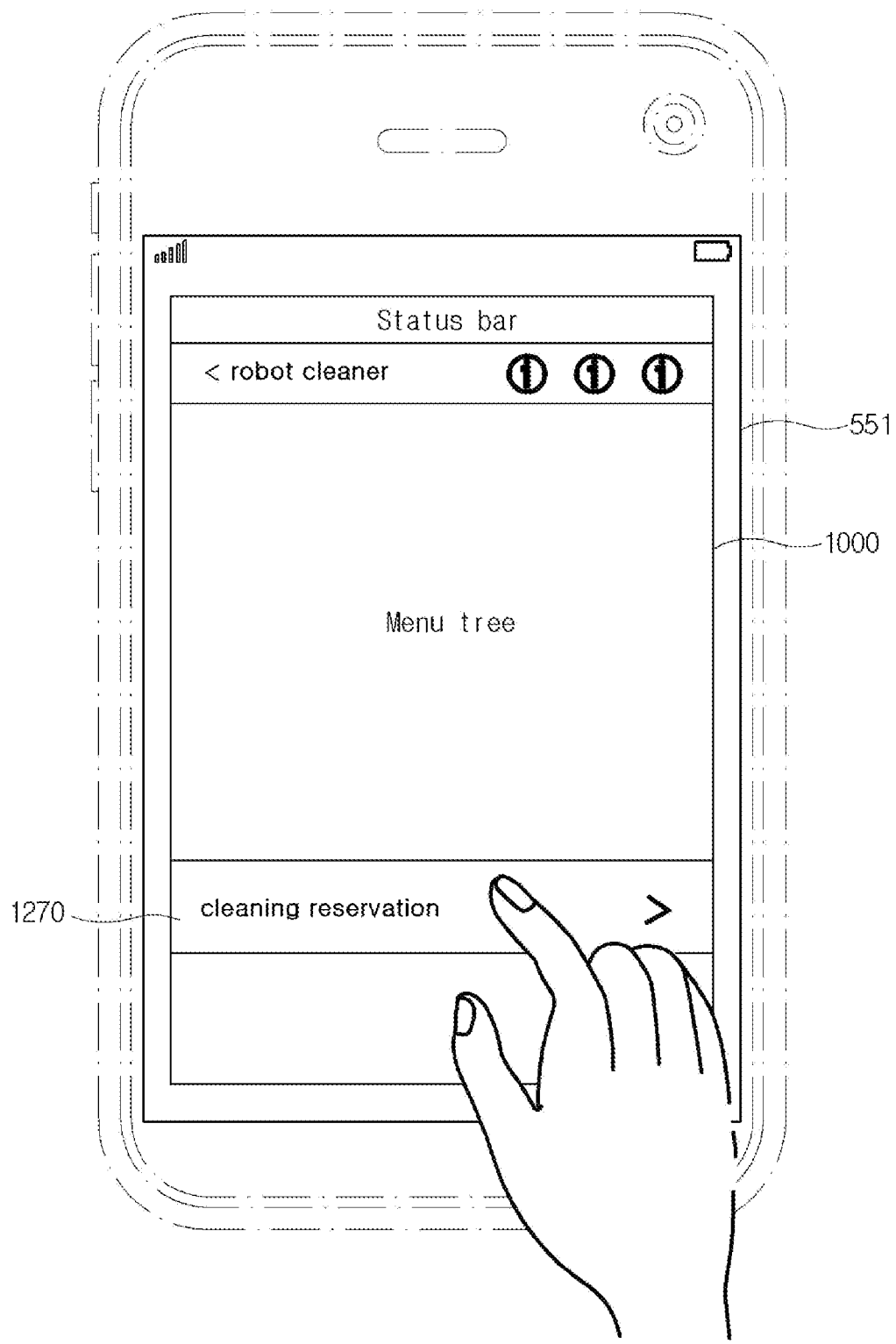

[FIG. 14b]
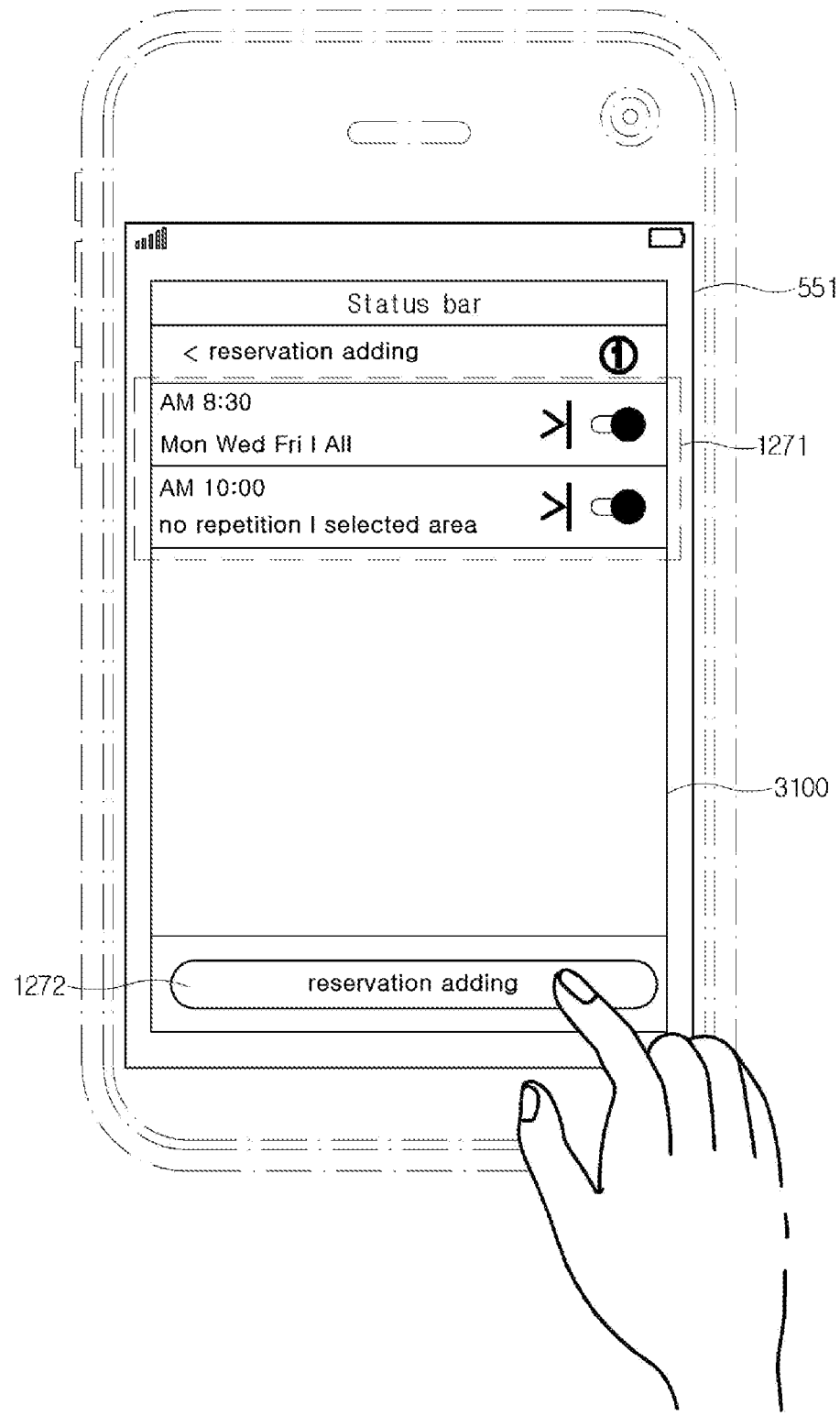

[FIG. 14c]
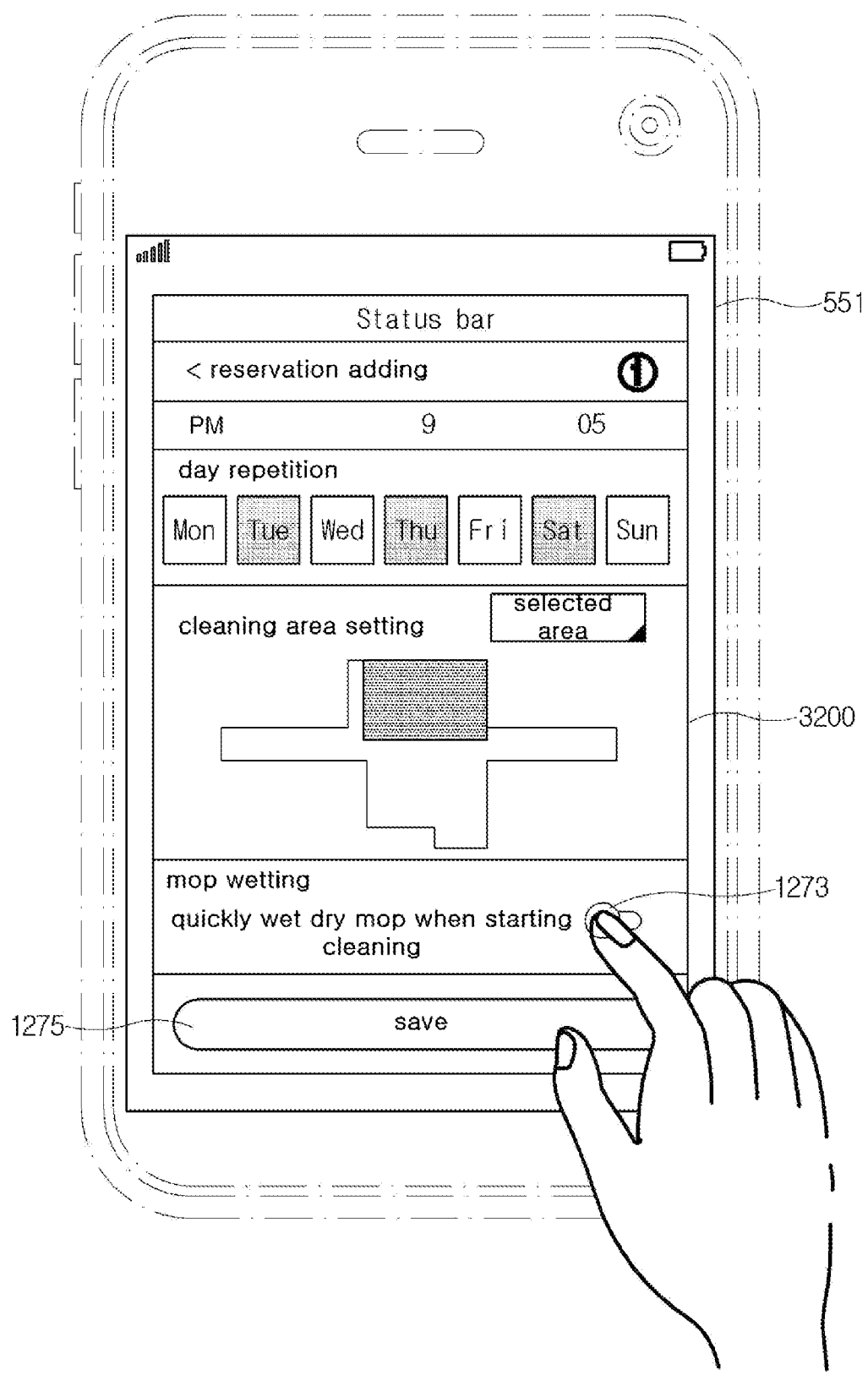

[FIG. 14d]
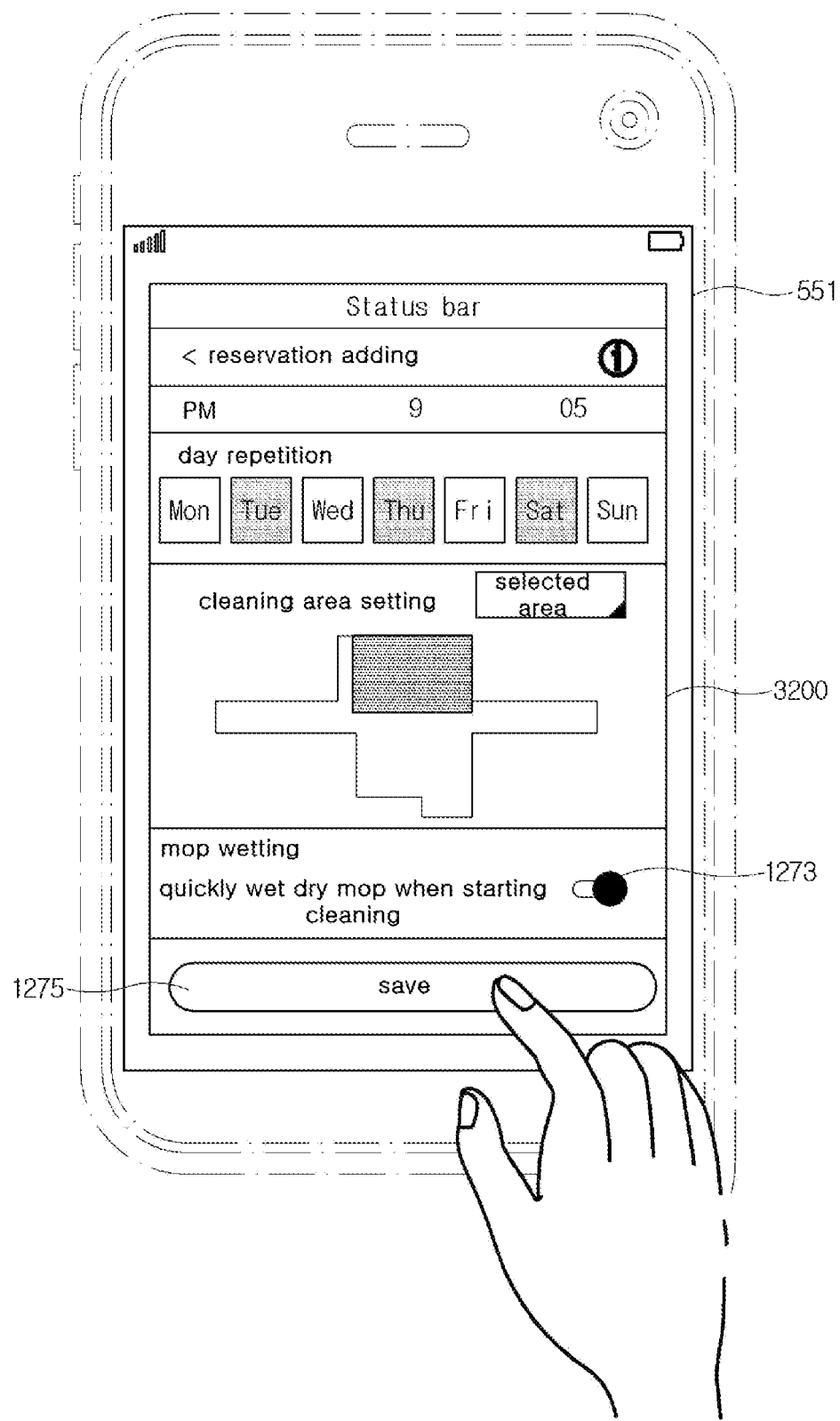

[FIG. 14e]
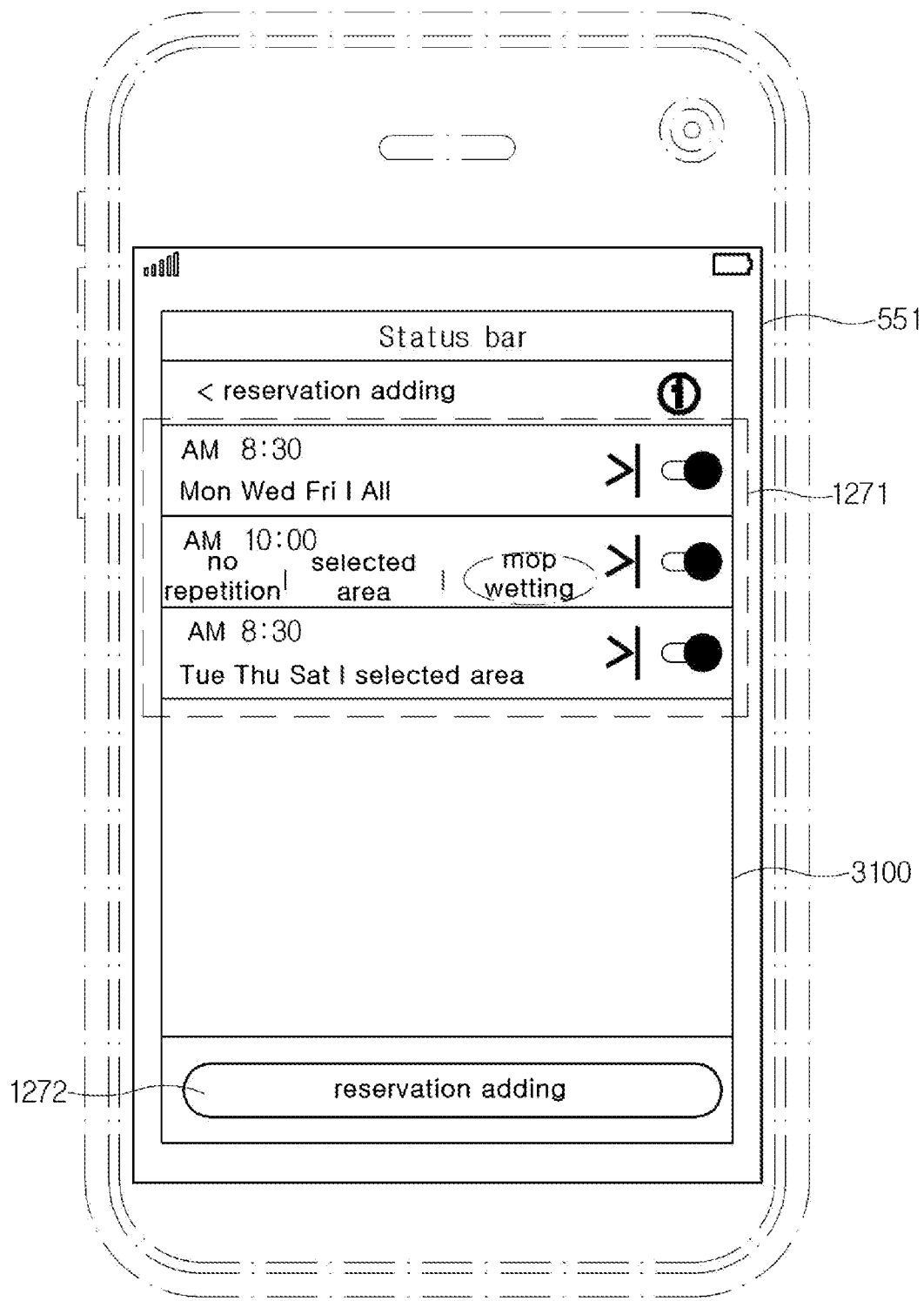

[FIG. 15]
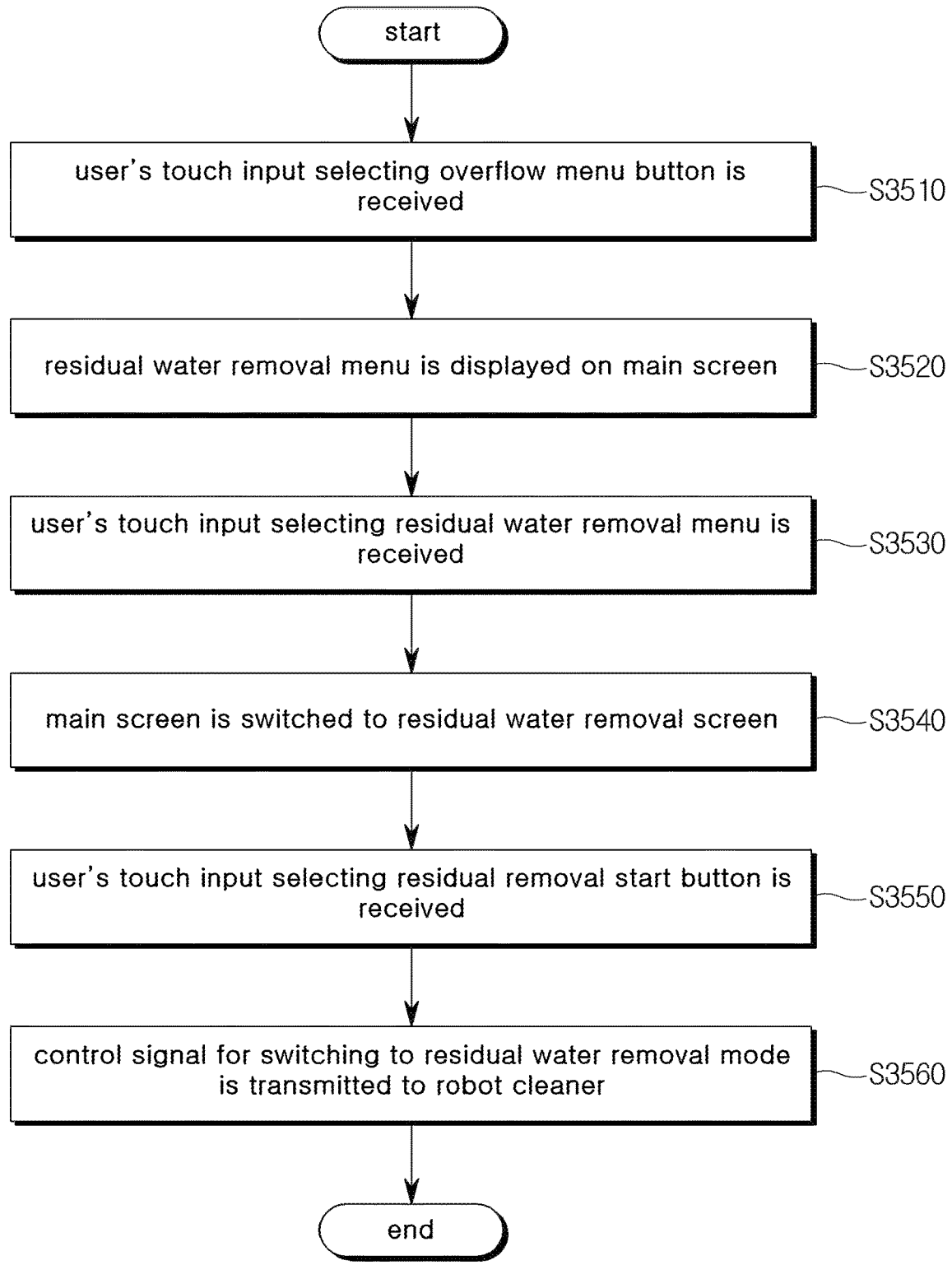

[FIG. 16a]
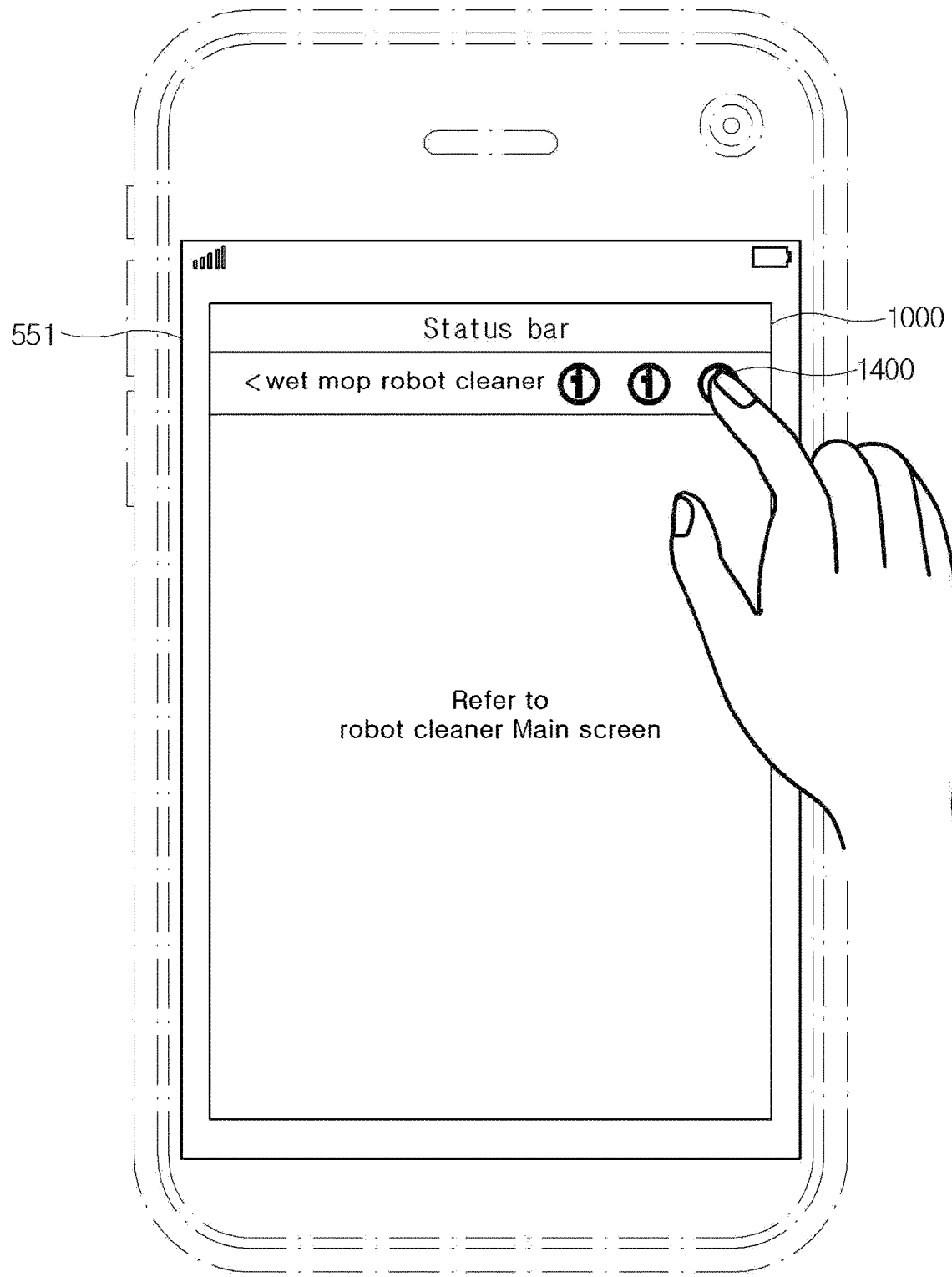

[FIG. 16b]
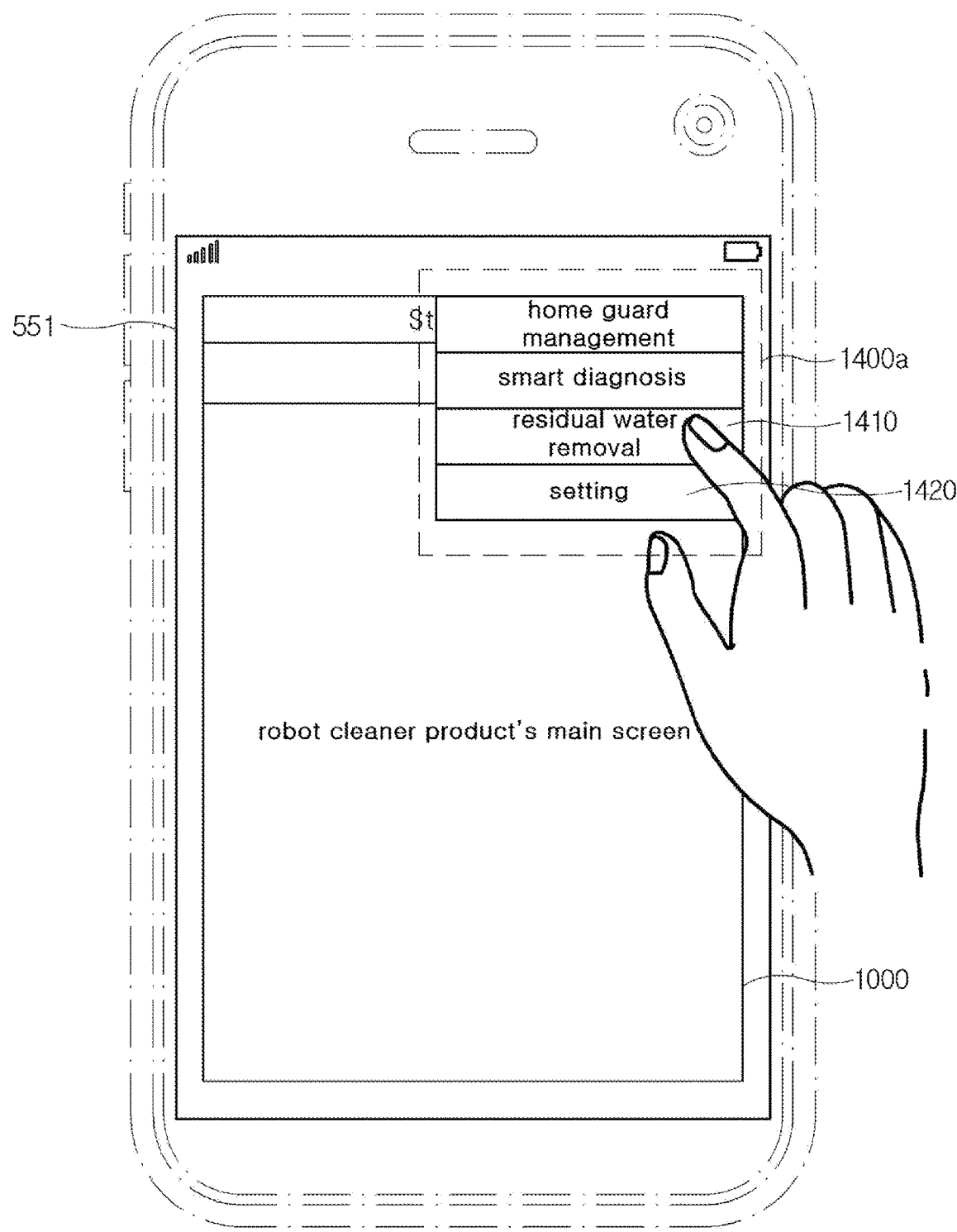

[FIG. 16c]
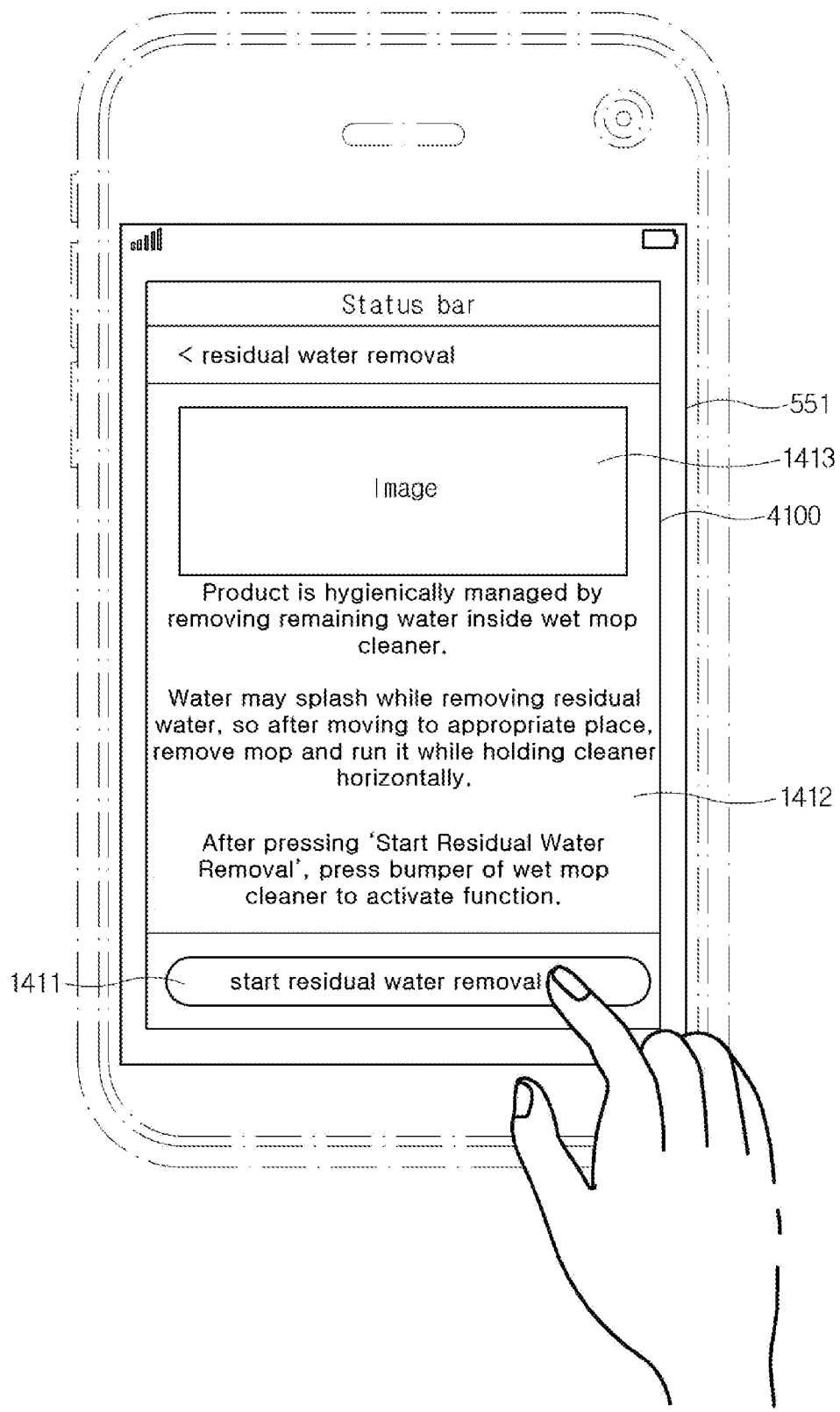

[FIG. 16d]
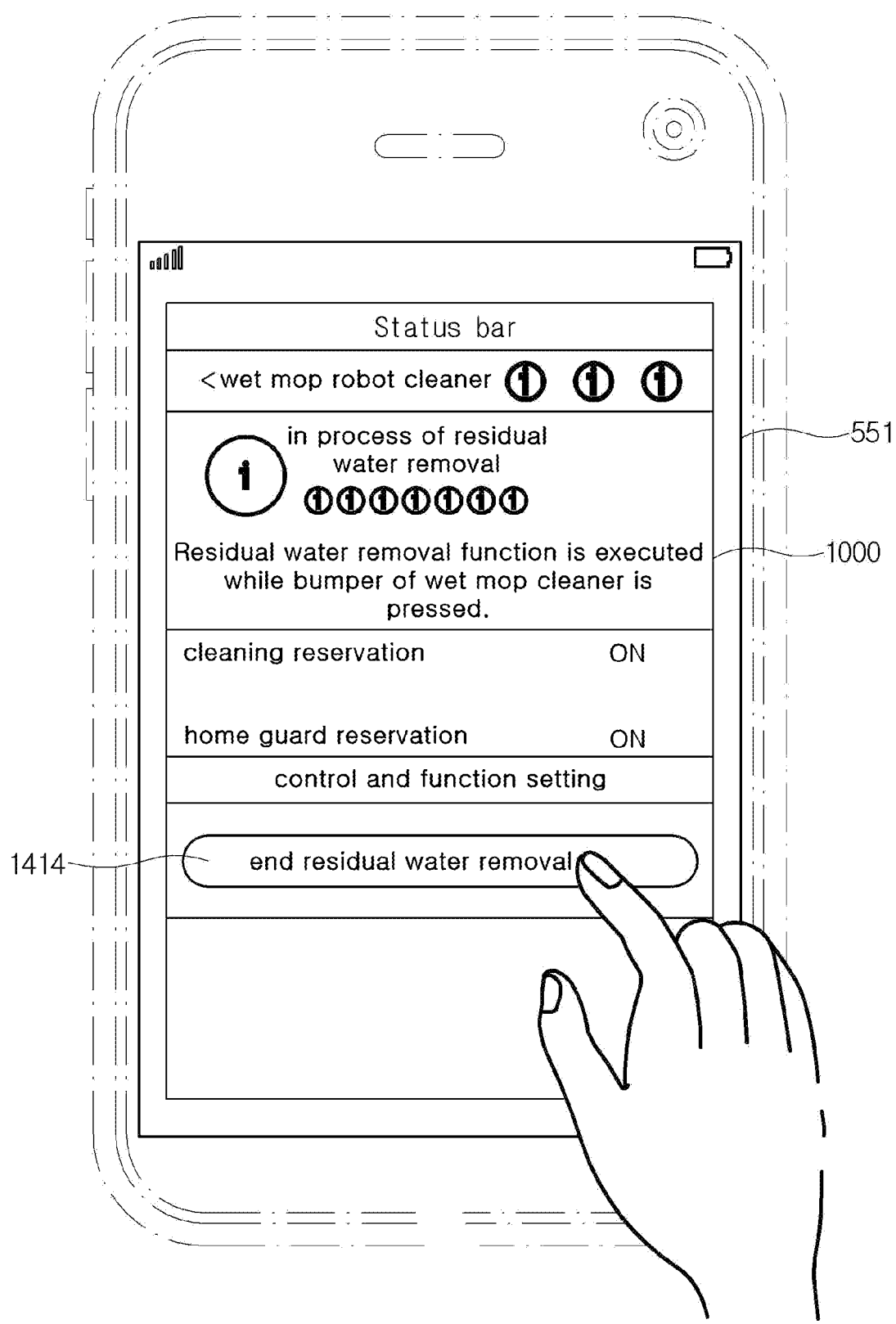

[FIG. 16e]
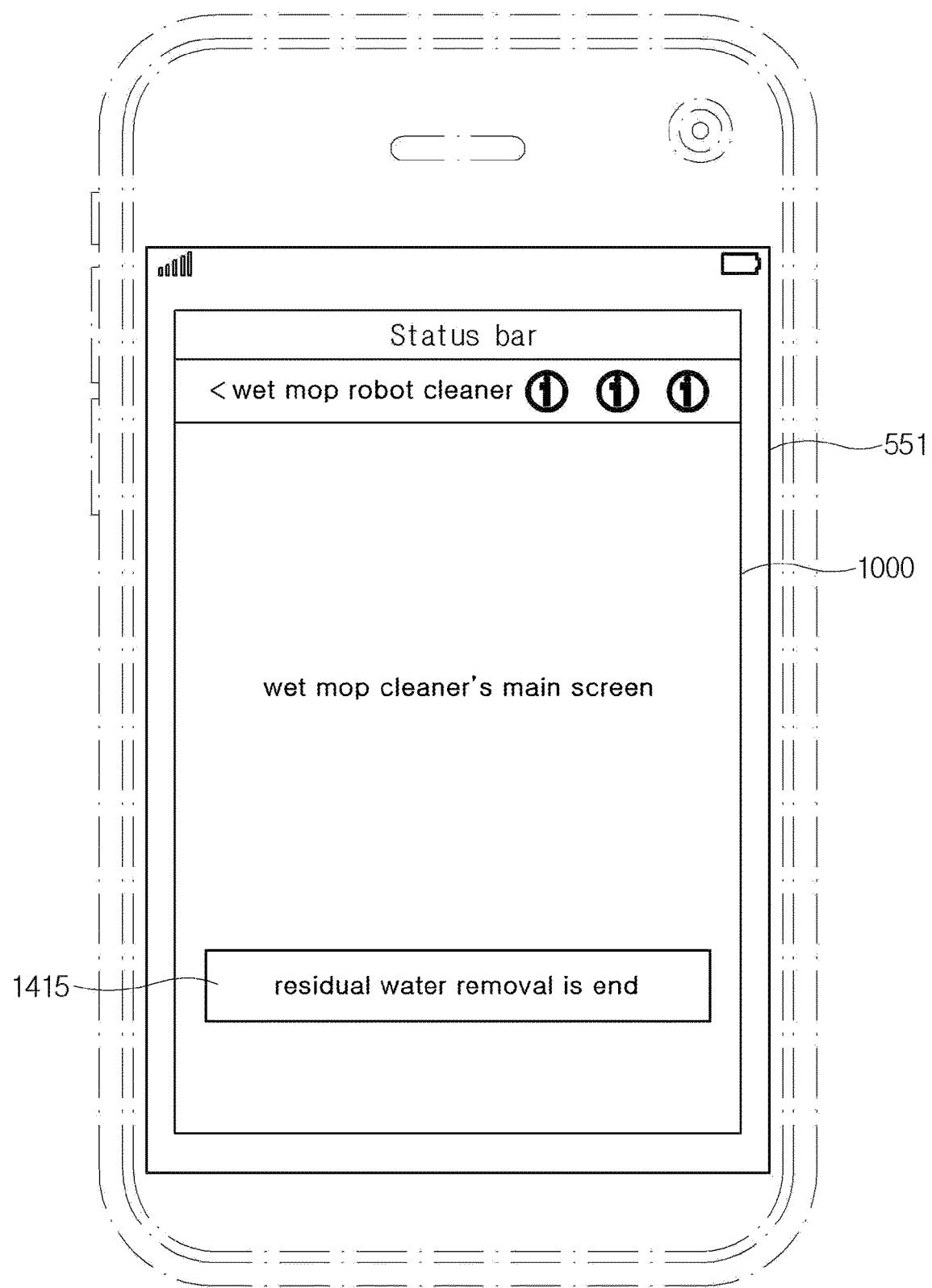

[FIG. 17]
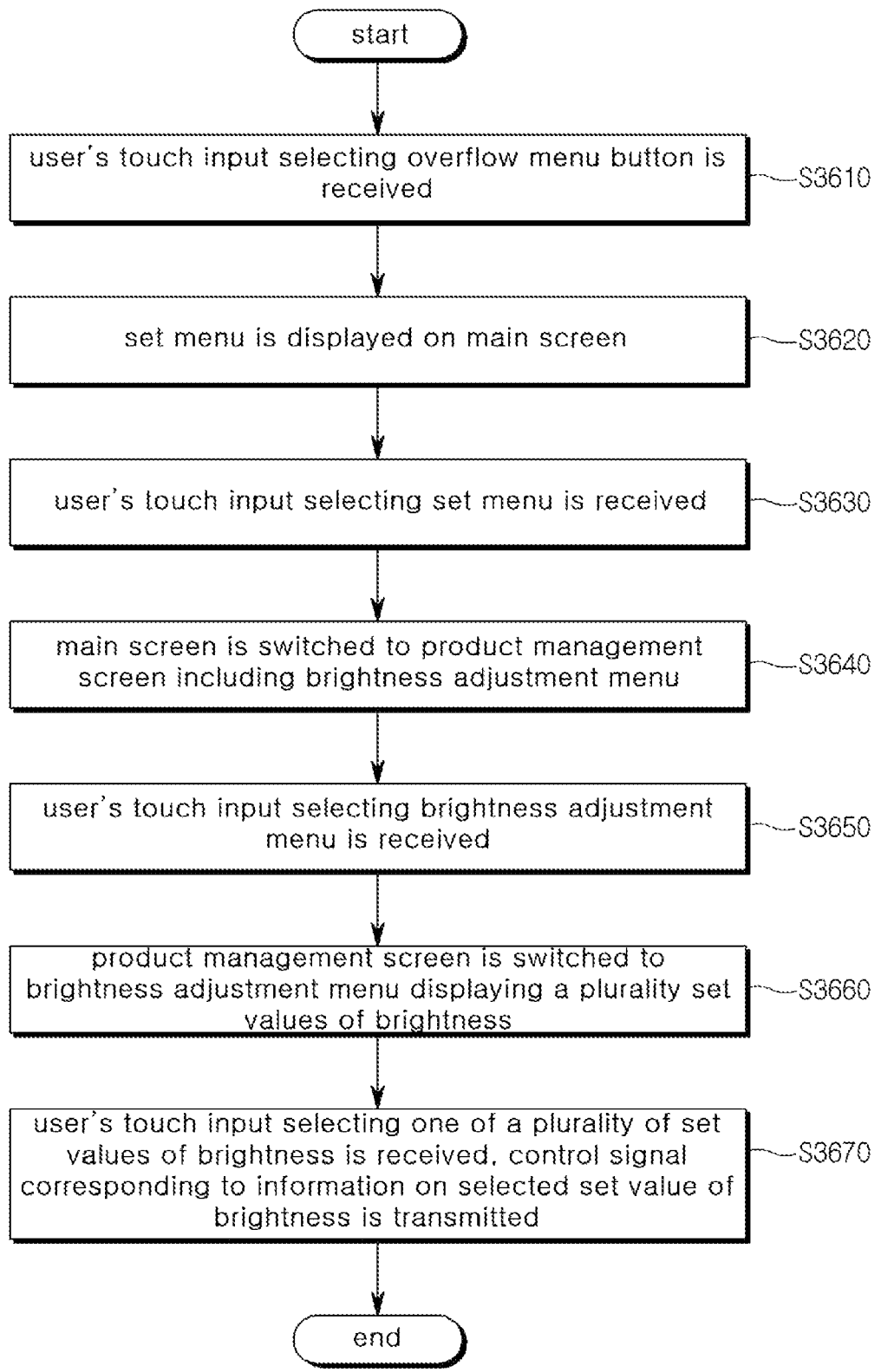

[FIG. 18a]
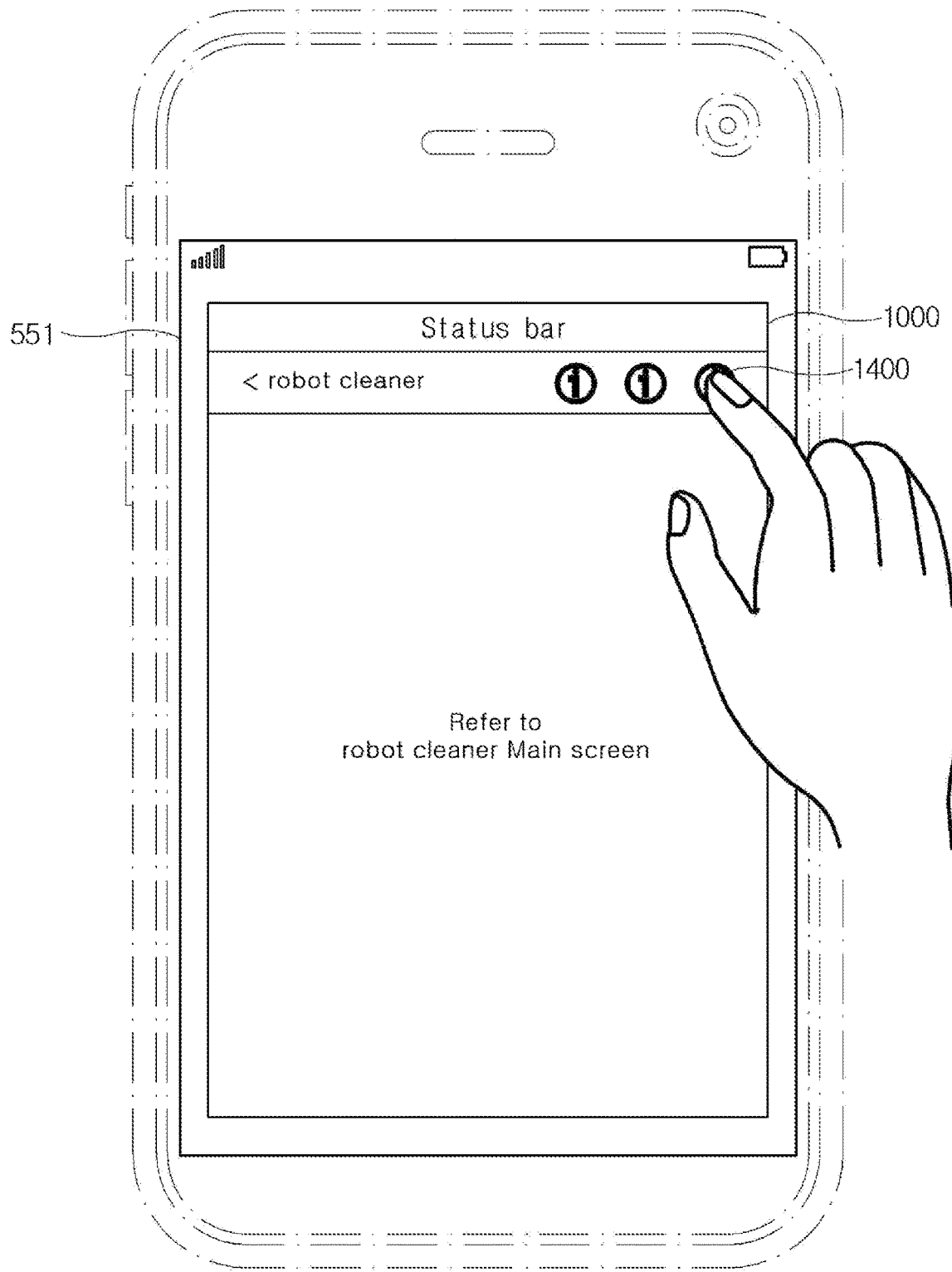

[FIG. 18b]
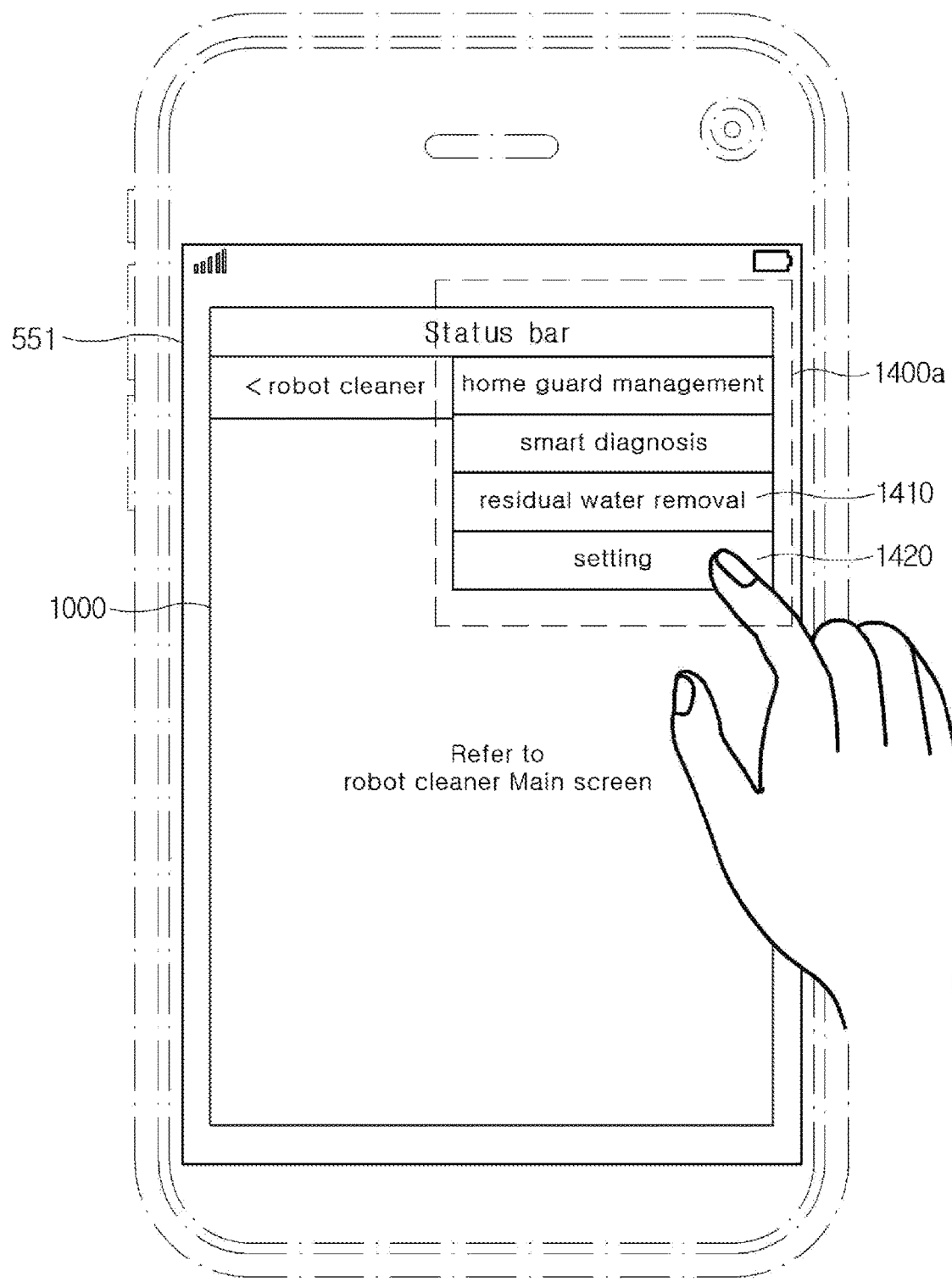

[FIG. 18c]
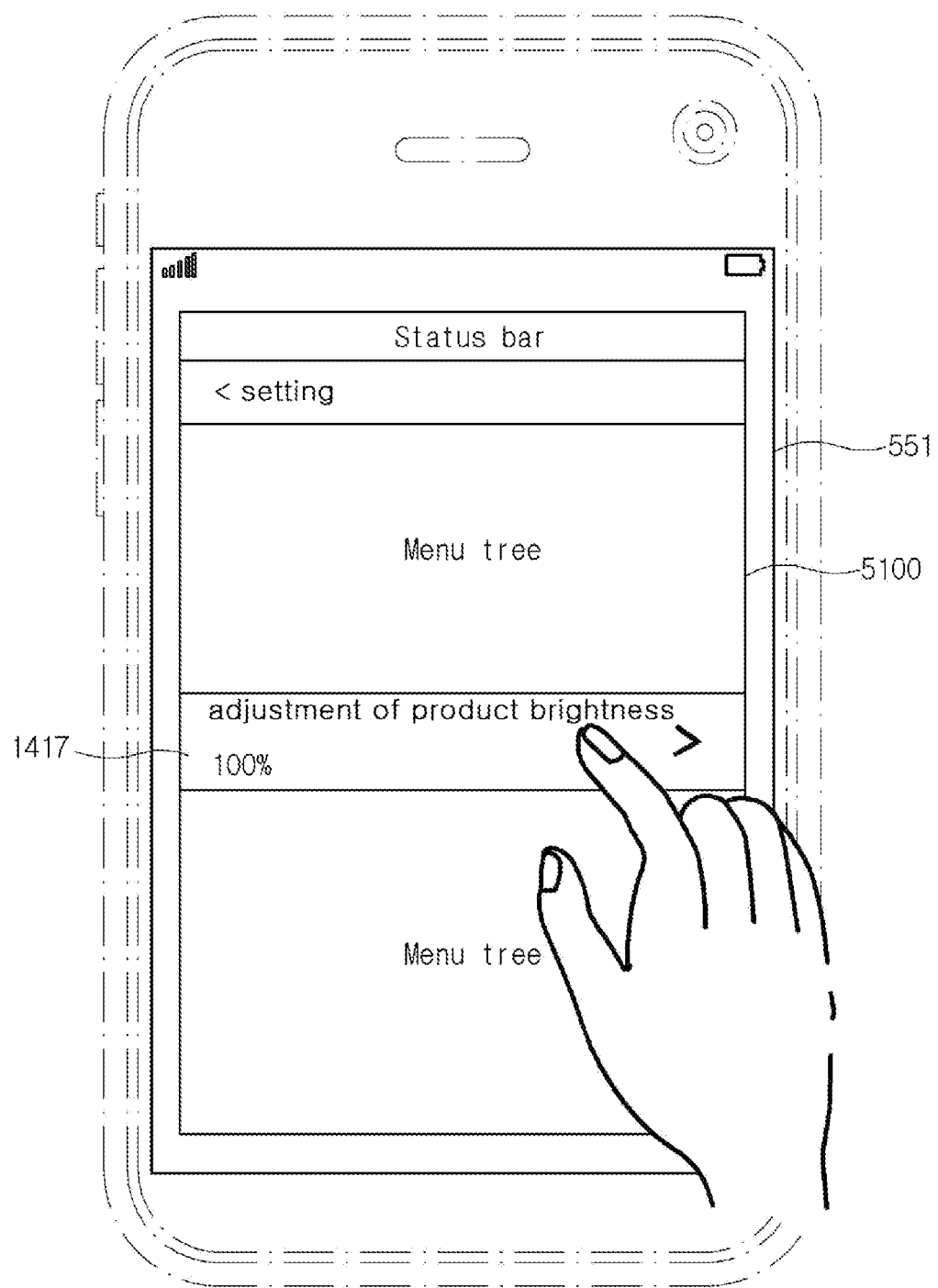

[FIG. 18d]
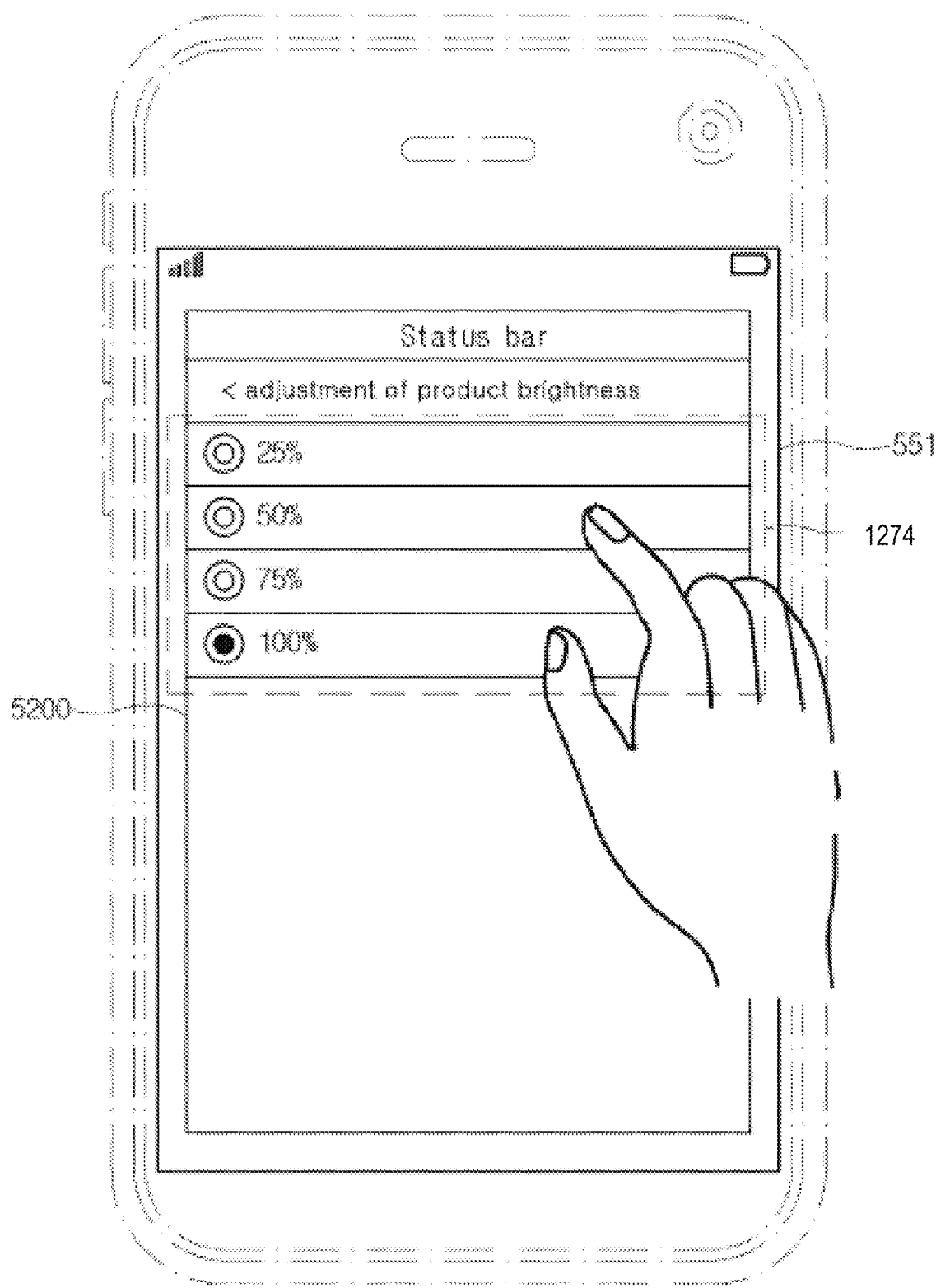

[FIG. 18e]
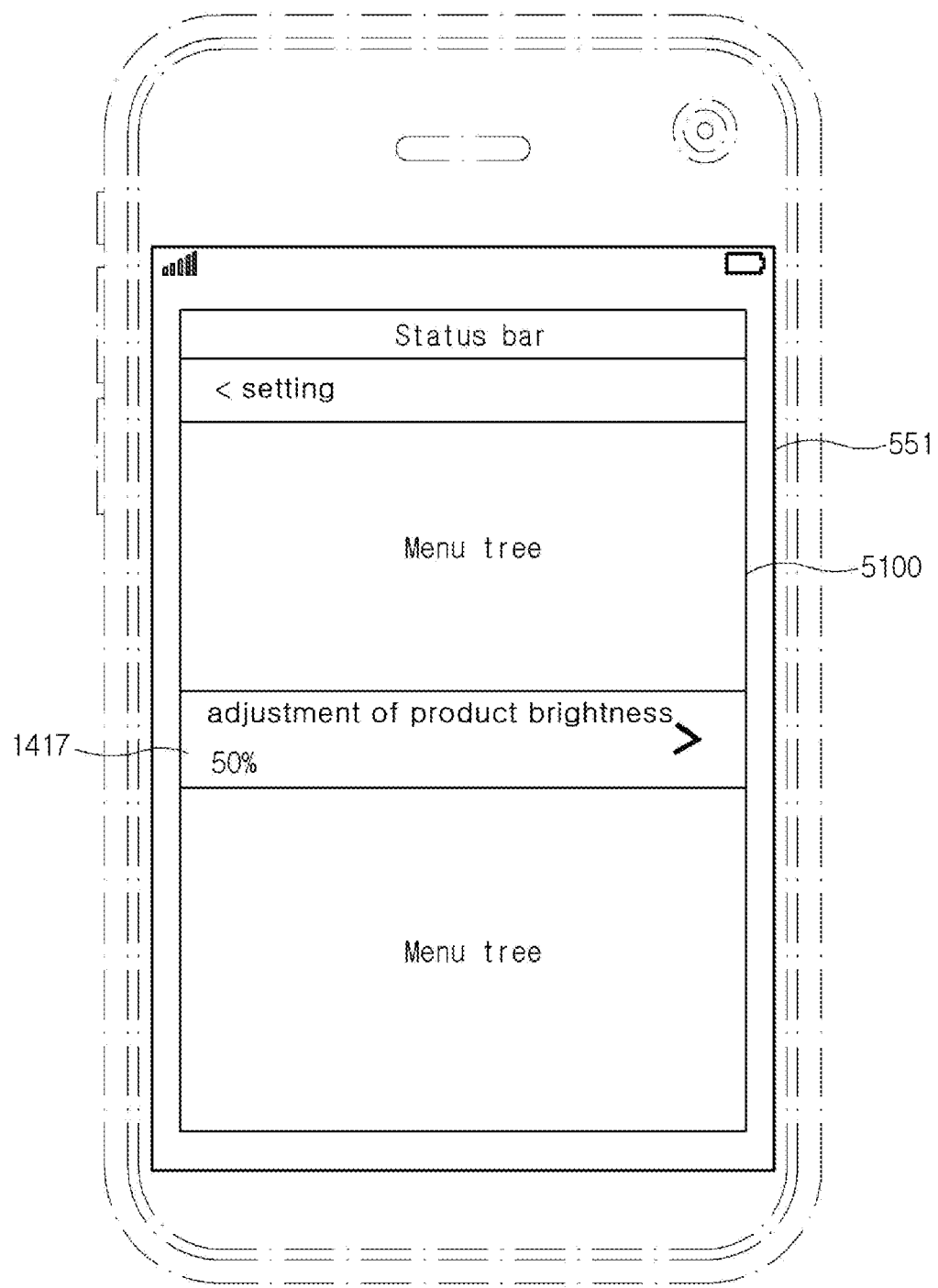

[FIG. 19]
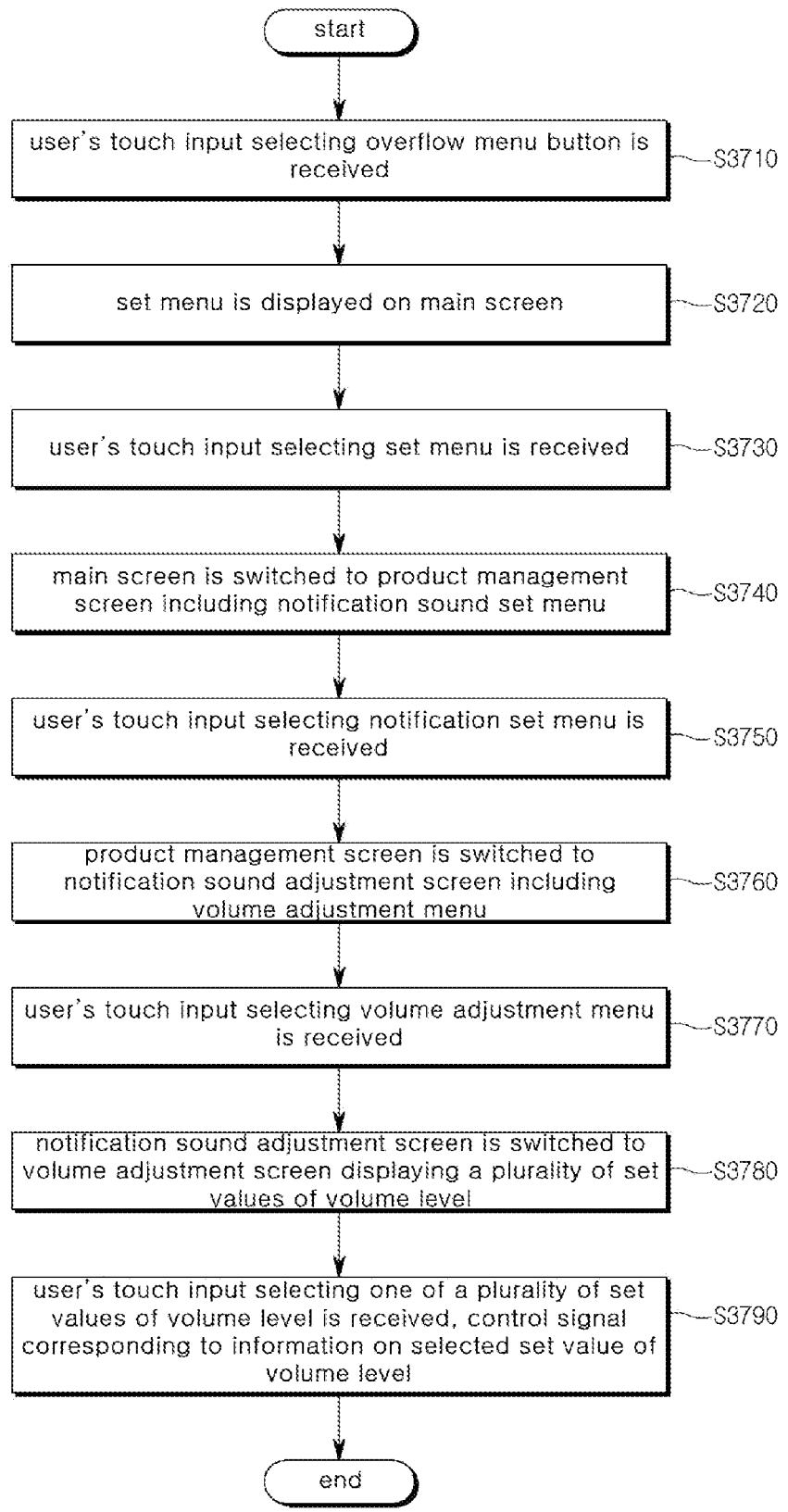

[FIG. 20a]
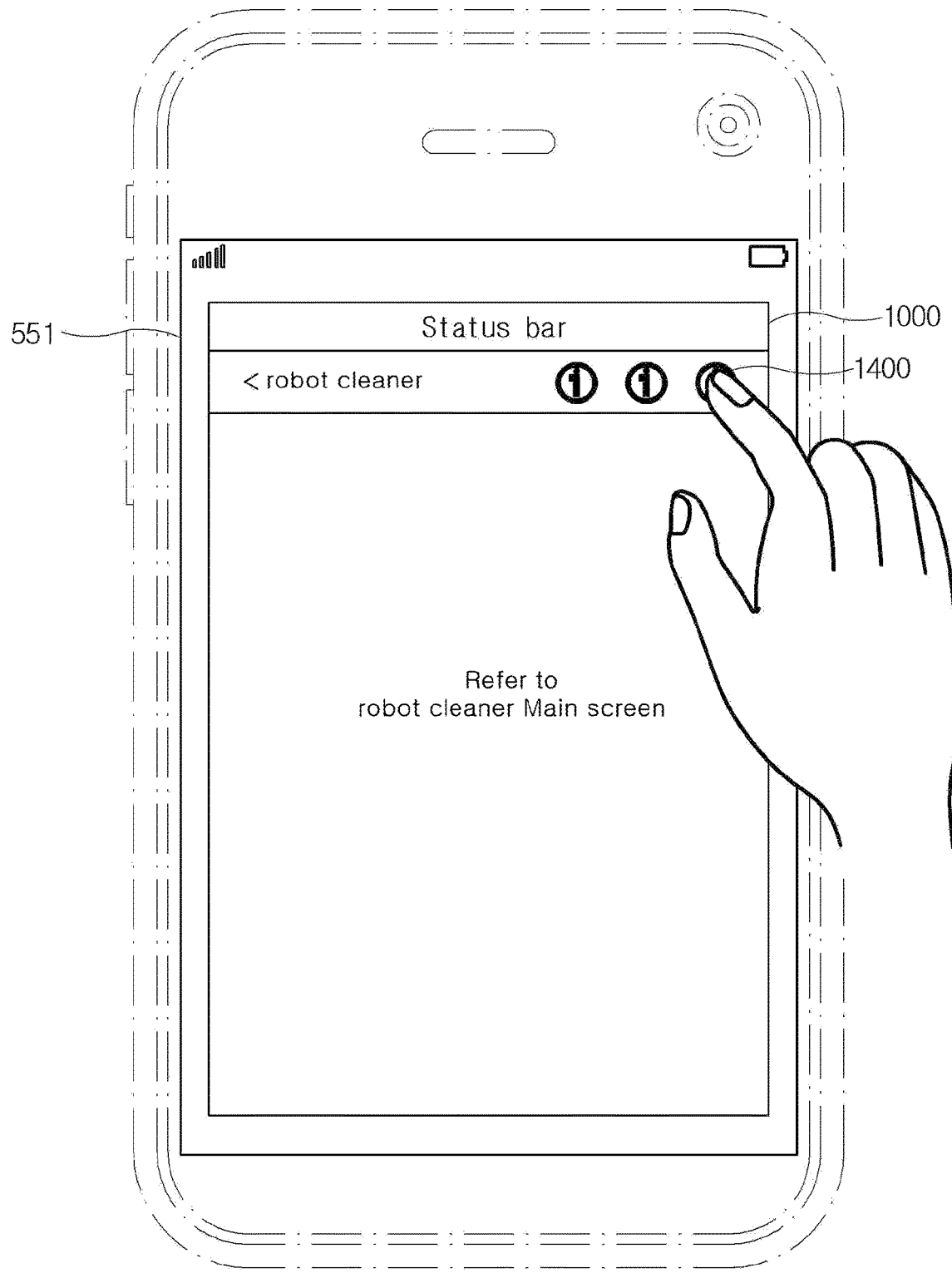

[FIG. 20b]
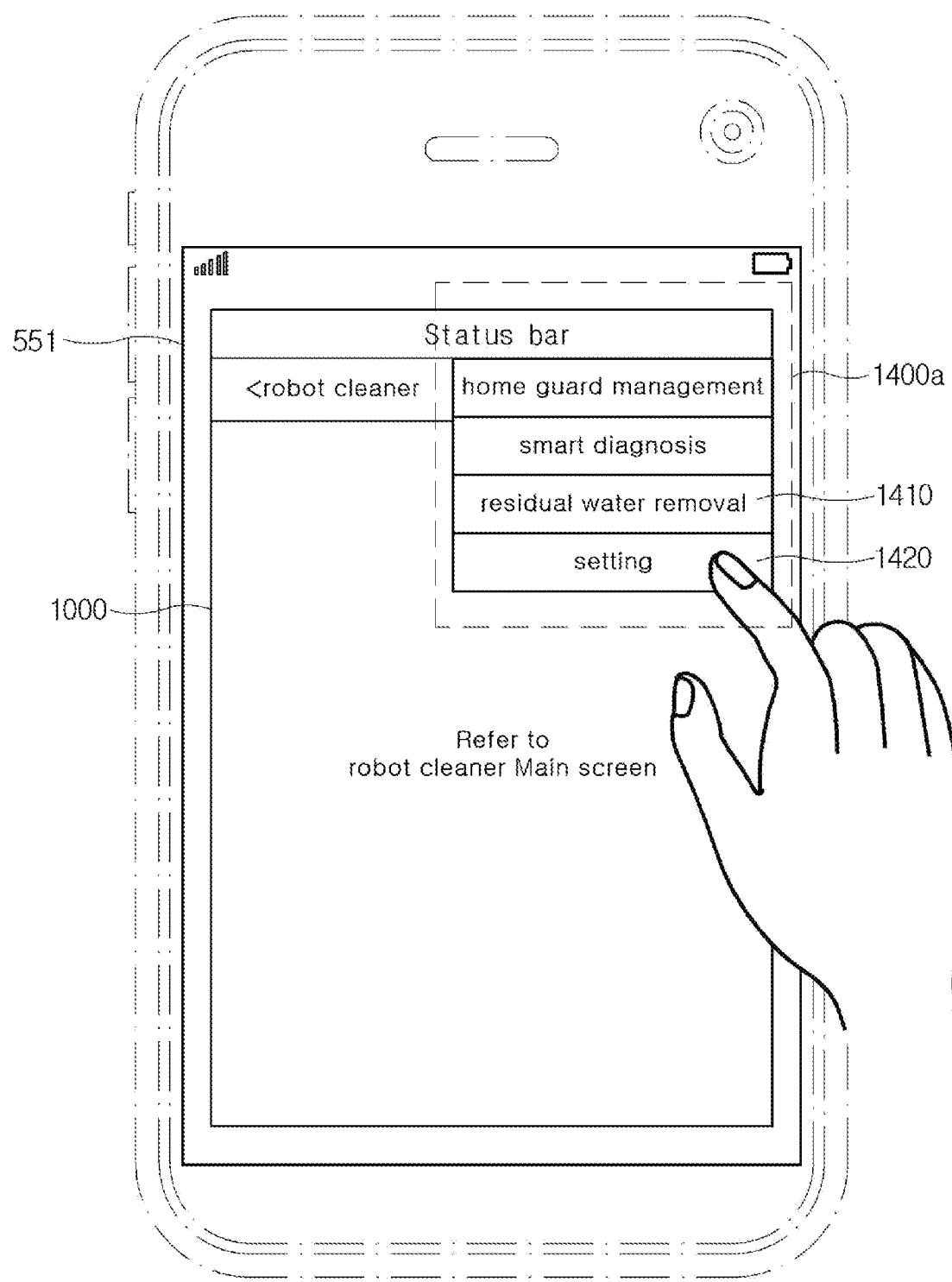

[FIG. 20c]
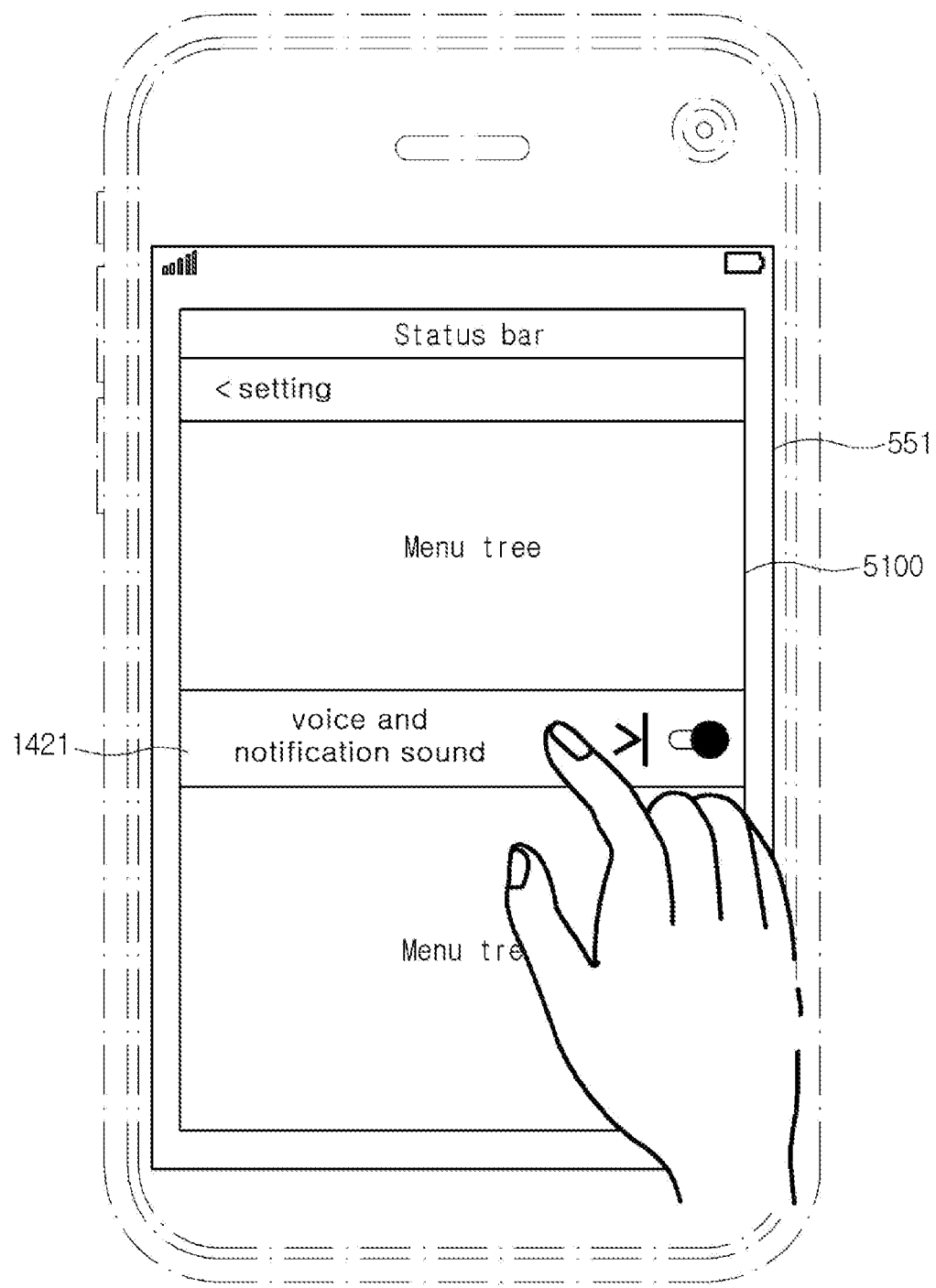

[FIG. 20d]
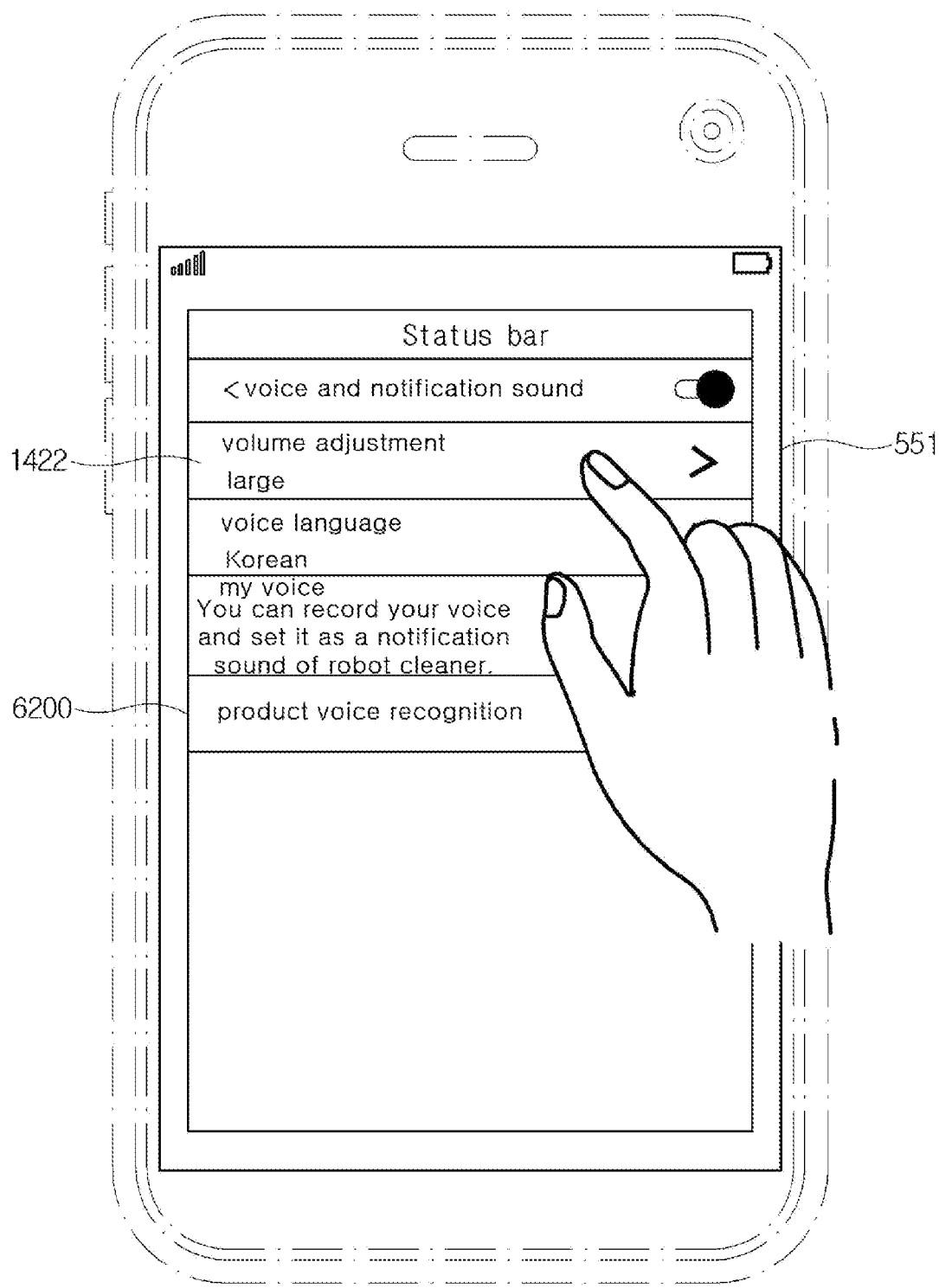

[FIG. 20e]
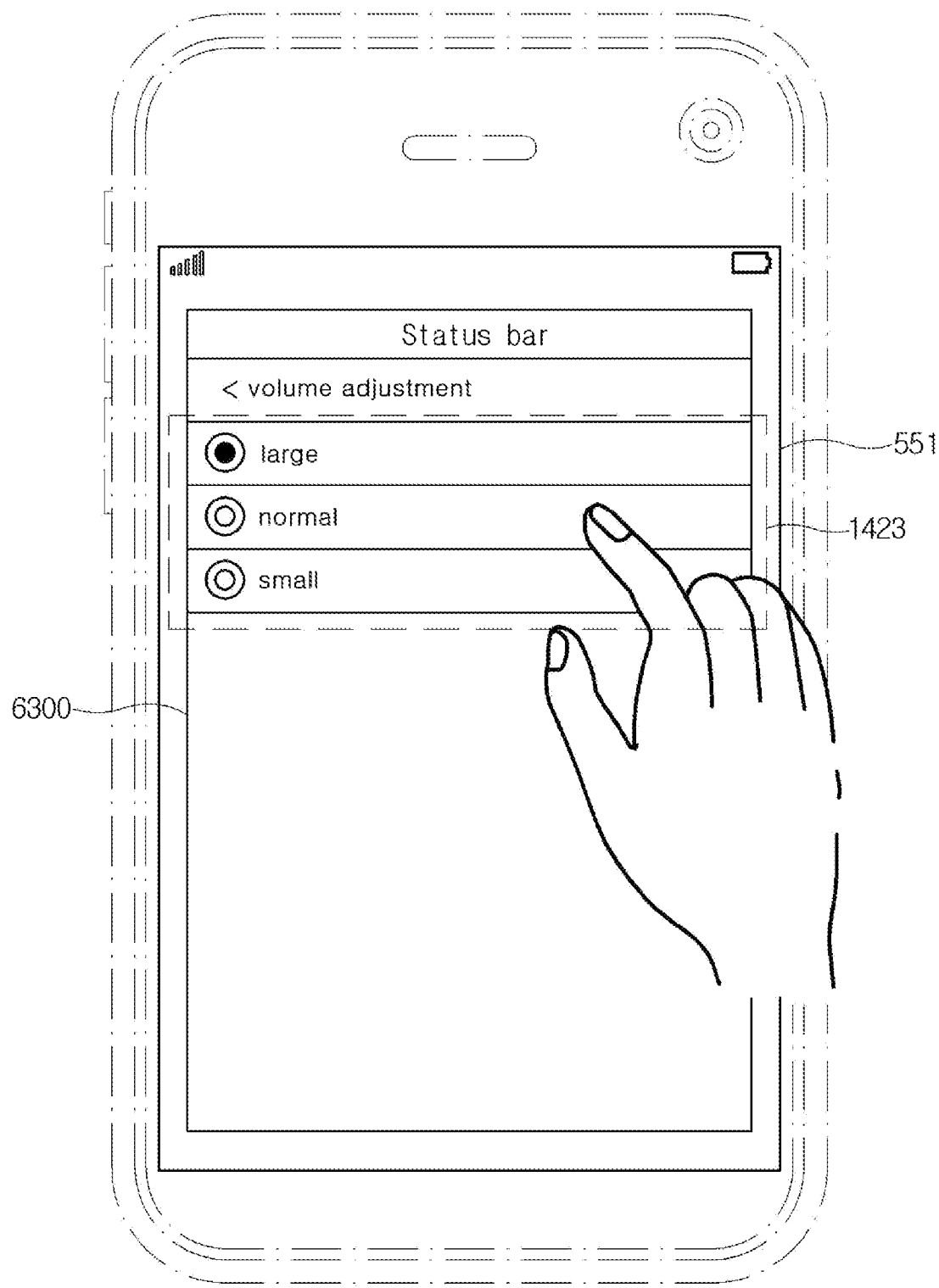

[FIG. 20f]
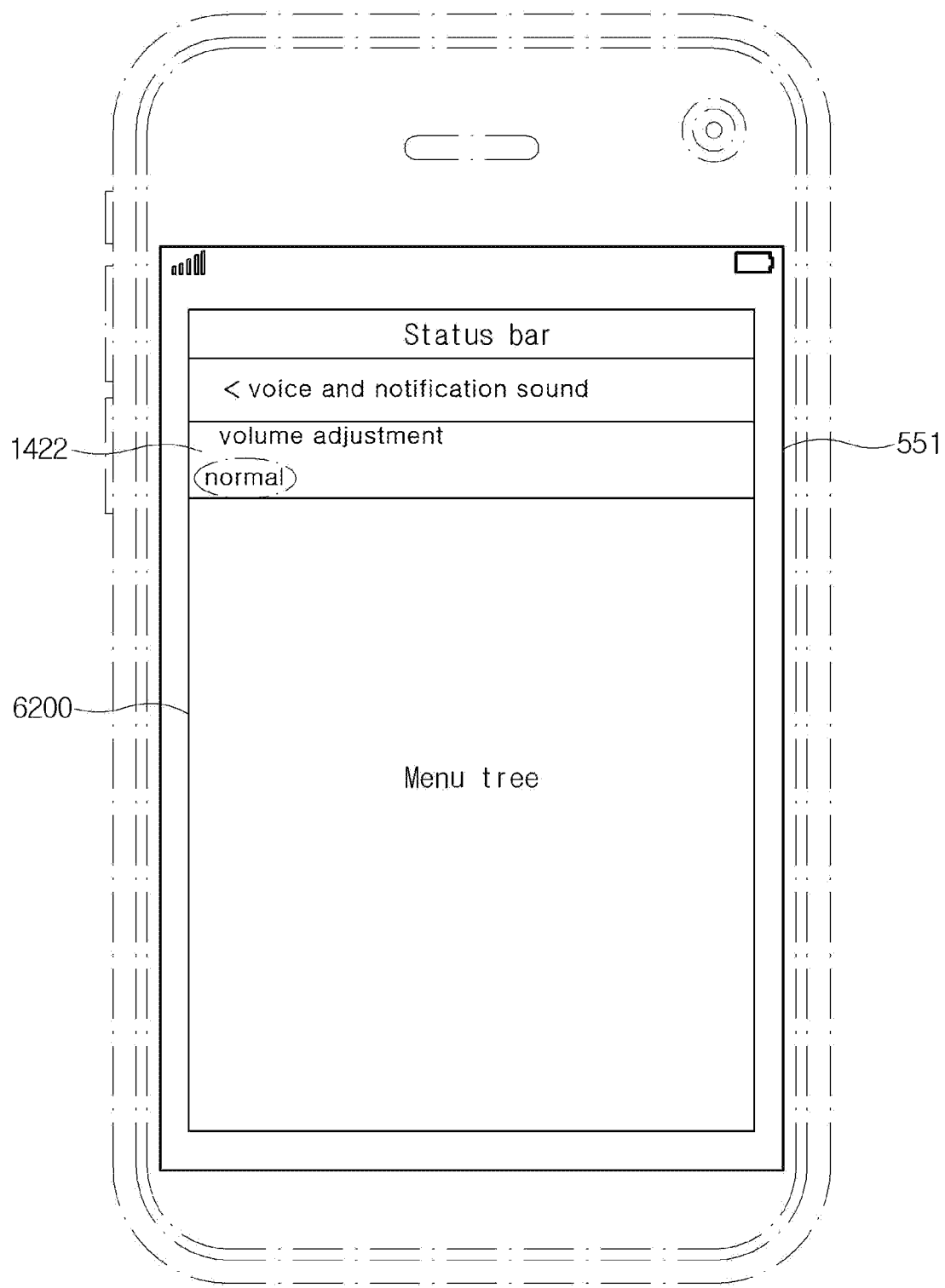

CONTROL DEVICE OF ROBOT CLEANER

CROSS-REFERENCE TO RELATED APPLICATION(S)

This application claims priority under 35 U.S.C. § 119 to Korean Application No. 10-2020-0080836 filed on Jul. 1, 2020, whose entire disclosure(s) is/are hereby incorporated by reference.

TECHNICAL FIELD

The present invention relates to a control device for remotely controlling a robot cleaner, and more particularly, to a control device for a robot cleaner that provides a function and a user interface (UI) for enhancing user convenience.

BACKGROUND ART

A robot cleaner is a household robot that autonomously drives on a surface to be cleaned with a certain area and removes dust or foreign substances around it, and according to its function, it is generally classified into a suction-type robot cleaner that sucks dust by vacuum, and a wet-type robot cleaner with a web mop function that wipes the surface to be cleaned using a mop.

On the other hand, the wet robot cleaner (hereinafter referred to as "robot cleaner") having the wet mop function has a water container, and it is configured to supply the water contained in the water container to the mop, and to wipe a floor surface with the moisture mop, thereby effectively removing foreign substance strongly attached to the floor surface.

Such a robot cleaner may be controlled using a button provided on the robot cleaner body, or may be remotely controlled by a user terminal, and the like.

However, in a case in which the robot cleaner is controlled using the button provided on the robot cleaner body, it is not practically easy to mount various control functions on the robot cleaner body. Thus, very limited operations such as only on-off control of starting and pausing of cleaning, returning to a charging station, and the like is possible, and there is a problem that remote control is not possible.

In addition, in a case of remotely controlling through a user terminal, conventionally only a limited user interface is provided, so there is a problem that detailed set values of main functions related to the cleaning operation of the robot cleaner cannot be directly input from a user.

Korean Patent Registration No. 10-1352518 discloses a remote control system of a mobile robot configured to include a mobile robot that receives a control signal, performs a charging command included in the control signal, and transmits a response signal to the control signal, and a terminal device that generates the control signal corresponding to the charging command and transmits it to the mobile robot, and generates and displays a control screen based on the response signal.

However, the screen of the terminal device disclosed in Korean Patent Registration No. 10-1352518, is configured to remotely control only limited functions of patrol, cleaning, and charging operations, and there is a problem that the user cannot directly input detailed settings of the mobile robot.

Korean Patent Registration No. 10-2021827 discloses a cleaner that includes a body, a mop module, and a pump, and is configured to perform autonomous driving while mopping and control the pump of the cleaner to change an amount of the water supplied to the mop module.

However, as the pump control of Korean Patent Registration No. 10-2021827 is performed by the control unit of the cleaner, there is a problem that the amount of water supplied to the mop module cannot be directly input from the user.

Korean Patent Registration No. 10-0619753 discloses a robot cleaner that includes a remote control means that converts call information data for calling the location of the robot cleaner into wireless call information data and transmits it when a call means is pressed by a user. The robot cleaner stays in power saving mode if the residual voltage of a battery drops below a certain voltage during cleaning, receives call information data wirelessly from the remote control means, analyzes the received call information data, and selects and outputs a melody for announcing the location according to the analysis result.

However, the remote control means disclosed in Korean Patent Registration No. 10-0619753 is a remote control that does not have a screen, which is a display means. Thus, there is a problem of not providing an interface through which the user can directly input detailed settings of the robot cleaner or an interface that displays information received from the robot cleaner for checking.

DOCUMENT OF RELATED ART

Patent Document (Patent Literature 1) Korean Patent Registration No. 10-1352518
(Patent Literature 2) Korean Patent Registration No. 10-2021827
(Patent Literature 3) Korean Patent Registration No. 10-0619753

DISCLOSURE

Technical Problem

The control device according to the present invention has an object to provide a control device that can receive a set value for controlling a robot cleaner from a user.

Specifically, it is an object to provide a control device that can set an amount of water supplied to a mop of a robot cleaner through a user input.

In addition, it is an object to provide a control device that can set the height of the cliff detected by a robot cleaner through a user input.

In addition, it is an object to provide a control device that allows a user to easily detect a current location of a robot cleaner when the robot cleaner stops while driving.

In addition, it is an object to provide a control device that can select a function of quickly increasing the moisture content of the mop coupled to a robot cleaner through a user input when the robot cleaner starts a cleaning operation.

In addition, it is an object to provide a control device that can select a function of removing residual water inside a robot cleaner through a user input.

In addition, it is an object to provide a control device that can set the brightness of a display unit of a robot cleaner through a user input.

In addition, it is an object to provide a control device that can set a volume level of a notification sound of a robot cleaner through a user input.

Technical Solution

In order to achieve the above object, the present invention provides a control device which remotely controls a robot cleaner that automatically drives and cleans a floor surface using one or more mops, including a display unit that displays a main screen that receives a control signal for controlling the robot cleaner as a user's touch input, wherein in a first area located at an upper end of the main screen, a status display module that indicates a current operation status of the robot cleaner is arranged, and in a second area located below the first area, a user set module that receives a set value for controlling the robot cleaner through the user's touch input is arranged, and in a third area located between the status display module and the user set module, an operation performing module that operates the robot cleaner through the user's touch input is arranged, and the user set module includes a water supply set unit that receives a set value of target water supply amount to be supplied to the mop from the user.

In this case, the status display module may include at least one of a cleaning mode display unit that indicates a currently set cleaning mode of the robot cleaner, a reservation status display unit that indicates whether or not one or more functions of the robot cleaner are reserved, and a progress time display unit that indicates a total time that the robot cleaner has driven for cleaning.

In addition, the operation performing module may include at least one of a monitoring operation unit that receives a control signal of a monitoring operation in which the robot cleaner monitors a room using an image photographing means provided in the robot cleaner, a cleaning operation unit that receives a control signal of a cleaning operation in which the robot cleaner starts cleaning the floor surface, and a charging operation unit that receives a control signal of a charging operation in which the robot cleaner returns to a charging station.

In addition, the water supply set unit may include a slider in a form of a horizontal bar that is moved by sliding a target point left and right by the user's touch input, the slider may be displayed in a first color from a preset point to a point corresponding to a maximum water supply amount to distinguish it from a second color at other point of the slider, a water supply amount corresponding to a point where the target point stops on the slider may be set as the set value of target water supply amount.

In this case, when the target point slid by the user is located between the preset point and the point corresponding to the maximum water supply amount, the entire slider may be converted to the first color, and a warning message may be displayed at a bottom of the slider.

In addition, when the set value of target water supply amount is set by the user's touch input, a control signal corresponding to information on the set value of target water supply amount may be transmitted to the robot cleaner.

Meanwhile, the user set module may further include a fall prevention sensitivity set unit that receives a set value of cliff height of the robot cleaner from the user, when the fall prevention sensitivity set unit is selected by the user's touch input, a plurality of preset set values of cliff height may be displayed on the main screen.

In this case, when the set value of cliff height is selected by the user's touch input, a control signal corresponding to information on the selected set value of cliff height may be transmitted to the robot cleaner.

Meanwhile, the user set module may further include a location detection unit that searches a current location of the robot cleaner, when the location detection unit is selected by the user's touch input, the main screen may be switched to a cleaner search screen, and a cleaner search button that receives a control signal for searching the current location of the robot cleaner may be displayed on the cleaner search screen.

In this case, when the cleaner search button is selected by the user's touch input, a location where the robot cleaner stops driving may be transmitted from the robot cleaner, and the location where the driving is stopped may be displayed on the cleaner search screen as the current location of the robot cleaner.

Meanwhile, the user set module may further include a cleaning reservation set unit that reserves a cleaning operation of the robot cleaner, when the cleaning reservation set unit is selected by the user's touch input, the main screen may be switched to a reservation list screen including a reservation adding button for reserving the cleaning operation of the robot cleaner and a cleaning operation list of the robot cleaner previously reserved, when the reservation adding button or the cleaning operation list is selected by the user's touch input, the reservation list screen may be switched to a reservation set screen that sets a wet mode of the mop.

In this case, the reservation set screen may include a mop wet button capable of activating or deactivating the wet mode, when the mop wet button is activated by the user's touch input, a control signal for reserving the wet mode to the robot cleaner may be transmitted to the robot cleaner.

Meanwhile, the main screen may include an overflow menu button arranged on an upper right side of the status display module, when the overflow menu button is selected by the user's touch input, a menu list including one or more menus may be displayed on the main screen, the menu list may include a residual water removal menu, and when the residual water removal menu is selected by the user's touch input, the main screen may be switched to a residual water removal screen for removing residual water inside the robot cleaner.

In this case, a residual water removal start button that receives a control signal for switching the robot cleaner to a residual water removal mode may be displayed on the residual water removal screen, when the residual water removal start button is selected by the user's touch input, a control signal for switching the robot cleaner to a residual water removal mode capable of discharging the residual water inside the robot cleaner may be transmitted to the robot cleaner.

In addition, the main screen may include an overflow menu button arranged on an upper right side of the status display module, when the overflow menu button is selected by the user's touch input, a menu list including one or more menus may be displayed on the main screen, the menu list may include a set menu, and when the set menu is selected by the user's touch input, the main screen may be switched to a product management screen that receives a set value irrelevant to a cleaning operation of the robot cleaner.

In addition, the product management screen may include a brightness adjustment menu that receives a set value of brightness of a display unit provided in the robot cleaner to provide information to the user, and a notification sound set menu that receives a set value of notification sound transmitted from the display unit.

In this case, when the brightness adjustment menu is selected by the user's touch input, the product management screen may be switched to a brightness adjustment screen for selecting the brightness of the display unit of the robot cleaner, the brightness adjustment screen may display a plurality of preset set values of brightness selectable by the user, when one brightness of the plurality of set values of brightness is selected by the user's touch input, a control signal corresponding to the selected set value of brightness may be transmitted to the robot cleaner.

In addition, when the notification sound set menu is selected by the user's touch input, the product management screen may be switched to a notification sound adjustment screen, and the notification sound adjustment screen may include a volume adjustment menu, when the volume adjustment menu is selected by the user's touch input, the notification sound adjustment screen may be switched to a volume adjustment screen for selecting a volume level of the notification sound transmitted from the robot cleaner, the volume adjustment screen may display a plurality of preset set values of volume levels selectable by the user, when any one set value of volume level is selected from the plurality of set values of volume levels by the user's touch input, a control signal corresponding to the selected set value of volume level may be transmitted to the robot cleaner.

Advantageous Effect

The control device according to the present invention may increase user convenience by providing various user interfaces through which a set value for controlling a robot cleaner may be input.

Specifically, since the control device according to the present invention includes a water supply set unit as a user interface, it is possible to set the water supply amount to be supplied to the mop of a robot cleaner by a user input, thereby increasing user convenience in controlling the robot cleaner.

In addition, since the control device according to the present invention includes a fall prevention sensitivity set unit as a user interface, it is possible to set the height of the cliff detected by the robot cleaner by a user input, thereby increasing user convenience in controlling the robot cleaner.

In addition, since the control device according to the present invention includes a location detection unit as a user interface, when the robot cleaner stops while driving, the user can easily detect the current location of the robot cleaner, thereby increasing user convenience in controlling the robot cleaner.

In addition, since the control device according to the present invention includes a cleaning reservation set unit that can reserve a wet mop mode as a user interface, it can quickly increase the moisture content of the mop coupled to the robot cleaner by a user input when the robot cleaner starts the cleaning operation, thereby increasing user convenience in controlling the robot cleaner.

In addition, since the control device according to the present invention includes a residual water removal menu as a user interface, it is possible to perform an operation to remove the residual water of a robot cleaner by a user input, thereby increasing user convenience in controlling the robot cleaner.

In addition, since the control device according to the present invention includes a brightness adjustment menu as a user interface, it is possible to set a brightness of a display unit of a robot cleaner by a user input, thereby increasing user convenience in controlling the robot cleaner.

In addition, since the control device according to the present invention includes a volume level adjustment menu as a user interface, it is possible to set a volume level of a display unit of a robot cleaner by a user input, thereby increasing user convenience in controlling the robot cleaner.

DESCRIPTION OF DRAWINGS

FIG. 1 is a conceptual view of a robot cleaner system including a control device according to an embodiment of the present invention.

FIG. 2a is a perspective view illustrating the robot cleaner of FIG. 1.

FIG. 2b is a view illustrating a partially separated configuration of the robot cleaner of FIG. 1.

FIG. 2c is a rear view of the robot cleaner of FIG. 1.

FIG. 2d is a bottom view of the robot cleaner of FIG. 1.

FIG. 2e is an exploded perspective view of the robot cleaner of FIG. 1.

FIG. 2f is an internal cross-sectional view of the robot cleaner of FIG. 1.

FIG. 3 is a block diagram of the robot cleaner of FIG. 1.

FIG. 4 is an internal block diagram of a control device according to an embodiment of the present invention.

FIG. 5 is a flowchart of a method of controlling the robot cleaner of FIG. 1 using a control device according to an embodiment of the present invention.

FIG. 6 is a view illustrating an arrangement structure of a main screen displayed through a display unit of a control device according to an embodiment of the present invention.

FIG. 7 is a flowchart of a method of transmitting a control signal to a robot cleaner based on a user's touch input selecting a water supply set unit on the main screen of FIG. 6.

FIG. 8a and FIG. 8b are views for explaining in detail an embodiment related to a user's touch input selecting a water supply set unit on the main screen of FIG. 6.

FIG. 9 is a flowchart of a method of transmitting a control signal to a robot cleaner based on a user's touch input selecting a fall prevention sensitivity set unit on the main screen of FIG. 6.

FIGS. 10a to 10c are views for explaining in detail an embodiment related to a user's touch input selecting a fall prevention sensitivity set unit on the main screen of FIG. 6.

FIG. 11 is a flowchart of a method of transmitting a control signal to a robot cleaner based on a user's touch input selecting a location detection unit on the main screen of FIG. 6.

FIG. 12a and FIG. 12b are views for explaining in detail an embodiment related to a user's touch input selecting a location detection unit on the main screen of FIG. 6.

FIG. 13 is a flowchart of a method for setting a wet mode in a robot cleaner.

FIGS. 14a to 14e are views for explaining in detail an embodiment of setting a wet mode in a robot cleaner by a user's touch input.

FIG. 15 is a flowchart of a method of setting a residual water removal mode in a robot cleaner.

FIGS. 16a to 16e are views for explaining in detail an embodiment of setting a residual water removal mode in a robot cleaner by a user's touch input.

FIG. 17 is a flowchart of a method of setting a brightness of a display unit of a robot cleaner.

FIGS. 18a to 18e are views for explaining in detail an embodiment of setting a brightness of a display unit of a robot cleaner by a user's touch input.

FIG. 19 is a flowchart of a method of setting a volume level of a robot cleaner.

FIGS. 20a to 20f are views for explaining in detail an embodiment of setting a volume level of a robot cleaner by a user's touch input.

MODE OF INVENTION

Hereinafter, preferred embodiments of the present invention will be described in detail with reference to the accompanying drawings.

Since the present invention can have various changes and can have various embodiments, specific embodiments are illustrated in the drawings and will be described in detail in the detailed description. This is not intended to limit the present invention to a specific embodiment, it should be construed to include all modifications, equivalents and substitutes included in the spirit and scope of the present invention.

In describing the present invention, terms such as first and second may be used to describe various components, but the components may not be limited by the terms. The above terms are only for the purpose of distinguishing one component from another. For example, without departing from the scope of the present invention, a first component may be referred to as a second component, and similarly, a second component may also be referred to as a first component.

The term "and/or" may include a combination of a plurality of related listed items or any of a plurality of related listed items.

When a component is referred to as being "connected" or "contacted" to another component, it may be directly connected or contacted to the other component, but it may be understood that other components may exist in between. On the other hand, when it is mentioned that a certain element is "directly connected" or "directly contacted" to another element, it may be understood that the other element does not exist in the middle.

The terms used in the present application are only used to describe specific embodiments, and are not intended to limit the present invention. The singular expression may include the plural expression unless the context clearly dictates otherwise.

In the present application, terms such as "comprise" or "have" are intended to designate that a feature, number, step, operation, component, part, or combination thereof described in the specification exists, and it may be understood that the presence or addition of one or more other features, numbers, steps, operations, components, parts, or combinations thereof is not precluded in advance.

Unless defined otherwise, all terms used herein, including technical or scientific terms, may have the same meaning as commonly understood by one of ordinary skill in the art to which this invention belongs. Terms such as those defined in a commonly used dictionary may be interpreted as having a meaning consistent with the meaning in the context of the related art, and unless explicitly defined in the present application, it may not be interpreted in an ideal or excessively formal meaning.

In addition, the following embodiments are provided to more completely explain to those with average knowledge in the art, and the shapes and sizes of elements in the drawings may be exaggerated for clearer explanation.

FIG. 1 is a conceptual view of a robot cleaner system including a control device according to an embodiment of the present invention.

Referring to FIG. 1, a robot cleaner system includes a robot cleaner 1 and a control device 5 for remotely controlling the robot cleaner.

Here, the robot cleaner 1 autonomously drives and cleans a surface to be cleaned of an internal space in which the robot cleaner 1 itself is installed.

The robot cleaner 1 is installed in the internal space of a house and configured to move according to a preset pattern or a command designated/input by a user to perform a cleaning operation to clean a floor surface, which is the surface to be cleaned, and to perform short-range wireless communication.

The robot cleaner 1 may be remotely controlled by the control device 5.

In this case, the control device 5 is a portable wireless communication electronic device. For example, the control device 5 may be a mobile phone, a PDA, a laptop, a digital camera, a game machine, an e-book, and the like. In addition, the control device 5 may support short-range communication corresponding to the short-range communication of the robot cleaner 1.

Hereinafter, the robot cleaner 1 controlled based on the control signal transmitted from the control device 5 of the present invention will be described in detail with reference to the structural views shown in FIGS. 2a to 2f and the block diagram shown in FIG. 3.

FIGS. 2a to 2f are structural views for explaining the structure of the robot cleaner 1 of FIG. 1.

More specifically, FIG. 2a is a perspective view showing a robot cleaner, FIG. 2b is a view illustrating a partially separated configuration of the robot cleaner, FIG. 2c is a rear view of the robot cleaner, FIG. 2d is a bottom view of the robot cleaner, FIG. 2e is an exploded perspective view of the robot cleaner, and FIG. 2f is an internal cross-sectional view of the robot cleaner.

The robot cleaner 1 is placed on a floor and moved along a floor surface B to clean the floor using a mop. Accordingly, in the following description, a vertical direction is determined based on the state in which the robot cleaner 1 is placed on the floor.

And, based on a first rotation plate 10 and a second rotation plate 20, a side to which a first lower sensor 123, which will be described later, is coupled is set as a front side.

The 'lowest part' of each configuration described in the present invention may be the lowest-positioned part in each configuration when the robot cleaner 1 is placed on the floor for using, or may be a part closest to the floor.

The robot cleaner 1 may include a body 50, a first rotation plate 10, a second rotation plate 20, a first mop 30 and a second mop 40.

The body 50 may form the overall outer shape of the robot cleaner 1 or may be formed in the form of a frame. Each component constituting the robot cleaner 1 may be coupled to the body 50, and some components constituting the robot cleaner 1 may be accommodated in the body 50. The body 50 can be divided into a lower body 50a and an upper body 50b, and the components of the robot cleaner 1 can be provided in a space in which the lower body 50a and the upper body 50b are coupled to each other. (Refer to FIG. 2e).

The first rotation plate 10 is made to have a predetermined area, and is formed in the form of a flat plate, a flat frame and the like. The first rotation plate 10 is generally laid horizontally, and thus, the width (or diameter) in the horizontal direction is sufficiently larger than the vertical height. The first rotation plate 10 coupled to the body 50 may be parallel to the floor surface B, or may form an inclination with the floor surface B. The first rotation plate 10 may be formed in a circular plate shape, the bottom surface of the first rotation plate 10 may be generally circular, and the first rotation plate 10 may be formed in a rotationally symmetrical shape as a whole.

The second rotation plate 20 is made to have a predetermined area, and is formed in the form of a flat plate, a flat frame and the like. The second rotation plate 20 is generally laid horizontally, and thus, the horizontal width (or diameter) is sufficiently larger than the vertical height. The second rotation plate 20 coupled to the body 50 may be parallel to the floor surface B, or may be inclined with the floor surface B. The second rotation plate 20 may be formed in a circular plate shape, the bottom surface of the second rotation plate 20 may be substantially circular, and the second rotation plate 20 may have a rotationally symmetrical shape as a whole.

In the robot cleaner 1, the second rotation plate 20 may be the same as the first rotation plate 10, or may be symmetrically formed. If the first rotation plate 10 is located on the left side of the robot cleaner 1, the second rotation plate 20 may be located on the right side of the robot cleaner 1, and in this case, the first rotation plate 10 and the second rotation plate 20 can be symmetrical left and right to each other.

The first mop 30 has a bottom surface facing the floor to have a predetermined area, and the first mop 30 has a flat shape. The first mop 30 is formed in a form in which the width (or diameter) in the horizontal direction is sufficiently larger than the height in the vertical direction. When the first mop 30 is coupled to the body 50, the bottom surface of the first mop 30 may be parallel to the floor surface B, or may be inclined with the floor surface B.

The bottom surface of the first mop 30 may form a substantially circular shape, and the first mop 30 may be formed in a rotationally symmetrical shape as a whole. In addition, the first mop 30 may be detachably attached to the bottom surface of the first rotation plate 10, and may be coupled to the first rotation plate 10 to rotate together with the first rotation plate 10.

The second mop 40 has a bottom surface facing the floor to have a predetermined area, and the second mop 40 has a flat shape. The second mop 40 is formed in a form in which the width (or diameter) in the horizontal direction is sufficiently larger than the height in the vertical direction. When the second mop 40 is coupled to the body 50, the bottom surface of the second mop 40 may be parallel to the floor surface B, or may be inclined with the floor surface B.

The bottom surface of the second mop 40 may form a substantially circular shape, and the second mop 40 may have a rotationally symmetrical shape as a whole. In addition, the second mop 40 may be detachably attached to the bottom surface of the second rotation plate 20, and coupled to the second rotation plate 20 to rotate together with the second rotation plate 20.

When the first rotation plate 10 and the second rotation plate 20 rotate in opposite directions at the same speed, the robot cleaner 1 may move in a linear direction, and move forward or backward. For example, when viewed from above, when the first rotation plate 10 rotates counterclockwise and the second rotation plate 20 rotates clockwise, the robot cleaner 1 may move forward.

When only one of the first rotation plate 10 and the second rotation plate 20 rotates, the robot cleaner 1 may change direction and turn around.

When the rotation speed of the first rotation plate 10 and the rotation speed of the second rotation plate 20 are different from each other, or when the first rotation plate 10 and the second rotation plate 20 rotate in the same direction, the robot cleaner 1 can move while changing direction, and move in a curved direction.

The robot cleaner 1 may further include a first lower sensor 123.

The first lower sensor 123 is formed on the lower side of the body 50, and is configured to detect a relative distance to the floor surface B. The first lower sensor 123 may be formed in various ways within a range capable of detecting the relative distance between the point where the first lower sensor 123 is formed and the floor surface B.

When the relative distance (which may be a distance in a vertical direction from the floor surface, or a distance in an inclined direction from the floor surface) to the floor surface B, detected by the first lower sensor 123 exceeds a predetermined value or a predetermined range, it may be the case in which the floor surface may be suddenly lowered, and accordingly, the first lower sensor 123 may detect a cliff.

The first lower sensor 123 may be formed of a photosensor, and may be configured to include a light emitting unit for irradiating light and a light receiving unit through which the reflected light is incident. The first lower sensor 123 may be an infrared sensor.

The first lower sensor 123 may be referred to as a cliff sensor.

The robot cleaner 1 may further include a second lower sensor 124 and a third lower sensor 125.

When a virtual line connecting the center of the first rotation plate 10 and the center of the second rotation plate 20 in a horizontal direction (a direction parallel to the floor surface B) is referred to as a connection line L1, the second lower sensor 124 and the third lower sensor 125 may be formed on the lower side of the body 50 on the same side as the first lower sensor 123 with respect to the connection line L1, and configured to sense the relative distance to the floor surface B (Refer to FIG. 2d).

The third lower sensor 125 may be formed opposite to the second lower sensor 124 based on the first lower sensor 123.

Each of the second lower sensor 124 and the third lower sensor 125 may be formed in various ways within a range capable of detecting a relative distance to the floor surface B. Each of the second lower sensor 124 and the third lower sensor 125 may be formed in the same manner as the above-described first lower sensor 123, except for a location where they are formed.

The robot cleaner 1 may further include a first actuator 56, a second actuator 57, a battery 135, a water container 141, and a water supply tube 142.

The first actuator 56 is configured to be coupled to the body 50 to rotate the first rotation plate 10.

The first actuator 56 may be configured to include a first motor and one or more first gears.

The first motor may be an electric motor.

The plurality of first gears is configured to rotate while interlocking with each other, connects the first motor and the first rotation plate 10, and transmits the rotational power of the first motor to the first rotation plate 10. Accordingly, the first rotation plate 10 rotates when the rotating shaft of the first motor rotates.

The second actuator 57 is configured to be coupled to the body 50 to rotate the second rotation plate 20.

The second actuator 57 may be configured to include a second motor and one or more second gears.

The second motor may be an electric motor.

The plurality of second gears is configured to rotate while interlocking with each other, connects the second motor and the second rotation plate 20, and transmits the rotational power of the second motor to the second rotation plate 20. Accordingly, when the rotation shaft of the second motor rotates, the second rotation plate 20 rotates.

As such, in the robot cleaner 1, the first rotation plate 10 and the first mop 30 may be rotated by the operation of the first actuator 56, and the second rotation plate 20 and the second mop 40 may be rotated by the operation of the second actuator 57.

The second actuator 57 may form a symmetry (left and right symmetry) with the first actuator 56.

The battery 135 is configured to be coupled to the body 50 to supply power to other components constituting the robot cleaner 1. The battery 135 may supply power to the first actuator 56 and the second actuator 57, and in particular, supply power to the first motor and the second motor.

The battery 135 may be charged by an external power source, and for this purpose, a charging terminal for charging the battery 135 may be provided on one side of the body 50 or the battery 135 itself.

In the robot cleaner 1, the battery 135 may be coupled to the body 50.

The water container 141 is made in the form of a container having an internal space so that a liquid such as water is stored therein. The water container 141 may be fixedly coupled to the body 50, or detachably coupled to the body 50.

In the robot cleaner 1, the water supply tube 142 is formed in the form of a tube or pipe, and is connected to the water container 141 so that the liquid inside the water container 141 flows through the inside thereof. The water supply tube 142 is configured such that the opposite end connected to the water container 141 is located on the upper side of the first rotation plate 10 and the second rotation plate 20, and accordingly, the liquid inside the water container 141 can be supplied to the first mop 30 and the second mop 40.

In the robot cleaner 1, the water supply tube 142 may be formed in a form in which one tube is branched into two, in this case, one branched end is located on the upper side of the first rotation plate 10, and the other branded end is located on the upper side of the second rotation plate 20.

The robot cleaner 1 may include a water pump 143 to move the liquid through the water supply tube 142.

The water pump 143 is connected to the water container 141 and is configured to move the liquid (water) through the water supply tube 142 to supply to the first mop 30 and the second mop 40.

Referring to FIG. 2e, the water pump 143 operates to spray water from the water container 141, in this case, the water injected from the water container 141 enters the water pump 143 through the water supply tube 142, and moves from the water pump 143 through the water supply tube 142 again. The water exiting the water pump 143 flows to one branched end of the water supply tube 142 and is supplied to the first mop 30 coupled to the first rotation plate 10 or flows to the other branched end of the water supply tube 142 and is supplied to the second mop 40 coupled to the second rotation plate 20.

The robot cleaner 1 may further include a bumper 58, a first sensor 121, and a second sensor 122.

The bumper 58 is coupled along the outline of the body 50, and is configured to move relative to the body 50. For example, the bumper 58 may be coupled to the body 50 so as to reciprocate along a direction approaching the center of the body 50.

The bumper 58 may be coupled along a portion of the outline of the body 50, or may be coupled along the entire outline of the body 50.

The first sensor 121 may be coupled to the body 50 and configured to detect a movement (relative movement) of the bumper 58 with respect to the body 50. The first sensor 121 may be a collision detection sensor, and may be formed using a microswitch, a photo interrupter, a tact switch and the like.

The second sensor 122 may be coupled to the body 50 and configured to detect a relative distance to an obstacle. The second sensor 122 may be a distance sensor.

FIG. 3 is a block diagram of the robot cleaner shown in FIG. 1 of the present invention.

Referring to FIG. 3, the robot cleaner 1 may include a control unit 110, a sensor unit 120, a power unit 130, a water supply unit 140, a driving unit 150, a communication unit 160, a display unit 170 and a memory 180. The components shown in the block diagram of FIG. 3 are not essential for implementing the robot cleaner 1, so the robot cleaner 1 described in the present specification can have more or fewer components than those listed above.

First, the control unit 110 may be connected to the control device 5 through wireless communication by a communication unit 160 to be described later. In this case, the control unit 110 may transmit various data about the robot cleaner 1 to the connected control device 5. And, it is possible to receive data from the connected control device 5 and store it. Here, the data input from the control device 5 may be a control signal for controlling at least one function of the robot cleaner 1.

In other words, the robot cleaner 1 may receive a control signal based on a user input from the control device 5 and operate according to the received control signal.

In addition, the control unit 110 may control the overall operation of the robot cleaner. The control unit 110 controls the robot cleaner 1 to autonomously drive a surface to be cleaned and perform a cleaning operation according to the set information stored in the memory 180 to be described later.

The sensor unit 120 may include one or more of the first lower sensor 123, the second lower sensor 124, the third lower sensor 125, the first sensor 121 and the second sensor 122 of the robot cleaner 1 described above.

In other words, the sensor unit 120 may include a plurality of different sensors capable of detecting the environment around the robot cleaner 1, and the information on the environment around the robot cleaner 1 detected by the sensor unit 120 may be transmitted to the control device 5 by the control unit 110. Here, the information on the environment may be, for example, whether an obstacle exists, whether a cliff is detected, whether a collision is detected, and the like.

The control unit 110 may be configured to control the operation of the first actuator 56 and/or the second actuator 57 according to the information of the first sensor 121. For example, when the bumper 58 comes into contact with an obstacle while the robot cleaner 1 is driving, the location where the bumper 58 comes into contact may be detected by the first sensor 121, and the control unit 110 may control the operation of the first actuator 56 and/or the second actuator 57 to leave this contact location.

In addition, according to the information of the second sensor 122, when the distance between the robot cleaner 1 and the obstacle is less than or equal to a predetermined value, the control unit 110 may control the operation of the first actuator 56 and/or the second actuator 57 such that the driving direction of the robot cleaner 1 is switched, or the robot cleaner 1 moves away from the obstacle.

In addition, according to the distance detected by the first lower sensor 123, the second lower sensor 124 or the third lower sensor 125, the control unit 110 may control the operation of the first actuator 56 and/or the second actuator 57 such that the robot cleaner 1 stops or changes the driving direction.

Meanwhile, the power unit 130 receives external power and internal power under the control of the control unit 110 to supply power required for operation of each component. The power unit 130 may include the battery 135 of the robot cleaner 1 described above.

The water supply unit 140 may include the water container 141, the water supply tube 142, and the water pump 143 of the robot cleaner 1 described above. The water supply unit 140 can be formed to adjust the water supply amount of the liquid (water) supplied to the first mop 30 and the second mop 40 during the cleaning operation of the robot cleaner 1 according to the control signal of the control unit 110. The control unit 110 may control a driving time of a motor that drives the water pump 143 to adjust the water supply amount.

Alternatively, the water supply unit 140 may be controlled to remove the residual water in the water container 141 when a pressing operation is applied to the bumper 58 in a residual water removal mode to be described later. In this regard, the control unit 110 may detect the pressing operation applied to the bumper 58 through the first sensor 121 that detects the relative movement of the bumper 58.

The driving unit 150 may include the first actuator 56 and the second actuator 57 of the robot cleaner 1 described above. The driving unit 150 may be formed such that the robot cleaner 1 rotates or moves in a straight line according to a control signal of the control unit 110.

Meanwhile, the communication unit 160 may include at least one module that enables wireless communication between the robot cleaner 1 and a wireless communication system, or between the robot cleaner 1 and a preset peripheral device, or between the robot cleaner 1 and a preset external server.

In this case, the preset peripheral device may be the control device 5 according to an embodiment of the present invention.

For example, the at least one module may include at least one of an IR (Infrared) module for infrared communication, an ultrasonic module for ultrasonic communication, or a short-range communication module such as a WiFi module or a Bluetooth module. Alternatively, it may be formed to transmit/receive data to/from a preset device through various wireless technologies such as wireless LAN (WLAN) and wireless-fidelity (Wi-Fi), including wireless internet module.

Meanwhile, the display unit 170 displays information to be provided to a user. For example, the display unit 170 may include a display means 171 for displaying a screen.

In addition, the display means 171 of the display unit 170 may be formed of any one of a light emitting diode (LED), a liquid crystal display (LCD), a plasma display panel, and an organic light emitting diode (OLED).

In this case, the display means 171 may display information such as operation time information of the robot cleaner 1, battery power information, and the like, and may be provided on the upper surface of the upper body 50b of the robot cleaner 1 so that the user can easily recognize the information displayed on the display means 171.

In addition, the display unit 170 may include a voice transmitting means 172 for outputting a sound. The voice transmitting means 172 may be, for example, a speaker, and the source of the sound output by the speaker may be sound data prestored in the robot cleaner 1. For example, the prestored sound data may be about a voice guidance corresponding to each function of the robot cleaner 1 or a warning sound for notifying an error.

In this case, the voice transmitting means 172 may be accommodated in the inner space formed by the upper body 50b and the lower body 50a of the robot cleaner 1. More specifically, the voice transmitting means 172 may be provided on the rear side of the battery 135 (Refer to FIG. 2f).

In addition, the display unit 170 may include a manipulation means 173. The manipulation means 173 may be configured as a conventional button, a touch panel, and the like, so that a user may input a command regarding the operation of the robot cleaner 1 by touching it or pressing it with a predetermined force.

For example, the manipulation means 173 may be provided on the upper surface of the upper body 50b of the robot cleaner 1 and configured to turn on or turn off the power of the robot cleaner 1 when the user presses it.

Lastly, the memory 180 may include various data for driving and operating the robot cleaner 1. The memory 180 may include an application program for autonomous driving of the robot cleaner 1 and various related data. In addition, each data sensed by the sensor unit 120 may be stored, and the information on various settings (values) selected or input by the user (for example, cleaning reservation time, cleaning mode, water supply amount, display brightness level, volume level of notification sound, etc.) may be included.

Meanwhile, the memory 180 may include information on the surface to be cleaned currently given to the robot cleaner 1. For example, the information on the surface to be cleaned may be map information mapped by the robot cleaner 1 by itself. And the map information, that is, the map may include various information set by the user for each area constituting the surface to be cleaned.

FIG. 4 is an internal block diagram of a control device according to an embodiment of the present invention.

Referring to FIG. 4, the control device 5 according to an embodiment of the present invention may include a server, a wireless communication unit 510 for exchanging data with other electronic devices such as the robot cleaner 1, and a control unit 580 that controls the screen of the application to be displayed on a display unit 551 according to a user input executing the application for controlling the robot cleaner 1.

In addition, the control device 5 may further include an A/V (Audio/Video) input unit 520, a user input unit 530, a sensing unit 540, an output unit 550, a memory 560, an interface unit 570 and a power supply unit 590.

The application for controlling the robot cleaner 1 may include a main screen 1000 that can receive a user input related to the control signal for controlling the robot cleaner 1.

Here, the main screen 1000 may display information on the status of the robot cleaner 1 received through the wireless communication unit 510.

The user interface screen provided through the display unit 551 of the control device 5, such as the main screen 1000 of the application, and the control of the robot cleaner 1 made therethrough will be described in detail later with reference to FIGS. 5 to 20f.

Meanwhile, the wireless communication unit 510 may receive location information and status information directly from the robot cleaner 1, or may receive location information and status information of the robot cleaner 1 through a server.

Meanwhile, the wireless communication unit 510 may include a broadcast reception module 511, a mobile communication module 513, a wireless internet module 515, a short-range communication module 517, a GPS module 519 and the like.

The broadcast reception module 511 may receive at least one of a broadcast signal and broadcast related information from an external broadcast management server through a broadcast channel. In this case, the broadcast channel may include a satellite channel, a terrestrial channel, and the like.

The broadcast signal and/or broadcast related information received through the broadcast reception module 511 may be stored in the memory 560.

The mobile communication module 513 transmits/receives wireless signals to and from at least one of a base station, an external terminal, and a server on a mobile communication network. Here, the wireless signal may include various types of data according to transmission/reception of a voice call signal, a video call call signal, or text/multimedia message.

The wireless internet module 515 refers to a module for wireless internet access, and the wireless internet module 515 may be built-in or external to the control device 5 for controlling the robot cleaner 1. For example, the wireless internet module 515 may perform WiFi-based wireless communication or WiFi Direct-based wireless communication.

The short-range communication module 517 is for short-range communication, and may support short-range communication using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (Wireless USB) technologies.

The short-range communication module 517 may support wireless communication between the control device 5 for controlling the robot cleaner 1 through a short-range wireless communication network (Wireless Area Networks) and a wireless communication system, between the control device 5 and the control device of another robot cleaner, or between the control device 5 and another mobile terminal, or between networks in which an external server is located. The short-range wireless communication network may be Wireless Personal Area Networks.

The Global Position System (GPS) module 519 may receive location information from a plurality of GPS satellites.

Meanwhile, the wireless communication unit 510 may exchange data with a server using one or more communication modules.

The wireless communication unit 510 may include an antenna 505 for wireless communication, and may include an antenna for receiving a broadcast signal in addition to an antenna for a call and the like.

The A/V (Audio/Video) input unit 520 is for inputting an audio signal or a video signal, and may include a camera 521, a microphone 523, and the like.

The user input unit 530 generates key input data input by a user to control the operation of the control device 5. To this end, the user input unit 530 may include a key pad, a dome switch, a touch pad (static pressure/capacitive), and the like. In particular, when the touch pad forms a mutual layer structure with the display unit 551, it may be referred to as a touch screen.

The sensing unit 540 may generate a sensing signal for controlling the operation of the control device 5 by detecting the current status of the control device 5 such as the opening/closing status of the control device 5, the location of the control device 5, the presence or absence of user contact, and the like.

The sensing unit 540 may include a proximity sensor 541, a pressure sensor 543, a motion sensor 545, and the like. The motion sensor 545 may detect a motion or location of the control device 5 using an acceleration sensor, a gyro sensor, a gravity sensor, and the like. In particular, the gyro sensor is a sensor for measuring angular velocity, and may detect a direction (angle) that is turned with respect to a reference direction.

The output unit 550 may include a display unit 551, a sound output module 553, a notification unit 555, a haptic module 557 and the like.

On the other hand, when the display unit 551 and the touch pad form a mutual layer structure and are configured as a touch screen, the display unit 551 may be used as an input device capable of inputting information by a user's touch in addition to an output device.

In this case, a screen for receiving an input from a user for a set value related to the control signal for controlling the robot cleaner 1 may be displayed on the display unit 551, and the information processed by the control device 5, such as another screen that is switched from the screen according to the user input and displayed, may be displayed and output.

That is, the display unit 551 may serve to receive information by a user's touch input, and at the same time, may also serve to display the information processed by the control unit 580, which will be described later.

The sound output module 553 outputs audio data received from the wireless communication unit 510 or stored in the memory 560. The sound output module 553 may include a speaker, a buzzer, and the like.

The notification unit 555 may output a signal for notifying the occurrence of an event in the control device 5. For example, the signal may be output in a form of vibration.

The haptic module 557 generates various tactile effects that a user can feel. A representative example of the tactile effect generated by the haptic module 557 is a vibration effect.

The memory 560 may store a program for processing and control of the control unit 580, and perform a function for temporary storage of input or output data (for example, phonebook, message, still image, video, etc.).

The interface unit 570 functions as an interface with all external devices connected to the control device 5. The interface unit 570 may receive data or power from such an external device and transmit it to each component inside the control device 5, and allow the data inside the control device 5 to be transmitted to an external device (for example, it may be transmitted to the robot cleaner 1).

The control unit 580 controls the overall operation of the control device 5 by generally controlling the operations of the respective units. For example, it may perform related control and processing for voice calls, data communications, video calls, and the like. In addition, the control unit 580 may include a multimedia playback module 581 for playing multimedia. The multimedia playback module 581 may be configured as a hardware in the control unit 580 or may be configured as a software separately from the control unit 580.

In addition, the control unit 580 may display the main screen 1000 for controlling the robot cleaner 1 on the display unit 551, control the switching of the main screen 1000 according to a user's touch input, and transmit to the robot cleaner 1 the control signal for controlling the robot cleaner 1 based on the user input inputted through the display unit 551.

The power supply unit 590 receives external power and internal power under the control of the control unit 580 to supply the power required for operation of each component.

Meanwhile, the block diagram of the control device 5 shown in FIG. 4 is a block diagram for an embodiment of the present invention. Each component in the block diagram may be integrated, added, or omitted according to the specifications of the actually implemented control device.

That is, two or more components may be combined into one component, or one component may be subdivided into two or more components as needed. In addition, the function performed by each block is for explaining the embodiment of the present invention, and the specific operation or device does not limit the scope of the present invention.

Hereinafter, a specific example will be given for arrangement and switching of a screen displayed through the display unit 551 of the control device 5, and the control signal transmitted to the robot cleaner 1 through the control device 5 will be described.

FIG. 5 is a flowchart of a method of controlling the robot cleaner of FIG. 1 using a control device according to an embodiment of the present invention.

Referring to FIG. 5, a method of transmitting a control signal to the robot cleaner 1 through the control device 5 includes the step of executing an application by which the control unit 580 controls the robot cleaner 1 installed in the control device 5 according to a user input (S1000); the step of displaying the main screen 1000 through the display unit 551 by the control unit 580 in order to receive a set value for controlling the robot cleaner 1 as a user's touch input (S2000); and the step of switching the main screen 1000 to another screen according to the user's touch input by the control unit 580 and transmitting a control signal to the robot cleaner 1 based on the set value (S3000).

Hereinafter, the arrangement structure of the main screen 1000 displayed by the process S2000 of FIG. 5 will be described in detail with reference to FIG. 6.

FIG. 6 is a view illustrating an arrangement structure of a main screen displayed through a display unit of a control device according to an embodiment of the present invention.

Here, a user means a subject who wants to remotely control the robot cleaner 1 using the control device 5.

Here, the main screen 1000 may be a screen that is first displayed by the control unit 580 when the application stored in the control device 5 is initially executed.

Alternatively, when the application is an application for controlling a plurality of household devices including the robot cleaner 1, the main screen 1000 may be the screen displayed when the user selects the robot cleaner 1 among the plurality of household devices on a separate initial screen by a user's touch screen.

That is, the main screen 1000 means a first control screen displayed in relation to the control of the robot cleaner 1 when the application is initially executed.

The main screen 1000 may receive a control signal for controlling the robot cleaner 1 from the user as a touch input, and for this purpose, the main screen 1000 may have one or more divided areas.

For example, the main screen 1000 may include a first area A1, a second area A2, and a third area A3.

The first area A1 may be located in the upper area of the main screen 1000, and a status bar area A11 in which a current date/time information, connected communication network information, the battery information of the control device, and the like are displayed and a title area A02 in which name information of a control object (for example, "wet mop robot cleaner") is displayed may be located on the upper portion of the first area A1.

The control unit 580 arranges and displays a status display module 1100 indicating the current operation status of the robot cleaner 1 in the first area A1 of the main screen 1000.

The control unit 580 arranges and displays a user set module 1200 that receives a set value for controlling the robot cleaner 1 through the user's touch input in the second area A2 of the main screen 1000.

In this case, the set value for controlling the robot cleaner 1 means a value of a parameter that is related to the cleaning operation of the robot cleaner 1, and may be changed by the user.

The second area A2 is located lower than the first area A1 and is approximately located in the lower area of the main screen 1000. Preferably, the second area A2 is arranged below the center in the longitudinal direction of the display unit 551 so that the user's touch input can be easily performed.

The third area A3 is located between the first area A1 and the second area A2.

The control unit 580 arranges and displays an operation performing module 1300 for operating the robot cleaner 1 through the user's touch input in the third area A3 of the main screen 1000.

On the other hand, when the user remotely controls the robot cleaner 1 using the control device 5, it is common to perform a touch input using a finger while supporting the lowermost edge of the control device 5 with a palm.

That is, while the control device 5 is in use, the first area A1 is the area farthest from the area where the user can easily perform touch input without moving the support point in which the user supports the control device 5 with the palm of the hand, and the second area A2 becomes an area closest to the area in which the touch input can be easily performed.

Accordingly, in the control device 5 according to an embodiment of the present invention, the module that does not require editing by the user, that is, the status display module 1100 that does not need to receive the user's touch input is arranged in the first area A1, and the user set module 1200 that needs to directly input the set values for controlling the robot cleaner 1 from the user is arranged in the second area A2, so that a user interface with high useability can be provided.

Hereinafter, the status display module 1100, the user set module 1200, and the operation performing module 1300 arranged in each area of the main screen 1000 will be described in more detail.

The status display module 1100 may include at least one of a cleaning mode display unit 1110, a reservation status display unit 1130, and a progress time display unit 1120.

Referring to FIG. 5, the currently set cleaning mode of the robot cleaner 1 is displayed on the cleaning mode display unit 1110. A preset device icon corresponding to the robot cleaner 1 which is an object device controlled by the control device 5 may be displayed on the left side of the cleaning mode display unit 1110.

A cleaning mode may be displayed in text at the upper right of the device icon. In this case, the cleaning mode may be displayed as text indicating whether it is cleaning, pausing, charging, power saving mode, and the like, for example. Here, when the cleaning status is displayed, the information on the cleaning mode (for example, deep cleaning, zigzag cleaning, or intensive cleaning) having a preset driving type of the robot cleaner 1 may be displayed together.

At the lower right of the device icon, the icons corresponding to one or more currently set functions of the robot cleaner 1 including the cleaning mode may be displayed. For example, the set function may include whether to mute, the cleaning mode described above, a set water supply amount, whether to set interlocking cleaning, a camera connection state, and a remaining battery charge, and the like.

Next, the total time during which the robot cleaner 1 have performed the cleaning operation may be displayed on the progress time display unit 1120. The total time that the cleaning operation has been performed is the time from when the robot cleaner 1 leaves the charging station and starts the cleaning operation to the current point in time during which the cleaning operation has been performed, and may be displayed in the order of hours, minutes, and seconds.

Next, the reservation information of some functions of the robot cleaner 1 may be displayed on the reservation status display unit 1130. In this case, as the reservation information, the names of some reserved functions and whether the functions are reserved (ON or OFF) may be displayed in text. In addition, some of the functions may be displayed on the reservation status display unit 1130 only when reserved and not displayed when not reserved.

Hereinafter, the operation performing module 1300 arranged in the third area A3 of the main screen 1000 will be described.

The user set module 1200 arranged in the second area A2 of the main screen 1000 will be described after the operation performing module 1300 is first described.

Referring to FIG. 6, the operation performing module 1300 arranged in the third area A3 of the main screen 1000 may include at least one of a monitoring operation unit 1310, a cleaning operation unit 1320, and a charging operation unit 1330.

The monitoring operation unit 1310 includes a preset icon and text, and when the monitoring operation unit 1310 is selected by the user's touch input, the control unit 580 transmits a control signal to the robot cleaner 1 to start the operation of monitoring a room.

Here, the room monitoring operation may be, for example, the operation for transmitting to the control device 5 a photographing screen in which an area in which a motion is detected is photographed several times through an image photographing means provided in the robot cleaner 1, when a motion is detected in the room. In this case, the image photographing means may be, for example, a camera provided in front of the body 50 of the robot cleaner 1.

When the photographing screen is transmitted to the control device 5, an alarm or vibration sounds in the control device 5, and a user can check the photographing screen through the control device 5.

The cleaning operation unit 1320 includes a preset icon and text, and when the cleaning operation unit 1320 is selected by the user's touch input, the control unit 580 transmits a control signal to the robot cleaner 1 to start the cleaning operation. or to temporarily stop the cleaning operation being performed. For example, when the cleaning operation unit 1320 is selected while the robot cleaner 1 is located on the charging station, the robot cleaner 1 starts the cleaning operation and drives, and when the cleaning operation unit 1320 is selected while the robot cleaner 1 performs the cleaning operation, the robot cleaner 1 temporarily stops the cleaning operation.

The charging operation unit 1330 includes a preset icon and text, and when the charging operation unit 1330 is selected by the user's touch input, the control unit 580 transmits a control signal to the robot cleaner 1 to return to the charging station.

Hereinafter, the user set module 1200 arranged in the second area A2 of the main screen 1000 will be described.

The user set module 1200 may include at least one of a cleaning mode set unit 1210, a cleaning area set unit 1220, an interlocking cleaning set unit 1240, and a repeated cleaning set unit 1250.

When the cleaning mode set unit 1210 is selected by the user's touch input, the cleaning mode (for example, deep cleaning, zigzag cleaning, or intensive cleaning) having a preset driving type is displayed in a drop-down menu form on the main screen 1000, and the user can select one of the cleaning modes.

Next, when the cleaning area set unit 1220 is selected by the user's touch input, the main screen 1000 is switched to a screen for designating an area to perform the cleaning operation on the surface to be cleaned or an area to prohibit the cleaning operation.

Next, when the interlocking cleaning set unit 1240 is selected by the user's touch input, the main screen 1000 is switched to a screen for selecting another robot cleaner to cooperate with the robot cleaner 1 to perform the interlocking cleaning operation.

Here, the interlocking cleaning operation means a cooperative operation that when another robot cleaner (for example, a suction-type robot cleaner) selected by the user's touch input completes the cleaning operation of sucking dust, the robot cleaner 1 performs a wet mop cleaning operation successively.

In this interlocking cleaning operation, when the other selected robot cleaner transmits a cleaning completion signal to the robot cleaner 1 after completion of the cleaning operation, the control unit 110 may be performed to control the robot cleaner 1 to start the cleaning operation.

Next, the repeated cleaning set unit 1250 is to repeat the cleaning operation for a preset number of times in the cleaning mode set by the cleaning mode set unit 1210.

Hereinafter, the process S3000 of FIG. 5 related to the user set module 1200 will be described as a specific example with reference to FIGS. 7 to 20*f*.

The user set module 1200 includes a water supply set unit 1230 that receives a set value of target water supply amount to be supplied to the mops 30 and 40 by the water supply unit 140 of the robot cleaner 1 from the user.

FIG. 7 is a flowchart of a method of transmitting a control signal to the robot cleaner based on the user's touch input for selecting the water supply set unit on the main screen of FIG. 6, and FIGS. 8*a* and 8*b* are views for explaining in detail an embodiment related to the user's touch input selecting the water supply set unit on the main screen of FIG. 6.

First, the control unit 580 receives the user's touch input for setting the target water supply amount to be supplied to the mops 30 and 40 on the water supply set unit 1230 through the display unit 551 (S3110).

In this case, referring to FIGS. 8*a* and 8*b*, the water supply set unit 1230 includes a slider 1231, which is a horizontal bar-shaped GUI object configured to slide and move the target point 1233 horizontally by the user's touch input. A grid line is displayed on the slider 1231, and an image object 1235 is displayed at a predetermined interval below the slider 1231.

In this case, the image object 1235 may have a water droplet shape as shown in FIGS. 8*a* and 8*b*.

In addition, the water droplet-shaped image object 1235 is formed so that the inside of the image object 1235 is filled with shadows according to the set water supply amount, and through this, the user can intuitively grasp the degree of the set water supply amount. For example, the image object 1235 filled with 0% shading corresponds to the "dry mop" mode, which is a mode in which the water supply amount is 0. As the target point 1233 on the slider 1231 moves from left to right, the shadow of the image object 1235 is gradually filled in, and the water supply mode is changed to correspond from "low wet mop" mode to "high wet mop" mode.

In addition, a mode display item 1239 in which the set water supply amount mode is displayed in text may be arranged on the upper side of the slider 1231. For example, at the same time as the target point 1233 moves on the slider 1231, the text of the mode display item 1239 may be changed to "dry mop", "low wet mop" or "high wet mop" in real time and displayed.

In addition, a first slider area 1231a from a preset point on the slider 1231 to the right end point of the slider 1231 corresponding to the maximum water supply amount may be displayed in a first color. In this case, the preset point may be a point where the water supply amount corresponds to the "high wet mop" mode.

The second slider area 1231b, which is another point on the slider 1231 other than the point marked with the first color, may be displayed with a second color to be distinguishable from the point marked with the first color.

Due to this, the user can intuitively grasp the appropriate range of the water supply amount to be supplied to the mops 30, 40.

On the other hand, the target point 1233 may be slid left and right on the slider 1231 by the user's touch input, and the water supply amount corresponding to the point where the target point 1233 stops on the slider 1231 may be set as a set value of the target water supply amount to be supplied to the robot cleaner 1.

In this case, the user's touch input for moving the location of the target point 1233 is performed by touching down the target point 1233 and then dragging it to a desired location, or by tapping directly at the desired location and locating the target point 1233.

In addition, a third color may be displayed from the left end of the slider 1231 to the target point 1233 set by the user's touch input, and accordingly, the user can intuitively grasp the water supply amount set by himself or herself.

In addition, when the target point 1233 slid by the user is located between the preset point and the point corresponding to the maximum water supply amount, that is, when the target point 1233 is located in the first slider area 1231a, the entire color of the slider 1231 is converted to the first color, and a warning message 1237 may be displayed at the bottom of the slider 1231.

For example, the warning message 1237 may be a message saying "Please be careful for excessively wet wet mop."

Accordingly, when the set value of the target water supply amount is excessively set, there is an effect of drawing attention to the user through a warning message 1237, and it is possible to prevent in advance a phenomenon in which water flows to the floor surface, which is the surface to be cleaned, due to excessive wetness of the mops 30 and 40 coupled to the robot cleaner 1.

On the other hand, in order to increase the efficiency of mop cleaning, it is preferable to set the target water supply amount differently according to the degree of contamination of the floor surface whenever the robot cleaner 1 starts a new cleaning operation. That is, setting the target water supply amount is a main function of the robot cleaner 1 including the wet mop function, and the user's accessibility to this function must be high.

In the control device 5 according to an embodiment of the present invention, the water supply set unit 1230 is arranged on the main screen 1000, so that the user can set the set value of the target water supply amount with minimal touch input after the application is executed.

Also, preferably, the water supply set unit 1230 may be arranged relatively on the upper portion of the second area A2 of the main screen 1000.

Accordingly, the control device 5 according to an embodiment of the present invention provides the effect of increasing the convenience of the user's sliding operation for setting the target water supply amount.

Meanwhile, when the set value of the target water supply amount is set by the user's touch input, the control unit 580 transmits a control signal corresponding to the information on the set value of the target water supply amount to the robot cleaner 1 (S3120).

In this case, the control signal may be a control signal for controlling the water pump 143 of the robot cleaner 1. More specifically, the control signal for the water pump 143 that is transmitted from the control unit 580 to the robot cleaner 1 through the wireless communication unit 510 is received by the communication unit 160 of the robot cleaner 1, and the control unit 110 of the robot cleaner 1 may control the water supply amount supplied to the mops 30 and 40 in a manner that varies the driving time of the motor for operating the water pump 143 of the robot cleaner 1.

For example, as the driving time of the water pump 143 increases, the water supply amount supplied from the water container 141 of the robot cleaner 1 to the first mop 30 and the second mop 40 through the water supply tube 142 increases. As the driving time of the water pump 143 becomes shorter, the water supply amount supplied from the water container 141 of the robot cleaner to the first mop 30 and the second mop 40 through the water supply tube 142 is reduced.

Conventionally, a robot cleaner having a wet mop function cannot be remotely controlled or only a limited user interface is provided even when a remote control device is provided. Therefore, in the conventional art, there is a problem that the user cannot arbitrarily change the water supply amount supplied to the mop of the robot cleaner.

However, since the control device 5 according to an embodiment of the present invention includes the water supply set unit 1230 as a user interface, the water supply amount supplied to the mop of the robot cleaner 1 can be directly set by the user input.

Specifically, the user may set the set value of the target water supply amount as an appropriate set value according to the state of the surface to be cleaned (for example, the area, roughness, contamination level, etc. of the floor surface).

Meanwhile, the user set module 1200 may further include a fall prevention sensitivity set unit 1260 that may receive a set value of the cliff height of the robot cleaner 1 from the user.

FIG. 9 is a flowchart of a method of transmitting a control signal to a robot cleaner based on the use's touch input selecting the fall prevention sensitivity set unit on the main screen of FIG. 6, and FIGS. 10a to 10c are views for explaining in detail an embodiment related to the user's touch input selecting the fall prevention sensitivity set unit on the main screen of FIG. 6.

First, when the user's touch input selecting the fall prevention sensitivity set unit 1260 arranged on the main screen 1000 is received through the display unit 551 (S3210), the control unit 580 displays on the main screen 1000 a preset set value of cliff height (S3220).

Here, the preset set value of cliff height may be displayed on the main screen 1000 in the form of a drop-down menu by the user's touch input selecting the fall prevention sensitivity set unit 1260.

In this case, the set value of cliff height may be selected from two or more preset set values.

For example, as shown in FIG. 10b, the user can select a "basic" mode item 1261a or a "sensitive" mode item 1261b as the set value of cliff height. When the "basic" mode item 1261a is selected, for example, the relative distance between a cliff detection sensor and the floor surface B is 30 mm or more, it can be set to be determined as a cliff. The "sensitive" mode item 1261b is a case where the set value of cliff height is smaller than that of the "basic" mode. For example, when the "sensitive" mode item 1261b is selected and the relative distance between the cliff detection sensor and the floor surface B is 15 mm or more, it can be set to be determined as a cliff.

In this case, the cliff detection sensor may include at least one of the first lower sensor 123, the second lower sensor 124, and the third lower sensor 125.

Meanwhile, when the drop-down menu 1261 is expanded, a message explaining the cliff height set value may be displayed in each of the items 1261a and 1261b.

For example, as shown in FIG. 9, in the "basic" mode item 1261a, a message "a fall is prevented when the difference in height of the floor is 30 mm or more" may be displayed.

In addition, in the "sensitive" mode item 1261b, a message "a fall is prevented when the difference in height of the floor is 15 mm or more" may be displayed.

In addition, a default value of the set value of cliff height may be set to a height corresponding to the "basic" mode item.

Meanwhile, the control unit 580 receives the user's touch input selecting the set value of cliff height through the display unit 551 (S3230).

When one set value of cliff height is selected by the user's touch input, the drop-down menu 1261 is rolled up and disappears, and in the fall prevention sensitivity set unit 1260, the mode corresponding to the set value of cliff height selected by the user can be displayed as text. (Refer to FIG. 10c).

Next, the control unit 580 transmits a control signal corresponding to the information on the set value of cliff height selected by the user to the robot cleaner 1 (S3240).

More specifically, the control signal corresponding to the information on the selected set value of cliff height transmitted by the control unit 580 to the robot cleaner 1 through the wireless communication unit 510 is received by the communication unit 160 of the robot cleaner 1, the control unit 110 of the robot cleaner 1 may control the sensitivity of the first lower sensor 123, the second lower sensor 124, and the third lower sensor 125 of the robot cleaner 1.

In this case, the sensitivity can be controlled in such a way that a cliff is determined to be detected when the distance between each sensing detected by the first lower sensor 123, the second lower sensor 124 and the third lower sensor 125 and the floor surface B is higher than the set value of cliff height selected by the user.

When the cliff is detected, the control unit 110 of the robot cleaner 1 controls the first actuator 56 and the second actuator 57 to control the driving of the robot cleaner 1 to avoid the cliff.

Conventionally, since the set value of cliff height for detecting a specific cliff is pre-stored in the robot cleaner as one predetermined value, when the robot cleaner is driving on the floor surface where there is a step lower than the predetermined set value of cliff height, there is a problem in that the step is not recognized as a cliff and a situation of falling is occurred.

On the other hand, in the case of the conventional suction-type robot cleaner, it is possible to re-climb using wheels even if the robot cleaner falls from a low step that is not recognized as a cliff because it travels using the wheels. Since the robot cleaner 1 to be controlled by the control device 5 of the present invention drives by the rotation of the first mop 30 and the second mop 40, there is a problem that it cannot climb again by itself once it falls even with a low step.

However, since the control device 5 according to an embodiment of the present invention includes the fall prevention sensitivity set unit 1260 as a user interface, the cliff height detected by the robot cleaner 1 can be set by the user input.

Specifically, the user may appropriately change the set value of the cliff height according to the condition of the floor surface (for example, a situation in which a cleaning is performed on a thin baby mat, etc.).

In addition, in the control device 5 according to an embodiment of the present invention, the fall prevention sensitivity set unit 1260 is arranged so that the set value of cliff height can be directly selected on the main screen 1000 by the user's touch input, it provides the effect that the set value of cliff height can be set with a minimal touch input from the user after the application is executed.

Meanwhile, the user set module 1200 may further include a location detection unit 1280 for searching for a current location of the robot cleaner 1.

FIG. 11 is a flowchart of a method of transmitting a control signal to the robot cleaner based on the user's touch input selecting the location detection unit on the main screen of FIG. 6, and FIGS. 12a and 12b are views for explaining in detail an embodiment related to the user's touch input.

First, when receiving the user's touch input selecting the location detection unit 1280 arranged on the main screen 1000 (S3310), the control unit 580 switches the main screen 1000 to a cleaner search screen 2100. (S3320).

In this case, as shown in FIG. 12b, a cleaner search button 1281 is displayed on the cleaner search screen 2100, and an image display area 1283 and a message display area 1282 are arranged on the upper portion of the cleaner search button 1281.

For example, in the message display area 1282, a message "If a cleaner search button is pressed, a notification sound sounds from the cleaner" may be displayed to guide the corresponding function.

Next, the control unit 580 receives the user's touch input selecting the cleaner search button 1281 on the cleaner search screen 2100 (S3330).

When the cleaner search button 1281 is selected, the control unit 580 may send a signal to the robot cleaner 1 to inquire about a location where the robot cleaner 1 stops driving. In addition, a control signal may be transmitted so that an alarm sounds on the display unit 170 of the robot cleaner 1 while inquiring about the location of the robot cleaner 1.

Finally, the control unit 580 receives the location where the robot cleaner 1 stops driving, and displays the location where the driving stopped on the cleaner search screen 2100 as the current location of the robot cleaner 1 as an image (S3340).

In this case, the current location of the robot cleaner 1 is displayed on the image display area 1283.

Here, the current location of the robot cleaner 1 may be displayed as an image indicating, together with a map of the surface to be cleaned recognized while the robot cleaner 1 drives, the relative location of the robot cleaner 1 with respect to the map.

Meanwhile, the current location of the robot cleaner 1 is displayed as the image on the control device 5 and at the same time, an alarm is transmitted from the display unit 170 of the robot cleaner 1. Specifically, the alarm may be transmitted from the voice transmitting means 172 of the robot cleaner 1.

Accordingly, the user may recognize the location of the robot cleaner 1 from the image displayed on the cleaner search screen 2100, or recognize the location of the robot cleaner 1 by listening to the alarm sent through the display unit 170 of the robot cleaner 1.

A conventional suction-type robot cleaner generates noise in the process of sucking dust, so that the current location of the robot cleaner can be easily recognized, but since the robot cleaner dedicated to the wet mop function has relatively little noise, it is difficult for the user to recognize which area of the surface to be cleaned is currently driven.

Accordingly, when the robot cleaner 1 stops driving due to an error or an obstacle while driving, there is a problem in that the user cannot easily search for the location of the robot cleaner 1.

However, since the control device 5 according to an embodiment of the present invention includes the location detection unit 1280 as a user interface, even when the robot cleaner 1 stops while driving, the user can easily detect the current location of the robot cleaner 1 by performing the touch input remotely.

Meanwhile, the user set module 1200 may further include a cleaning reservation set unit 1270 that can reserve the cleaning operation of the robot cleaner 1.

FIG. 13 is a flowchart of a method of setting a wet mode in the robot cleaner, and FIGS. 14*a* to 14*e* are views for explaining in detail an embodiment in which the wet mode is set in the robot cleaner by the user's touch input.

Referring to FIGS. 13 and 14*a*, first, the control unit 580 receives the user's touch input selecting the cleaning reservation set unit 1270 arranged on the main screen 1000 (S3410), and switches the main screen 1000 to a reservation list screen (3100) (S3420).

Here, as shown in FIG. 14*b*, a reservation adding button 1272 for reserving the cleaning operation of the robot cleaner 1 may be displayed below the reservation list screen 3100, and a cleaning operation list 1271 of the robot cleaner 1 previously reserved may be displayed on the upper portion of the reservation list screen 3100.

In addition, each of the cleaning operation list 1271 may include a button for activating or deactivating a reserved cleaning operation. In this case, when there is no reserved cleaning operation, the cleaning operation list 1271 is not displayed.

Next, when receiving the user's touch input selecting the reservation adding button 1272 or the cleaning operation list 1271 on the reservation list screen 3100 (S3430), the control unit 580 switches the reservation list screen 3100 to a reservation set screen 3200 that can set a wet mode of the mops 30 and 40 coupled to the robot cleaner 1 (S3440).

In this case, when the reservation adding button 1272 is selected, a reservation setting for a new cleaning operation can be selected on the reservation set screen 3200, and when one cleaning operation list among the cleaning operation list 1271 is selected, the preset setting of the corresponding cleaning operation may be changed.

In addition, the reservation set screen 3200 may be configured to select a time, a day of the week, and a cleaning area to perform the cleaning operation.

On the other hand, the reservation set screen 3200 includes a mop wet button 1273 that can activate or deactivate the wet mode.

According to the present invention, by displaying the mop wet button 1273 on the reservation set screen 3200, the user can set the wet mode to quickly wet the mops 30, 40 installed on the robot cleaner 1 while reserving the time, day, and cleaning area to perform the cleaning operation.

Next, when receiving the user's touch input activating the mop wet button 1273 on the reservation set screen 3200 (S3450), the control unit 580 transmits a control signal for reserving the wet mode to the robot cleaner 1 (S3460).

When the robot cleaner 1 performs the reserved cleaning operation and the wet mode is set to the currently performed reserved cleaning operation, the control unit 110 of the robot cleaner 1 can control the water pump 143 so that the water pump 143 is driven to supply to the mops 30, 40 with more water amount than a preset water supply amount, if the moisture content of the mops 30 and 40 is less than a target moisture content.

In this case, the preset water supply amount may be the water supply amount set by the user. In addition, the target moisture content refers to a moisture content corresponding to the preset water supply amount. Here, the moisture content corresponding to the water supply amount may be stored in the memory 180 as a table.

Meanwhile, the moisture content of the mops 30 and 40 may be calculated by the control unit 110 of the robot cleaner 1 receiving the motor current value of the water pump. For example, the greater the moisture content of the mops 30 and 40, the greater the load is applied to the motor of the water pump 143 connected to the mops 30 and 40, and it is measured a large value of the motor current of the water pump 143.

When the cleaning operation is reserved and executed, the mops 30 and 40 must be coupled to the robot cleaner 1 in advance, and in this case, the state is usually that the mops 30 and 40 are dry or have insufficient moisture content to perform wet mop cleaning. Therefore, it takes a long time from the start of the cleaning operation until the time in which the mops 30 and 40 have a moisture content suitable for performing wet mop cleaning, and the cleaning efficiency of the robot cleaner 1 decreases.

However, since the control device 5 according to an embodiment of the present invention includes the cleaning reservation set unit 1270 that can select the wet mode as a user interface, it can be set to quickly increase the moisture content of the mops 30 and 40 coupled to the robot cleaner 1 when the robot cleaner 1 starts the cleaning operation by the user's input, and thus provides the effect of increasing user convenience in controlling the robot cleaner 1.

Meanwhile, referring to FIG. 14*d*, the reservation set screen 3200 is configured to include a save button 1275. If the user selects the save button 1275 after activating the wet mode, the text indicating that the wet mode has been added to the corresponding cleaning operation list 1271 may be displayed on the reservation list screen 3100. (Refer to FIG. 14*e*)

Accordingly, the user can intuitively check which cleaning operation in the cleaning operation list has the wet mode added, and can select and set the wet mode according to the cleaning operation list.

Meanwhile, referring again to FIG. 6, an overflow menu button 1400 may be arranged on the upper right side of the first area Al on the main screen 1000.

Here, the overflow menu button 1400 means a button for showing functions and menu items not displayed in a main action, and when the overflow menu button 1400 is selected by the user's touch input, a plurality of menus is listed and displayed.

The overflow menu button 1400 may be arranged along with other action buttons on the right side of the title area A02 in which name information of a control target is arranged.

In this case, the other action buttons may include a home view button 1500 and a cleaning diary button 1600.

The home view button 1500 is for switching to a screen in which an image of the room can be checked in real time through the image photographing device provided in the robot cleaner 1 during the cleaning operation of the robot cleaner 1.

A cleaning diary button 1600 is for switching to a screen that can check the area, cleaning time and cleaning mode that has been cleaned by the robot cleaner 1 by date and time.

Meanwhile, when the overflow menu button 1400 is selected by the user's touch input, a displayed menu list 1400*a* may include a residual water removal menu 1410.

FIG. 15 is a flowchart illustrating a method of setting the residual water removal mode in the robot cleaner, and FIGS. 16*a* to 16*e* are views for explaining in detail an embodiment of setting the residual water removal mode in the robot cleaner by the user's touch input.

Referring to FIGS. 15 and 16*a*, first, the control unit 580 receives the user's touch input selecting the overflow menu button 1400 arranged on the main screen 1000 (S3510), and displays on the main screen 1000 a menu list including the residual water removal menu 1410 (S3520).

Next, when receiving the user's touch input selecting the residual water removal menu 1410 (S3530), the control unit 580 switches the main screen 1000 to the residual water removal screen for removing the residual water inside the robot cleaner 1 (S3540).

In this case, a residual water removal start button 1411 is displayed on the residual water removal screen 4100 to receive a control signal for switching the robot cleaner 1 to the residual water removal mode.

In addition, an image area 1413 and an explanation area 1412 for explaining a method of removing residual water of the robot cleaner 1 in the residual water removal mode may be displayed on the residual water removal screen 4100.

A guide message guiding a method of removing residual water may be displayed in the explanation area 1412 so that the user can easily remove residual water. In addition, in the explanation area 1412, a warning message to warn that water may splash while the residual water of the robot cleaner 1 is discharged, and at the same time, to call the user's attention to execute the residual water removal mode at a suitable place to remove the residual water may be displayed.

In addition, an image showing a residual water removal method may be displayed on the image area 1413, in order to guide the use while assisting the guide message on the explanation area 1412.

According to the guide message and warning message of the explanation area 1412 and the image of the image area 1413, the user may be guided to move to a suitable place to remove residual water, and may be guided to take a correct posture for removing residual water. Therefore, the user's convenience is improved through this.

Thereafter, when the residual water removal start button 1411 is selected by the user's touch input (S3550), the control unit 580 transmits to the robot cleaner 1 the control signal for switching the robot cleaner 1 to the residual water removal mode capable of discharging the residual water inside the robot cleaner 1 (S3560).

In this case, the residual water removal mode is a mode in which the residual water inside the robot cleaner 1 can be discharged through the water supply tube 142 whenever a pressing operation is applied to the bumper 58 of the robot cleaner 1.

Whether or not the pressing operation is applied to the bumper 58 may be determined by the first sensor 121. In a state in which the robot cleaner 1 is switched to the residual water removal mode, if the first sensor 121 detects a pressing operation of the bumper 58 and transmits a signal, the control unit 110 of the robot cleaner 1 drives the water pump 143 and controls to discharge the water inside the robot cleaner 1 through the water supply tube 142.

On the other hand, when the residual water removal start button 1411 is selected, the robot cleaner 1 is switched to the residual water removal mode and at the same time the control unit 580 may display a residual water removal end button 1414 on the main screen 1000 while switching the residual water removal screen 4100 to the main screen 1000.

The residual water removal mode continues until the residual water removal end button 1414 is selected by the user's touch input, and when the user selects the residual water removal end button 1414, the control unit 580 generates a control signal for releasing the residual water removal mode and transmits it to the robot cleaner 1. When the residual water removal mode is released, the water pump 143 returns to a non-operation state even if the pressing operation of the bumper 58 is detected.

After the residual water removal end button 1414 is selected and the residual water removal mode is released, an end message 1415 notifying the end of residual water removal may be displayed on the main screen 1000. Through this, the user may be informed that the residual water removal mode is released.

In the robot cleaner 1, the liquid remaining in the water container 141 and the water supply tube 142 may exist even after cleaning is completed. In this case, if the cleaning operation is not performed for a long time with liquid remaining in the water container 141 or the water supply tube 142 and the robot cleaner 1 is left unattended, the water supply tube 142 may become contaminated and cause odor.

Conventionally, in order to remove the residual water in the water container of the robot cleaner having a wet mop function, a method in which the user directly separates the water container from the robot cleaner and removes it has been used.

However, since it is limited to the water container 141 that can be separated from the robot cleaner 1, in the above method, there is a problem in that the liquid remaining in the water supply tube 142 that is accommodated inside the body 50 of the robot cleaner 1 and cannot be separated by the user cannot be removed. In addition, since it is impossible to separate the water supply tube 142, there is a problem that cleaning is impossible even if it is contaminated.

However, since the control device 5 according to an embodiment of the present invention has the residual water removal menu 1410 as a user interface, an operation of removing the residual water inside the robot cleaner 1 by the user's input can be performed.

Specifically, the user can select the residual water removal mode to discharge all the residual water of the water supply tube 142, so that the robot cleaner 1 can be hygienically managed.

Meanwhile, when the overflow menu button 1400 is selected by the user's touch input, the set menu 1420 may be displayed on the displayed menu list 1400a.

FIG. 17 is a flowchart of a method of setting the brightness of the display unit of the robot cleaner, and FIGS. 18a to 18e are views for explaining in detail an embodiment of setting the brightness of the display unit of the robot cleaner by the user's touch input.

Referring to FIGS. 17 and 18a, first, the control unit 580 receives the user's touch input selecting the overflow menu button 1400 arranged on the main screen 1000 (S3610), and displays on the main screen 1000 the menu list 1400a including the set menu 1420 (S3620).

Next, when the control unit 580 receives the user's touch input selecting the set menu 1420 (S3630), the control unit 580 switches the main screen 1000 to a product management screen 5100 including a brightness adjustment menu 1417 (S3640).

Here, the product management screen may include a menu that is not directly related to the cleaning operation of the robot cleaner 1, but for setting auxiliary functions for convenient management of a product (for example, a robot cleaner), for example, a network-related set menu, a menu for setting a nickname of the robot cleaner, a set menu for power saving mode, a consent set menu for camera use, and the like, in addition to the brightness adjustment menu 1417.

On the other hand, when the control unit 580 receives the user's touch input selecting the brightness adjustment menu 1417 (S3650), the product management screen 5100 is switched to the brightness adjustment screen 5200 that displays a plurality of preset set values of brightness 1274 that can be selected by the user (S3660).

Here, a plurality of preset set values of brightness 1274 may be displayed as values indicating the illuminance of the display unit 170 as a ratio, such as "25%, 50%, 75%, and 100%" as shown in FIG. 18d.

In addition, the default set value of the brightness of the control device 5 may be 100%.

Next, when receiving the user's touch input selecting one brightness among the plurality set values of brightness 1274, the control unit 580 transmits a control signal corresponding to the information on the selected set value of brightness to the robot cleaner 1 (S3670).

In this case, as illustrated in FIG. 18e, when the user selects the set value of brightness, the set value of brightness selected by the user may be displayed in text on the brightness adjustment menu 1417 on the product management screen 5100.

While being charged in a charging station, light is illuminated from the display means 171 of the display unit 170 provided on the body 50 of the robot cleaner 1. For example, the light may be an LED light indicating a current battery level, reservation information, cleaning mode, etc., and since conventionally it is not possible to adjust the brightness of such an LED light, there is a problem that the user feels uncomfortable because the brightness of the LED light is brighter in the middle of the night than during the day.

However, since the control device 5 according to an embodiment of the present invention has the brightness adjustment menu 1417 as a user interface, the brightness of the display unit 170 of the robot cleaner 1 can be set by the user input, and it is possible to solve the above-mentioned inconvenience.

In addition, it is possible to reduce power consumption by appropriately selecting the brightness of the display unit 170 of the robot cleaner 1.

In addition, as described above, the brightness adjustment of the display unit 170 of the robot cleaner 1 is independent of the cleaning operation of the robot cleaner 1, but is an auxiliary function set for the convenience of the user.

A user interface with high user convenience can be provided by arranging the menu for selecting such an auxiliary function to be accessible through the set menu 1420 displayed by the overflow menu button 1400 without arranging it on the main screen 1000.

FIG. 19 is a flowchart of a method of setting the volume level of the robot cleaner, and FIGS. 20a to 20f are views for explaining in detail an embodiment of setting the volume level of the robot cleaner by the user's touch input.

Referring to FIGS. 19 to 20b, first, the control unit 580 receives the user's touch input selecting the overflow menu button 1400 arranged on the main screen 1000 53710, and displays on the main screen 1000 the menu list 1400a including the set menu 1420 (S3720).

Next, when the control unit 580 receives the user's touch input selecting the set menu 1420 (S3730), the main screen 1000 is switched to the product management screen 5100 including a notification sound set menu 1421. switch (S3740).

Here, the product management screen 5100 may include a menu that is not directly related to the cleaning operation of the robot cleaner 1, but is a menu capable of setting auxiliary functions for convenient management of the product (for example, robot cleaner), for example, a network-related set menu, a menu for setting a nickname of the robot cleaner, a set menu for power saving mode, or a consent set menu for camera use, in addition to the notification sound set menu 1421.

On the other hand, when the control unit 580 receives the user's touch input selecting the notification sound set menu 1421 (S3750), the control unit 580 switches the product management screen 5100 to a notification sound adjustment screen 6200 including the volume adjustment menu 1422 (S3760).

In this case, as shown in FIG. 20d, the notification sound adjustment screen 6200 may further include, in addition to the volume adjustment menu 1422 for adjusting the volume of the notification sound, a menu for selecting the language of the notification sound (for example, Korean, English, Japanese, etc.), a menu for recording the user's voice and using it as the notification sound of the robot cleaner.

On the other hand, when the control unit 580 receives the user's touch input selecting the volume adjustment menu 1422 (S3770), the notification sound adjustment screen 6200 is switched to the volume adjustment screen 6300 that displays a plurality of preset set values of volume level 1423 from which the user can select (S3780).

Here, as shown in FIG. 20e, a plurality of preset set values of volume level 1423 may be displayed as three steps of "large, normal, and small".

Also, the default of the set value of volume level may be "large".

Lastly, when receiving the user's touch input selecting any one set value of volume level among the plurality set values of volume level, the control unit 580 transmits a control signal corresponding to the information on the selected set value of volume level to the robot cleaner 1 (S3790).

In this case, according to the control signal transmitted to the robot cleaner 1, the control unit 110 of the robot cleaner 1 may control the volume level of the sound transmitted from the voice transmitting means 172 of the display unit 170.

Meanwhile, as shown in FIG. 20*f*, when the user selects the set value of volume level, the set value of volume level selected by the user may be displayed in text on the volume adjustment menu 1422 on the notification sound adjustment screen 6200.

Unlike the conventional suction-type robot cleaner, the robot cleaner having a wet mop function has a feature of low noise when performing the cleaning operation. Accordingly, the user may feel uncomfortable because the notification sound of the robot cleaner is relatively loud.

However, since the control device according to an embodiment of the present invention includes the volume adjustment menu 1422 as a user interface, it is possible to set the volume level of the robot cleaner by the user's input, and thus, the user's inconvenience as described above can be solved.

On the other hand, the notification sound to which the set value of volume level selected by the user is applied may be configured to exclude a warning sound due to an error while the robot cleaner 1 is driving.

Accordingly, it is possible to provide an effect of not missing an error warning of the robot cleaner 1 even when the user sets the set value of volume level to be small.

In addition, as described above, the volume level adjustment of the robot cleaner 1 is independent of the cleaning operation of the robot cleaner 1, but is an auxiliary function set for user convenience.

The menu for setting these auxiliary functions is not arranged on the main screen 1000, but is arranged to be accessible through the set menu 1420 displayed by the overflow menu button 1400, so that the user interface with high user convenience can be provided.

As described above, the control device according to an embodiment of the present invention may increase user convenience by providing various user interfaces through which a set value for controlling the robot cleaner may be input.

Specifically, since the control device according to the present invention includes the water supply set unit as a user interface, it is possible to set the water supply amount to be supplied to the mop of the robot cleaner by the user input, thereby increasing user convenience in controlling the robot cleaner.

In addition, since the control device according to the present invention includes the fall prevention sensitivity set unit as a user interface, it is possible to set the cliff height detected by the robot cleaner by the user input, thereby increasing user convenience in controlling the robot cleaner.

In addition, since the control device according to the present invention includes the location detection unit as a user interface, when the robot cleaner stops while driving, the user can easily detect the current location of the robot cleaner, thereby improving user convenience in controlling the robot cleaner.

In addition, since the control device according to the present invention includes the cleaning reservation set unit that can reserve the wet mop mode as a user interface, the moisture content of the mop coupled to the robot cleaner at the time the robot cleaner starts the cleaning operation can be quickly increased by the user's input, and thus user convenience in controlling the robot cleaner can be increased.

In addition, since the control device according to the present invention includes the residual water removal menu as a user interface, it is possible to perform an operation to remove the residual water of the robot cleaner by the user input, thereby increasing user convenience in controlling the robot cleaner.

In addition, since the control device according to the present invention includes the brightness adjustment menu as a user interface, it is possible to set the brightness of the display unit of the robot cleaner by the user input, thereby increasing user convenience in controlling the robot cleaner.

In addition, since the control device according to the present invention includes the volume level adjustment menu as a user interface, it is possible to set the volume level of the display unit of the robot cleaner by the user input, thereby increasing user convenience in controlling the robot cleaner.

Meanwhile, the block diagrams disclosed in the present disclosure may be interpreted by those of ordinary skill in the art as a form conceptually expressing a circuit for implementing the principles of the present disclosure. Similarly, it will be appreciated by those of ordinary skill in the art that any flow charts, flow diagrams, state transition diagrams, pseudocode, etc. may be represented substantially on a computer-readable medium, and represent a variety of processes that may be executed by such a computer or processor, whether or not explicitly shown.

Accordingly, the above-described embodiments of the present disclosure can be written in a program that can be executed on a computer, and can be implemented in a general-purpose digital computer operating the program using a computer-readable recording medium. The computer-readable recording medium may include a storage medium such as a magnetic storage medium (for example, a ROM, a floppy disk, a hard disk, etc.), an optically readable medium (for example, a CD-ROM, a DVD, etc.), and the like.

The functions of the various elements shown in the drawings may be provided through the use of dedicated hardware as well as hardware capable of executing software in association with appropriate software. When provided by a processor, such function may be provided by a single dedicated processor, a single shared processor, or a plurality of separate processors, some of which may be shared.

In addition, the explicit use of the terms "processor" or "control unit" should not be construed as referring exclusively to hardware capable of executing software, and without limitation, digital signal processor (DSP) hardware, read only memory (ROM) for storing software, random access memory (RAM), and non-volatile storage may be implicitly included.

In the foregoing, a specific embodiment of the present invention has been described and illustrated, but the present invention is not limited to the described embodiment, and it will be understood by those skilled in the art that various modifications and variations can be made in other specific embodiments without departing from the spirit and scope of the present invention.

Accordingly, the scope of the present invention should not be determined by the described embodiment, but should be determined by the technical idea described in the claims.

DESCRIPTION OF REFERENCE NUMERALS

1: robot cleaner
5: control device
551: display unit
1000: main screen
1100: status display module
1110: cleaning mode display unit
1120: progress time display unit
1130: reservation status display unit
1200: user set module
1210: cleaning mode set unit
1220: cleaning area set unit
1230: water supply set unit
1240: interlocking cleaning set unit
1250: repeated cleaning set unit
1260: fall prevention sensitivity set unit
1270: cleaning reservation set unit
1300: operation performing module
1310: monitoring operation unit
1320: cleaning operation unit
1330: charging operation unit

The invention claimed is:

1. A control device which remotely controls a robot cleaner that automatically drives and cleans a floor surface using one or more mops, the control device comprising:
  a display unit that displays a main screen that receives a control signal for controlling the robot cleaner as a user's touch input from a user,
  wherein
    in a first area located at an upper end of the main screen, a status display module that indicates a current operation status of the robot cleaner is arranged, and in a second area located below the first area, a user set module that receives a set value for controlling the robot cleaner through the user's touch input is arranged, and in a third area located between the status dis play module and the user set module, an operation performing module that operates the robot cleaner through the user's touch input is arranged,
    the user set module comprises a water supply set unit that receives a set value of target water supply amount to be supplied to the mop from the user,
    the main screen comprises an overflow menu button arranged on an upper right side of the status display module,
    when the overflow menu button is selected by the user's touch input, a menu list comprising one or more menus is displayed on the main screen,
    the menu list is displayed while the main screen is displayed, and when any of the menus is selected, the main screen is switched to the screen of the selected menu,
    the menu list comprises a residual water removal menu for removing residual water inside the robot cleaner,
    the user set module further comprises a fall prevention sensitivity set unit that receives a set value of cliff height of the robot cleaner from the user,
    when the fall prevention sensitivity set unit is selected by the user's touch input, a plurality of preset set values of cliff height is displayed on the main screen, and
    when the set value of cliff height is selected by the user's touch input, a control signal corresponding to information on the selected set value of cliff height is transmitted to the robot cleaner that moves based on the selected set value of cliff height.

2. The control device according to claim 1, wherein the status display module comprises at least one of a cleaning mode display unit that indicates a currently set cleaning mode of the robot cleaner, a reservation status display unit that indicates whether or not one or more functions of the robot cleaner are reserved, and a progress time display unit that indicates a total time that the robot cleaner has driven for cleaning.

3. The control device according to claim 1, wherein the operation performing module comprises at least one of a monitoring operation unit that receives a control signal of a monitoring operation in which the robot cleaner monitors a room using an image photographing means provided in the robot cleaner, a cleaning operation unit that receives a control signal of a cleaning operation in which the robot cleaner starts cleaning the floor surface, and a charging operation unit that receives a control signal of a charging operation in which the robot cleaner returns to a charging station.

4. The control device according to claim 1, wherein
  the water supply set unit comprises a slider in a form of a horizontal bar that is moved by sliding a target point left and right by the user's touch input,
  the slider is displayed in a first color from a preset point to a point corresponding to a maximum water supply amount to distinguish it from a second color at other point of the slider,
  a water supply amount corresponding to a point where the target point stops on the slider is set as the set value of target water supply amount.

5. The control device according to claim 4, wherein when the target point slid by the user is located between the preset point and the point corresponding to the maximum water supply amount, the entire slider is converted to the first color, and a warning message is displayed at a bottom of the slider.

6. The control device according to claim 4, wherein when the set value of target water supply amount is set by the user's touch input, a control signal corresponding to information on the set value of target water supplyamount is transmitted to the robot cleaner.

7. The control device according to claim 1, wherein
  the user set module further comprises a location detection unit that searches a current location of the robot cleaner,
  when the location detection unit is selected by the user's touch input, the main screen is switched to a cleaner search screen, and a cleaner search button that receives a control signal for searching the current location of the robot cleaner is displayed on the cleaner search screen.

8. The control device according to claim 7, wherein when the cleaner search button is selected by the user's touch input, a location where the robot cleaner stops driving is transmitted from the robot cleaner, and the location where the driving is stopped is displayed on the cleaner search screen as the current location of the robot cleaner.

9. The control device according to claim 1, wherein
  the user set module further comprises a cleaning reservation set unit that reserves a cleaning operation of the robot cleaner,
  when the cleaning reservation set unit is selected by the user's touch input, the main screen is switched to a reservation list screen including a reservation adding button for reserving the cleaning operation of the robot cleaner and a cleaning operation list of the robot cleaner previously reserved,
  when the reservation adding button or the cleaning operation list is selected by the user's touch input, the reservation list screen is switched to a reservation set screen that sets a wet mode of the mop.

10. The control device according to claim 9, wherein
the reservation set screen comprises a mop wet button capable of activating or deactivating the wet mode,
when the mop wet button is activated by the user's touch input, a control signal for reserving the wet mode to the robot cleaner is transmitted to the robot cleaner.

11. The control device according to claim 1, when the residual water removal menu is selected by the user's touch input, the main screen is switched to a residual water removal screen for removing residual water inside the robot cleaner.

12. The control device according to claim 11, wherein a residual water removal start button that receives an input for switching the robot cleaner to a residual water removal mode is displayed on the residual water removal screen,
when the residual water removal start button is selected by the user's touch input, a control signal for switching the robot cleaner to a residual water removal mode capable of discharging the residual water inside the robot cleaner is transmitted to the robot cleaner.

13. The control device according to claim 1, wherein the menu list comprises a set menu, and when the set menu is selected by the user's touch input, the main screen is switched to a product management screen that receives a set value irrelevant to a cleaning operation of the robot cleaner.

14. The control device according to claim 13, wherein the product management screen comprises a brightness adjustment menu that receives a set value of brightness of a display unit provided in the robot cleaner to provide information to the user, and a notification sound set menu that receives a set value of notification sound transmitted from the robot cleaner.

15. The control device according to claim 14, wherein
when the brightness adjustment menu is selected by the user's touch input, the product management screen is switched to a brightness adjustment screen for selecting the brightness of the display unit of the robot cleaner,
the brightness adjustment screen displays a plurality of set values of brightness selectable by the user,
when one brightness of the plurality of set values of brightness is selected by the user's touch input, a control signal corresponding to the selected set value of brightness is transmitted to the robot cleaner.

16. The control device according to claim 14, wherein
when the notification sound set menu is selected by the user's touch input, the product management screen is switched to a notification sound adjustment screen, and the notification sound adjustment screen comprises a volume adjustment menu,
when the volume adjustment menu is selected by the user's touch input, the notification sound adjustment screen is switched to a volume adjustment screen for selecting a volume level of the notification sound transmitted from the robot cleaner,
the volume adjustment screen displays a plurality of preset set values of volume levels selectable by the user,
when any one set value of volume level is selected from the plurality of set values of volume levels by the user's touch input, a control signal corresponding to the selected set value of volume level is transmitted to the robot cleaner.

* * * * *